US008615668B2

(12) United States Patent
Matsuda et al.

(10) Patent No.: US 8,615,668 B2
(45) Date of Patent: Dec. 24, 2013

(54) CONFIDENTIAL SEARCH SYSTEM AND CRYPTOGRAPHIC PROCESSING SYSTEM

(75) Inventors: Nori Matsuda, Tokyo (JP); Mitsuhiro Hattori, Tokyo (JP); Takashi Ito, Tokyo (JP); Takeshi Yoneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/521,317

(22) PCT Filed: Jan. 15, 2010

(86) PCT No.: PCT/JP2010/050419
§ 371 (c)(1),
(2), (4) Date: Jul. 10, 2012

(87) PCT Pub. No.: WO2011/086687
PCT Pub. Date: Jul. 21, 2011

(65) Prior Publication Data
US 2012/0297201 A1   Nov. 22, 2012

(51) Int. Cl.
*G06F 12/14* (2006.01)
(52) U.S. Cl.
USPC ........................................................ 713/189
(58) Field of Classification Search
None
See application file for complete search history.

(56) References Cited

U.S. PATENT DOCUMENTS

| 7,113,594 | B2 | 9/2006 | Boneh et al. |
| 7,620,625 | B2 | 11/2009 | Ramzan et al. |
| 7,634,087 | B2 | 12/2009 | Boneh et al. |
| 7,941,422 | B2 | 5/2011 | Ramzan et al. |
| 8,130,964 | B2 | 3/2012 | Boneh et al. |
| 2010/0329454 | A1 | 12/2010 | Takashima |
| 2012/0045056 | A1 | 2/2012 | Takashima et al. |

FOREIGN PATENT DOCUMENTS

| JP | 2002 278970 | 9/2002 |
| JP | 2005 500740 | 1/2005 |
| JP | 2005-500740 A | 1/2005 |
| JP | 2007 52698 | 3/2007 |
| JP | 2008 500598 | 1/2008 |
| JP | 2008-500598 A | 1/2008 |
| JP | 2008 176040 | 7/2008 |
| JP | 2008 288837 | 11/2008 |
| WO | 2010 024312 | 3/2010 |
| WO | 2011 062136 | 5/2011 |

OTHER PUBLICATIONS

Okamoto, T., et al., "Hierarchical Predicate Encryption for Inner-Products," ASIACRYPT, LNCS, vol. 5912, pp. 214-231, (2009).

(Continued)

*Primary Examiner* — Brandon Hoffman
(74) *Attorney, Agent, or Firm* — Oblon, Spivak, McClelland, Maier & Neustadt, L.L.P.

(57) ABSTRACT

A confidential search that can flexibly control searchable data depending on a role or authority of a user when the data is shared in a group. When the inner product of an attribute vector and a predicate vector is a predetermined value, the confidential search system conducts pairing computation of decrypted data generated based on the attribute vector and a decryption key generated based on the predicate vector, so as to realize confidential search by utilizing an inner-product predicate encryption process that can decrypt the encrypted data. In particular, the confidential search system enables flexible control of searchable data depending on the role or authority of the user, by devising a method of generating the attribute vector and the predicate vector.

19 Claims, 69 Drawing Sheets

(56) References Cited

OTHER PUBLICATIONS

Katz, J., et al., "Predicate Encryption Supporting Disjunctions, Polynomial Equations, and Inner Products," Cryptology ePrint Archive, total 30 pages, (Jul. 8, 2008).

Zhang, Y., et al., "Anonymous Fuzzy Identity-based Encryption for Similarity Search," Department of Computer Science Cryptology ePrint Archive, total 29 pages, (Jan. 12, 2010).

Matsuda, N., et al., "Secure Datacenter Systems with Hierarchical Predicate Encryption," The 2010 Symposium on Cryptology and Information Security, SCIS, total 7 pages, (Jan. 19, 2010).

Okamoto, T., et al., "Hierarchical Predicate Encryption with Inner-Products from a Single DDH-like Assumption," ASIACRYPT, The 2010 Symposium on Cryptology and Information Security, vol. 5912, total 7 pages, (Jan. 19-22, 2010).

Okamoto, T., et al., "Homomorphic Encryption and Signatures from Vector Decomposition," LNCS, vol. 5209, pp. 57 to 74, (2008).

Boneh, D., et al., "Public Key Encryption with keyword Search," EUROCRYPT, Lecture Notes in Computer Science, vol. 3027, total 17 pages, (2004).

Park, H. et al., "Secure Index Search for Groups," TrustBus, Lecture Notes in Computer Science, vol. 3592, total 13 pages, (2005).

Wang, P., et al., "Keyword Field-Free Conjunctive Keyword Searches on Encrypted Data and Extension for Dynamic Groups," CANS, Lecture Notes in Computer Science, vol. 5339, pp. 178-195, (2008).

International Search Report Issued Mar. 9, 2010 in PCT/JP10/50419 Filed Jan. 15, 2010.

Fig.11

503 — BELONGING-OFFICE INFORMATION CODED SEQUENCE

| COMPANY ID | BUSINESS PLACE ID | DEPARTMENT ID | SECTION ID | UNIT ID |
|---|---|---|---|---|
| 601 | 602 | 603 | 604 | 605 |

Fig.12

| BELONGING-OFFICE INFORMATION CODED SEQUENCE 1 | | | |
|---|---|---|---|
| A COMPANY | B BUSINESS PLACE | C DEPARTMENT | D SECTION | E UNIT |

| BELONGING-OFFICE INFORMATION CODED SEQUENCE 2 | | | |
|---|---|---|---|
| A COMPANY | B BUSINESS PLACE | C DEPARTMENT | D SECTION | * |

| BELONGING-OFFICE INFORMATION CODED SEQUENCE 3 | | | |
|---|---|---|---|
| A COMPANY | B BUSINESS PLACE | C DEPARTMENT | * | * |

| BELONGING-OFFICE INFORMATION CODED SEQUENCE 4 | | | |
|---|---|---|---|
| A COMPANY | B BUSINESS PLACE | C DEPARTMENT | E SECTION | * |

| BELONGING-OFFICE INFORMATION CODED SEQUENCE 5 | | | |
|---|---|---|---|
| A COMPANY | B BUSINESS PLACE | C DEPARTMENT | D SECTION | RANDOM NUMBER R |

Fig.13

| POST INFORMATION CODED SEQUENCE 504 | | | | | |
|---|---|---|---|---|---|
| EXECUTIVE CLASS FLAG 701 | DIRECTOR CLASS FLAG 702 | MANAGER CLASS FLAG 703 | CHIEF CLASS FLAG 704 | SUBCHIEF CLASS FLAG 705 | STAFF CLASS FLAG 706 |

Fig.14

| POST INFORMATION CODED SEQUENCE 1 | | | | | |
|---|---|---|---|---|---|
| EXECUTIVE | DIRECTOR | MANAGER | CHIEF | SUBCHIEF | STAFF |
| * | * | * | 1 | * | * |

| POST INFORMATION CODED SEQUENCE 2 | | | | | |
|---|---|---|---|---|---|
| EXECUTIVE | DIRECTOR | MANAGER | CHIEF | SUBCHIEF | STAFF |
| * | * | * | * | 1 | * |

| POST INFORMATION CODED SEQUENCE 3 | | | | | |
|---|---|---|---|---|---|
| EXECUTIVE | DIRECTOR | MANAGER | CHIEF | SUBCHIEF | STAFF |
| R | R | 1 | 1 | R | R |

| POST INFORMATION CODED SEQUENCE 4 | | | | | |
|---|---|---|---|---|---|
| EXECUTIVE | DIRECTOR | MANAGER | CHIEF | SUBCHIEF | STAFF |
| R | R | 1 | 1 | 1 | 1 |

Fig. 15

POST INFORMATION CODED SEQUENCE 5

| EXECUTIVE | DIRECTOR | MANAGER | CHIEF | SUBCHIEF | STAFF |
|---|---|---|---|---|---|
| R | R | R | 1 | R | R |

POST INFORMATION CODED SEQUENCE 6

| EXECUTIVE | DIRECTOR | MANAGER | CHIEF | SUBCHIEF | STAFF |
|---|---|---|---|---|---|
| R | R | 1 | 1 | R | R |

POST INFORMATION CODED SEQUENCE 7

| EXECUTIVE | DIRECTOR | MANAGER | CHIEF | SUBCHIEF | STAFF |
|---|---|---|---|---|---|
| R | R | R | 1 | R | R |

POST INFORMATION CODED SEQUENCE 8

| EXECUTIVE | DIRECTOR | MANAGER | CHIEF | SUBCHIEF | STAFF |
|---|---|---|---|---|---|
| R | R | 1 | R | R | R |

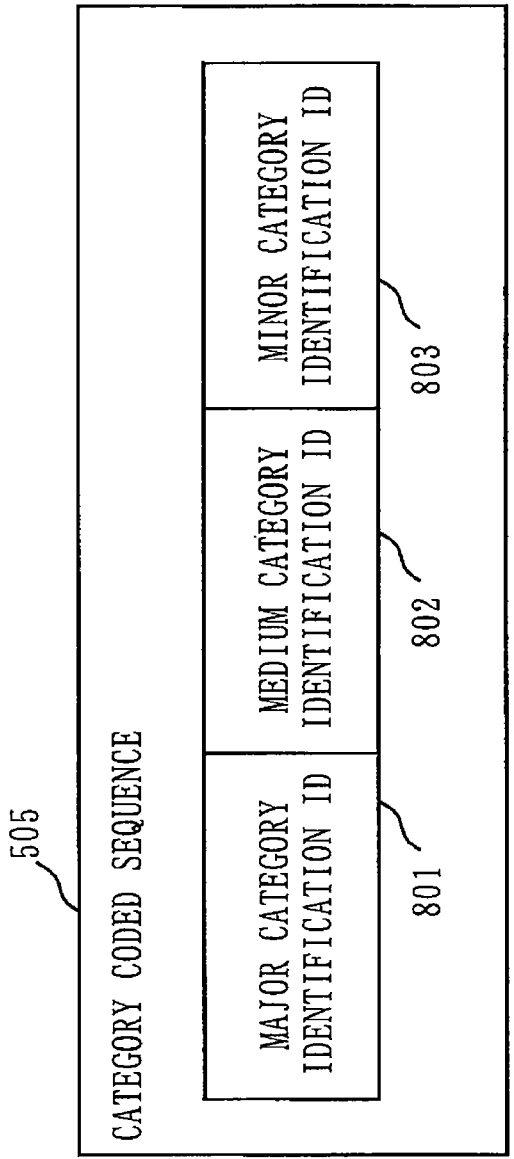

Fig. 17

| CATEGORY CODED SEQUENCE 1 | | |
|---|---|---|
| MAJOR CATEGORY | MEDIUM CATEGORY | MINOR CATEGORY |
| * | * | * |

| CATEGORY CODED SEQUENCE 2 | | |
|---|---|---|
| MAJOR CATEGORY | MEDIUM CATEGORY | MINOR CATEGORY |
| A DEVELOPMENT | * | * |

| CATEGORY CODED SEQUENCE 3 | | |
|---|---|---|
| MAJOR CATEGORY | MEDIUM CATEGORY | MINOR CATEGORY |
| A DEVELOPMENT | SPEC SHEET | EXTERNAL SPEC |

| CATEGORY CODED SEQUENCE 4 | | |
|---|---|---|
| MAJOR CATEGORY | MEDIUM CATEGORY | MINOR CATEGORY |
| BUDGET PLANNING | FISCAL YEAR 2009 | EMPLOYMENT COST |

Fig.19

SECRET LEVEL CODED SEQUENCE 1

| TOP SECRET | SECRET | IN-HOUSE SECRET | NON-RELEVANCE |
|---|---|---|---|
| R | 1 | 1 | 1 |

SECRET LEVEL CODED SEQUENCE 2

| TOP SECRET | SECRET | IN-HOUSE SECRET | NON-RELEVANCE |
|---|---|---|---|
| 1 | 1 | 1 | 1 |

SECRET LEVEL CODED SEQUENCE 3

| TOP SECRET | SECRET | IN-HOUSE SECRET | NON-RELEVANCE |
|---|---|---|---|
| * | 1 | * | * |

SECRET LEVEL CODED SEQUENCE 4

| TOP SECRET | SECRET | IN-HOUSE SECRET | NON-RELEVANCE |
|---|---|---|---|
| 1 | * | * | * |

Fig.20

| SECRET LEVEL CODED SEQUENCE 5 | | | |
|---|---|---|---|
| TOP SECRET | SECRET | IN-HOUSE SECRET | NON-RELEVANCE |
| R | 1 | R | R |

| SECRET LEVEL CODED SEQUENCE 6 | | | |
|---|---|---|---|
| TOP SECRET | SECRET | IN-HOUSE SECRET | NON-RELEVANCE |
| 1 | R | R | R |

Fig. 21

| EMPLOYMENT TYPE CODED SEQUENCE | | | | | |
|---|---|---|---|---|---|
| MAJOR CAREER FLAG | GENERAL CAREER FLAG | VISITING STAFF FLAG | AFFILIATE STAFF FLAG | DISPATCHED STAFF FLAG | OTHER-TYPE FLAG |
| 1001 | 1002 | 1003 | 1004 | 1005 | 1006 |

EMPLOYMENT TYPE CODED SEQUENCE 1

| MAJOR CAREER | GENERAL CAREER | VISITING STAFF | AFFILIATE STAFF | DISPATCHED STAFF | OTHER TYPE |
|---|---|---|---|---|---|
| 1 | * | * | * | * | * |

EMPLOYMENT TYPE CODED SEQUENCE 2

| MAJOR CAREER | GENERAL CAREER | VISITING STAFF | AFFILIATE STAFF | DISPATCHED STAFF | OTHER TYPE |
|---|---|---|---|---|---|
| * | * | 1 | * | * | * |

EMPLOYMENT TYPE CODED SEQUENCE 3

| MAJOR CAREER | GENERAL CAREER | VISITING STAFF | AFFILIATE STAFF | DISPATCHED STAFF | OTHER TYPE |
|---|---|---|---|---|---|
| 1 | 1 | 1 | R | R | R |

EMPLOYMENT TYPE CODED SEQUENCE 4

| MAJOR CAREER | GENERAL CAREER | VISITING STAFF | AFFILIATE STAFF | DISPATCHED STAFF | OTHER TYPE |
|---|---|---|---|---|---|
| 1 | 1 | R | R | R | R |

Fig.23

| EMPLOYMENT TYPE CODED SEQUENCE 5 | | | | | |
|---|---|---|---|---|---|
| MAJOR CAREER | GENERAL CAREER | VISITING STAFF | AFFILIATE STAFF | DISPATCHED STAFF | OTHER TYPE |
| 1 | R | R | R | R | R |

| EMPLOYMENT TYPE CODED SEQUENCE 6 | | | | | |
|---|---|---|---|---|---|
| MAJOR CAREER | GENERAL CAREER | VISITING STAFF | AFFILIATE STAFF | DISPATCHED STAFF | OTHER TYPE |
| R | R | 1 | R | R | R |

Fig.25

TERM INFORMATION CODED SEQUENCE 1

| YEAR 2007 | YEAR 2008 | YEAR 2009 | YEAR 2010 | YEAR 2011 | YEAR 2012 |
|---|---|---|---|---|---|
| 1 | 1 | 1 | R | R | R |

TERM INFORMATION CODED SEQUENCE 2

| YEAR 2007 | YEAR 2008 | YEAR 2009 | YEAR 2010 | YEAR 2011 | YEAR 2012 |
|---|---|---|---|---|---|
| * | * | 1 | * | * | * |

TERM INFORMATION CODED SEQUENCE 3

| YEAR 2007 | YEAR 2008 | YEAR 2009 | YEAR 2010 | YEAR 2011 | YEAR 2012 |
|---|---|---|---|---|---|
| * | * | * | 1 | * | * |

Fig.26

| TERM INFORMATION CODED SEQUENCE 4 | | | | | |
|---|---|---|---|---|---|
| YEAR 2007 | YEAR 2008 | YEAR 2009 | YEAR 2010 | YEAR 2011 | YEAR 2012 |
| R | R | 1 | R | R | R |

| TERM INFORMATION CODED SEQUENCE 5 | | | | | |
|---|---|---|---|---|---|
| YEAR 2007 | YEAR 2008 | YEAR 2009 | YEAR 2010 | YEAR 2011 | YEAR 2012 |
| R | R | R | 1 | R | R |

Fig.28

TERM INFORMATION CODED SEQUENCE 6

START YEAR/MONTH CODED SEQUENCE 6

| START YEAR | JAN. | FEB. | MAR. | APR. | MAY | ... | DEC. |
|---|---|---|---|---|---|---|---|
| 2003 | R | R | R | 1 | 1 | | 1 |

MIDDLE YEAR CODED SEQUENCE 6

| MIDDLE YEAR | MIDDLE YEAR | MIDDLE YEAR | MIDDLE YEAR | MIDDLE YEAR | MIDDLE YEAR | ... | MIDDLE YEAR |
|---|---|---|---|---|---|---|---|
| 2004 | 2005 | 2006 | 2007 | 2008 | R | | R |

END YEAR/MONTH CODED SEQUENCE 6

| END YEAR | JAN. | FEB. | MAR. | APR. | MAY | ... | DEC. |
|---|---|---|---|---|---|---|---|
| 2009 | 1 | 1 | 1 | 1 | 1 | | 1 |

Fig.29

TERM INFORMATION CODED SEQUENCE 7

START YEAR/MONTH CODED SEQUENCE 7

| START YEAR | JAN. | FEB. | MAR. | APR. | MAY | ... | DEC. |
|---|---|---|---|---|---|---|---|
| 2003 | R | R | R | 1 | 1 | | 1 |

MIDDLE YEAR CODED SEQUENCE 7

| MIDDLE YEAR | MIDDLE YEAR | MIDDLE YEAR | MIDDLE YEAR | MIDDLE YEAR | MIDDLE YEAR | ... | MIDDLE YEAR |
|---|---|---|---|---|---|---|---|
| 2004 | 2005 | 2006 | 2007 | 2008 | 2009 | | R |

END YEAR/MONTH CODED SEQUENCE 7

| END YEAR | JAN. | FEB. | MAR. | APR. | MAY | ... | DEC. |
|---|---|---|---|---|---|---|---|
| 2010 | 1 | 1 | 1 | R | R | | R |

Fig.30

TERM INFORMATION CODED SEQUENCE 8

START YEAR/MONTH CODED SEQUENCE 8

| START YEAR | JAN. | FEB. | MAR. | APR. | MAY | ...... | DEC. |
|---|---|---|---|---|---|---|---|
| 2009 | R | R | R | 1 | R | | R |

MIDDLE YEAR CODED SEQUENCE 8

| MIDDLE YEAR | MIDDLE YEAR | MIDDLE YEAR | MIDDLE YEAR | MIDDLE YEAR | ...... | MIDDLE YEAR |
|---|---|---|---|---|---|---|
| 2009 | 2009 | 2009 | 2009 | 2009 | | 2009 |

END YEAR/MONTH CODED SEQUENCE

| END YEAR | JAN. | FEB. | MAR. | APR. | MAY | ...... | DEC. |
|---|---|---|---|---|---|---|---|
| 2009 | R | R | R | 1 | R | | R |

Fig.32

| TERM INFORMATION CODED SEQUENCE 9 | | | | |
|---|---|---|---|---|
| YEAR INFORMATION 1 | YEAR INFORMATION 2 | YEAR INFORMATION 3 | YEAR INFORMATION 4 | YEAR INFORMATION 10 |
| 2007 | 2008 | 2009 | * | ⋯ * |

| TERM INFORMATION CODED SEQUENCE 10 | | | | |
|---|---|---|---|---|
| YEAR INFORMATION 1 | YEAR INFORMATION 2 | YEAR INFORMATION 3 | YEAR INFORMATION 4 | YEAR INFORMATION 10 |
| 2009 | * | * | * | ⋯ * |

Fig. 33

| 509 DELEGATEE INFORMATION CODED SEQUENCE | | | | |
|---|---|---|---|---|
| SECRETARY-TO-EXEC. FLAG | ACTING DIRECTOR FLAG | ACTING MANAGER FLAG | ACTING CHIEF FLAG | COLLEAGUE FLAG |
| 1301 | 1302 | 1303 | 1304 | 1305 |

Fig.34

| DELEGATEE INFORMATION CODED SEQUENCE 1 | | | | |
|---|---|---|---|---|
| SECRETARY-TO-EXEC. | ACTING DIRECTOR | ACTING MANAGER | ACTING CHIEF | COLLEAGUE |
| * | * | * | * | * |

| DELEGATEE INFORMATION CODED SEQUENCE 2 | | | | |
|---|---|---|---|---|
| SECRETARY-TO-EXEC. | ACTING DIRECTOR | ACTING MANAGER | ACTING CHIEF | COLLEAGUE |
| 1 | * | * | * | * |

| DELEGATEE INFORMATION CODED SEQUENCE 3 | | | | |
|---|---|---|---|---|
| SECRETARY-TO-EXEC. | ACTING DIRECTOR | ACTING MANAGER | ACTING CHIEF | COLLEAGUE |
| * | 1 | * | * | * |

| DELEGATEE INFORMATION CODED SEQUENCE 4 | | | | |
|---|---|---|---|---|
| SECRETARY-TO-EXEC. | ACTING DIRECTOR | ACTING MANAGER | ACTING CHIEF | COLLEAGUE |
| R | R | R | R | R |

| DELEGATEE INFORMATION CODED SEQUENCE 5 | | | | |
|---|---|---|---|---|
| SECRETARY-TO-EXEC. | ACTING DIRECTOR | ACTING MANAGER | ACTING CHIEF | COLLEAGUE |
| 1 | R | R | R | R |

Fig.36

SEARCH QUERY CODED SEQUENCE 1

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| 1 | YR. 2009 | OCT. | DAY 5 | PC | 3 | 100,000 YEN | PURCHASE |

SEARCH QUERY CODED SEQUENCE 2

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| 2 | YR. 2009 | NOV. | DAY 10 | PC | 2 | 80,000 YEN | PURCHASE |

SEARCH QUERY CODED SEQUENCE 3

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| 3 | YR. 2010 | JAN. | DAY 15 | PC | 1 | — | DISPOSAL |

SEARCH QUERY CODED SEQUENCE 4

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | PC | * | * | * |

SEARCH QUERY CODED SEQUENCE 5

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | YR. 2009 | * | * | * | * | * | PURCHASE |

Fig.37

SEARCH QUERY CODED SEQUENCE 6

| ELEM. 1 | ELEM. 2 | ELEM. 3 | ELEM. 4 | ELEM. 5 | ELEM. 6 | ELEM. 7 | ELEM. 8 |
|---|---|---|---|---|---|---|---|
| YR. 2009 | NOV. | TOKYO | BUSINESS TRIP | REPORT | A COMPANY | BUSINESS MEETING | ORDER RECEIVED |

SEARCH QUERY CODED SEQUENCE 7

| ELEM. 1 | ELEM. 2 | ELEM. 3 | ELEM. 4 | ELEM. 5 | ELEM. 6 | ELEM. 7 | ELEM. 8 |
|---|---|---|---|---|---|---|---|
| YR. 2009 | TRADE FAIR | ENTRY | REPORT | 50 | B COMPANY | TANAKA | TEL. |

SEARCH QUERY CODED SEQUENCE 8

| ELEM. 1 | ELEM. 2 | ELEM. 3 | ELEM. 4 | ELEM. 5 | ELEM. 6 | ELEM. 7 | ELEM. 8 |
|---|---|---|---|---|---|---|---|
| - | - | - | - | - | - | - | - |

SEARCH QUERY CODED SEQUENCE 9

| ELEM. 1 | ELEM. 2 | ELEM. 3 | ELEM. 4 | ELEM. 5 | ELEM. 6 | ELEM. 7 | ELEM. 8 |
|---|---|---|---|---|---|---|---|
| YR. 2009 | - | - | - | - | - | - | - |

SEARCH QUERY CODED SEQUENCE 10

| ELEM. 1 | ELEM. 2 | ELEM. 3 | ELEM. 4 | ELEM. 5 | ELEM. 6 | ELEM. 7 | ELEM. 8 |
|---|---|---|---|---|---|---|---|
| TRADE FAIR | - | - | - | - | - | - | - |

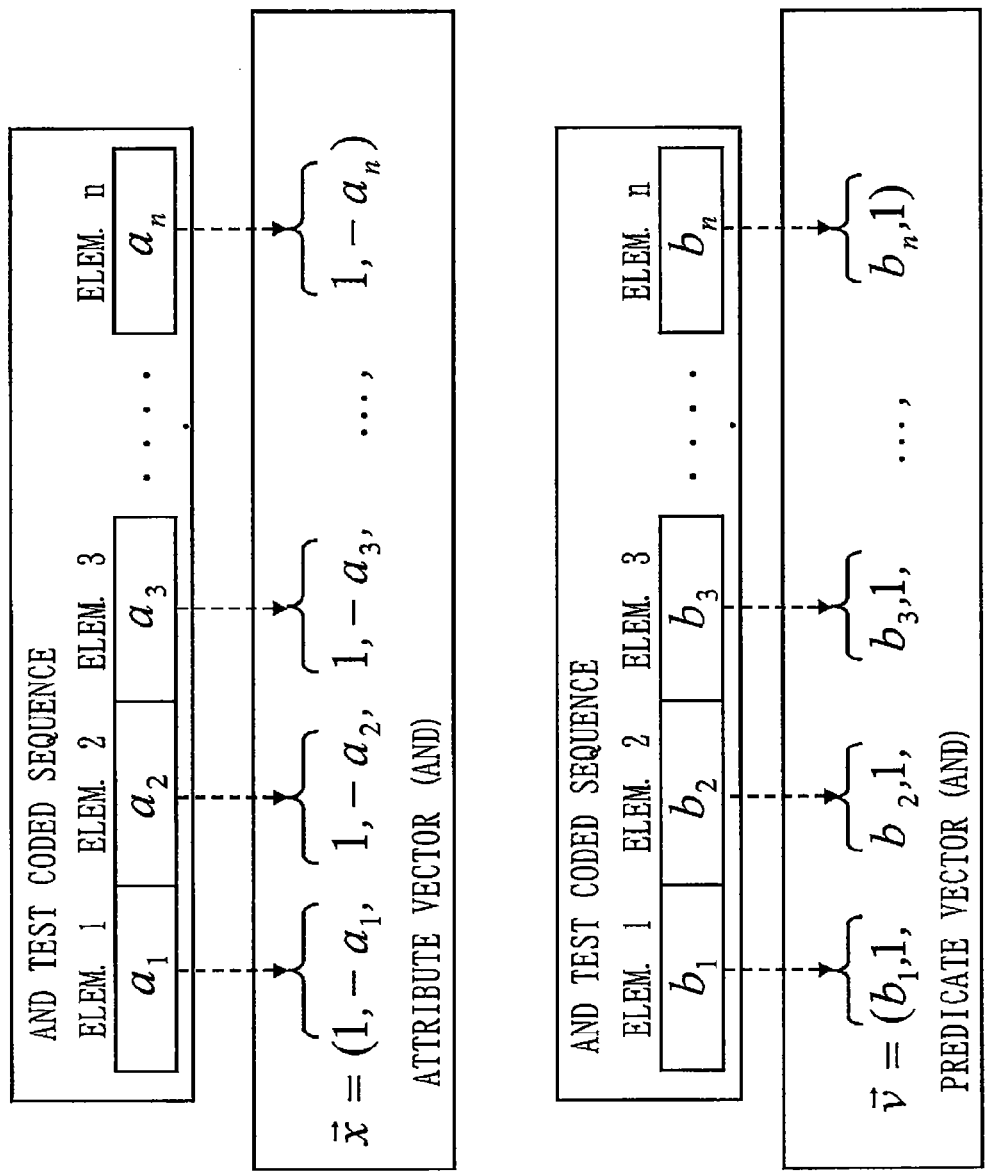

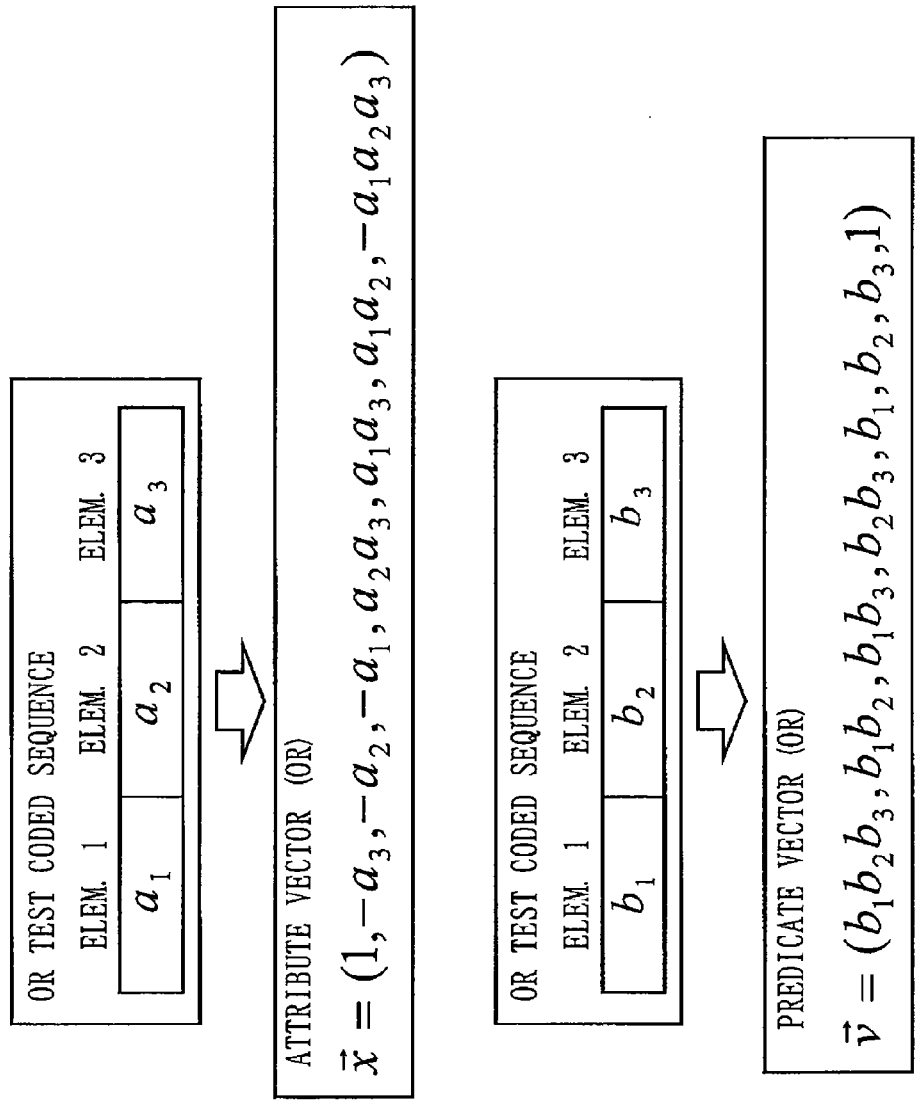

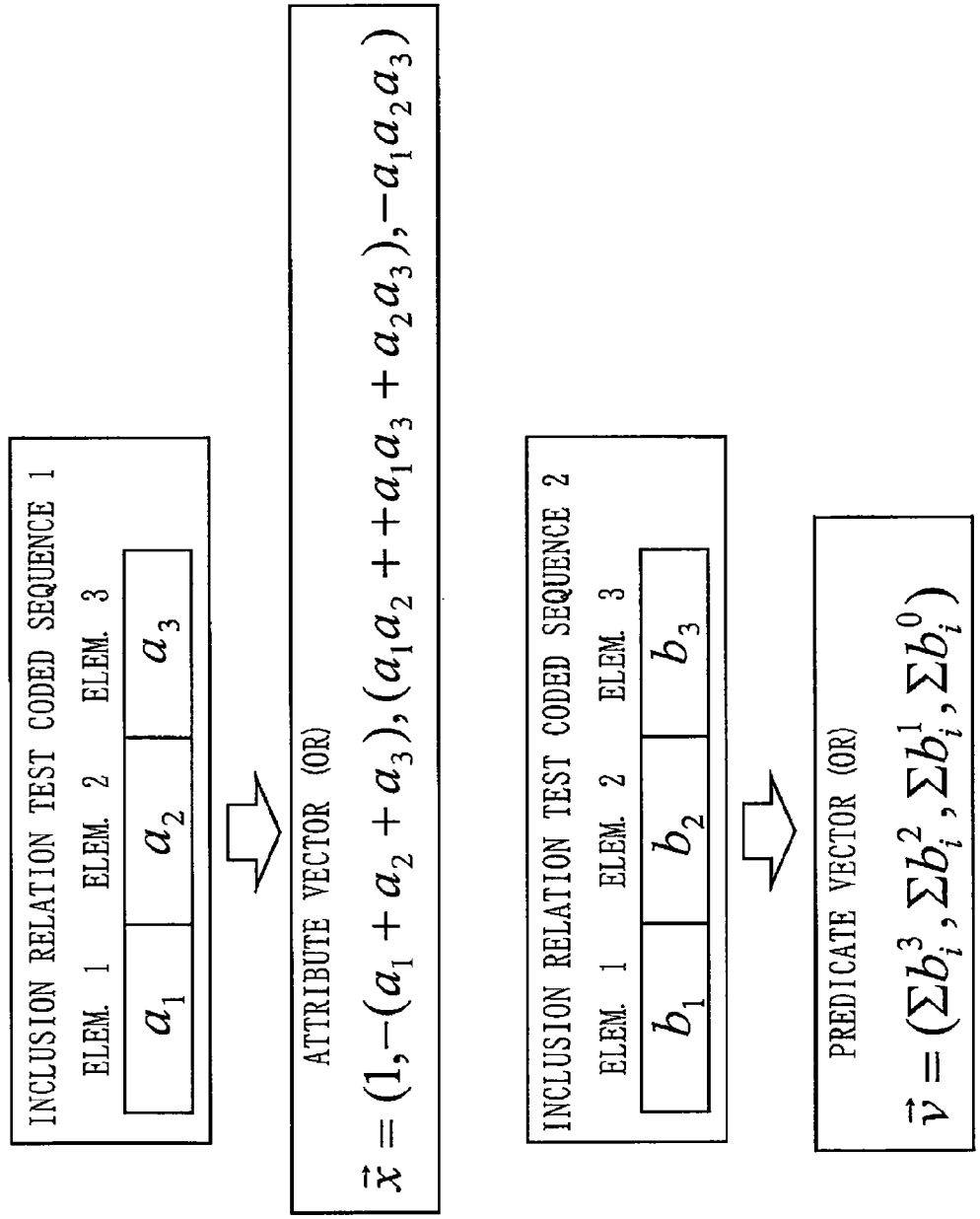

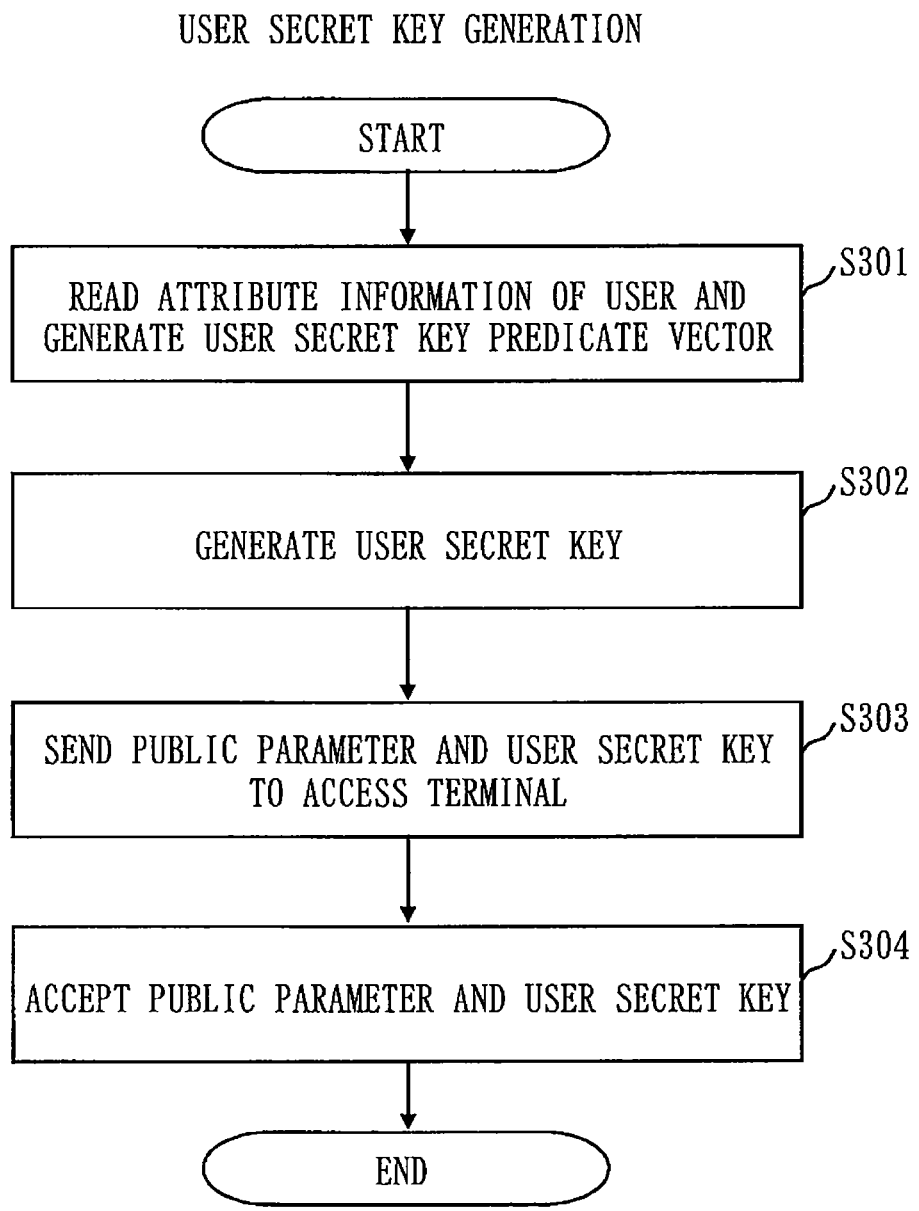

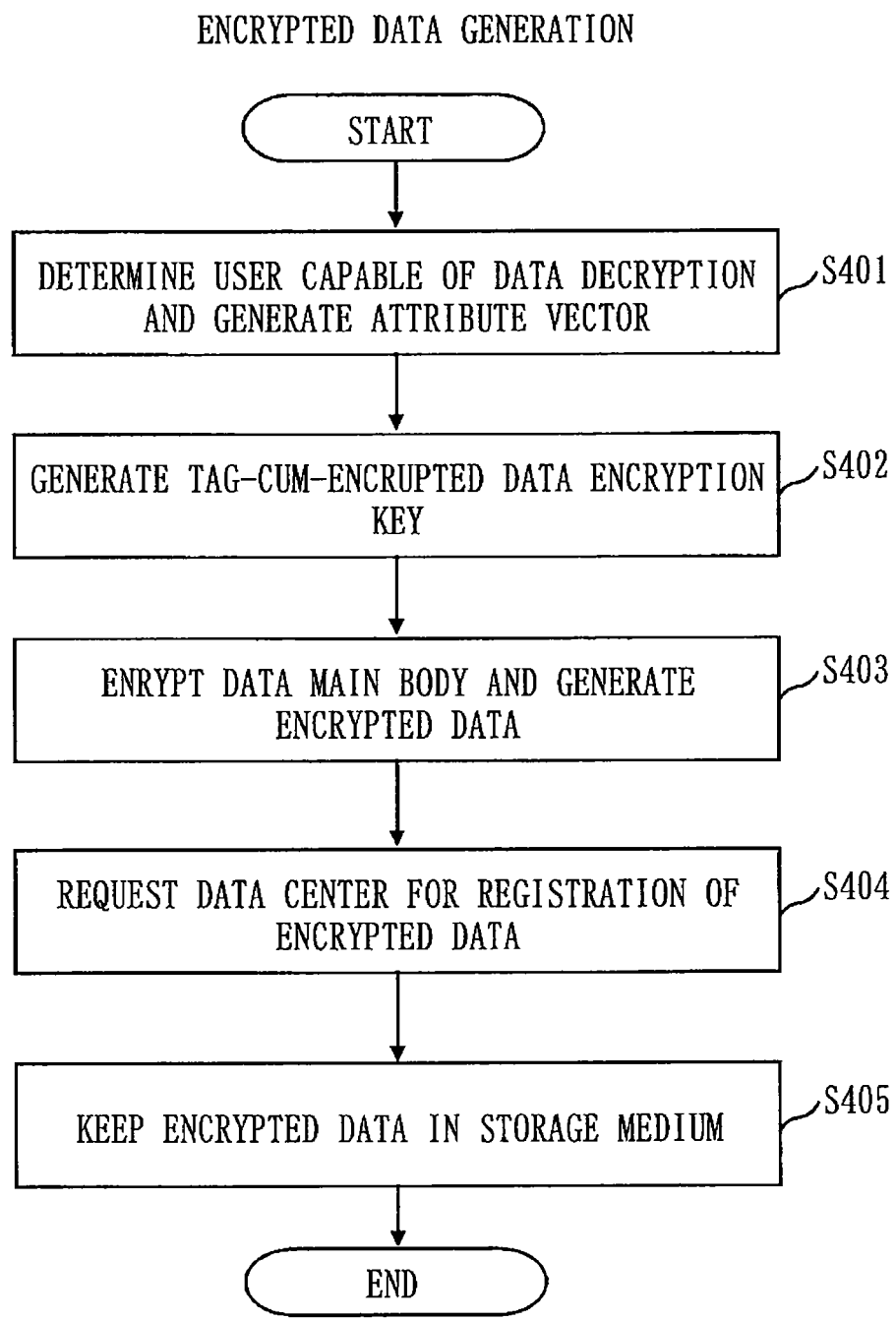

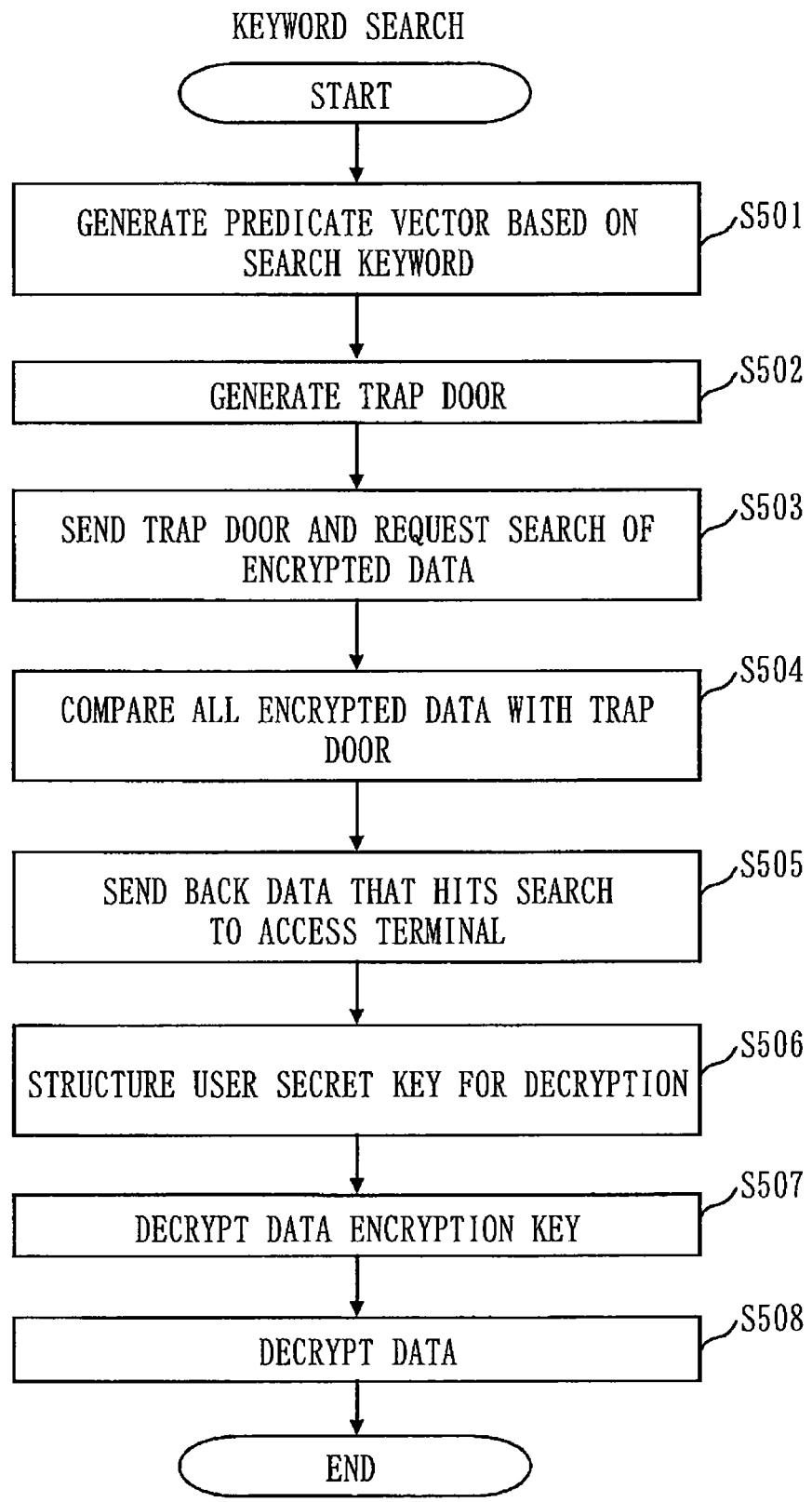

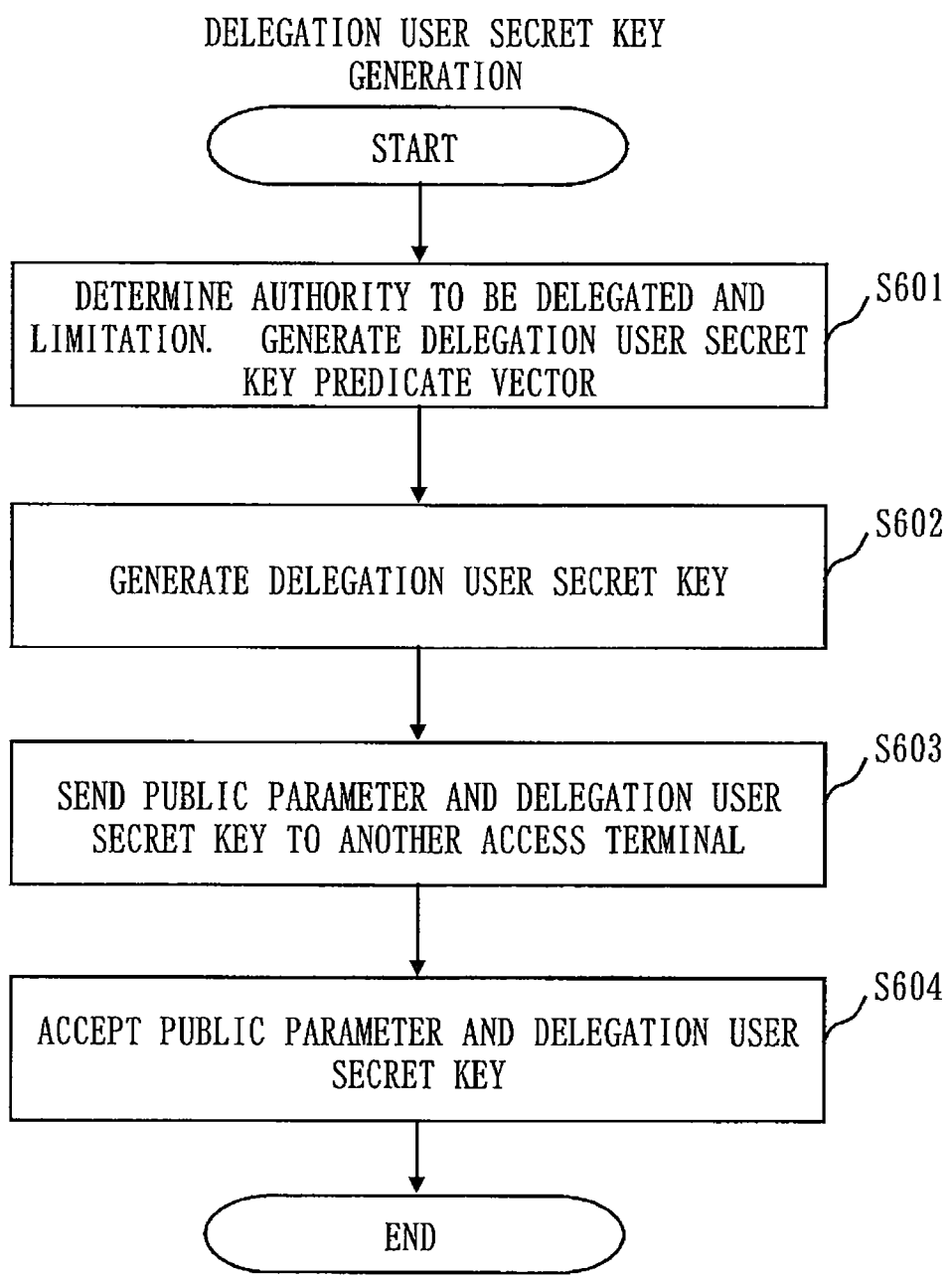

Fig. 47

| SYSTEM COMMON ATTRIBUTE INFORMATION CODED SEQUENCE |
|---|

| INDIVIDUAL ID | * |
|---|---|

BELONGING-OFFICE INFORMATION CODED SEQUENCE

| COMPANY | BUSINESS PLACE | DEPARTMENT | SECTION | UNIT |
|---|---|---|---|---|
| * | * | * | * | * |

POST INFORMATION CODED SEQUENCE

| EXECUTIVE | DIRECTOR | MANAGER | CHIEF | SUBCHIEF | STAFF |
|---|---|---|---|---|---|
| * | * | * | * | * | * |

CATEGORY CODED SEQUENCE

| MAJOR CATEGORY | MEDIUM CATEGORY | MINOR CATEGORY |
|---|---|---|
| * | * | * |

SECRET LEVEL CODED SEQUENCE

| TOP SECRET | SECRET | IN-HOUSE SECRET | NON-RELEVANCE |
|---|---|---|---|
| * | * | * | * |

EMPLOYMENT TYPE CODED SEQUENCE

| MAJOR CAREER | GENERAL CAREER | VISITING STAFF | AFFILIATE STAFF | DISPATCHED STAFF | OTHER TYPE |
|---|---|---|---|---|---|
| * | * | * | * | * | * |

TERM INFORMATION CODED SEQUENCE

| YEAR 2007 | YEAR 2008 | YEAR 2009 | YEAR 2010 | YEAR 2011 | YEAR 2012 |
|---|---|---|---|---|---|
| * | * | * | * | * | * |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| * | * | * | * | * |

| KEY USAGE FLAG | * |
|---|---|

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

Fig. 49
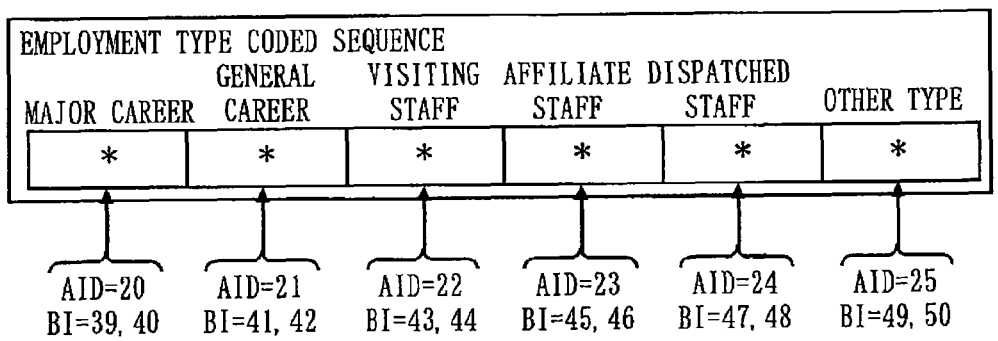
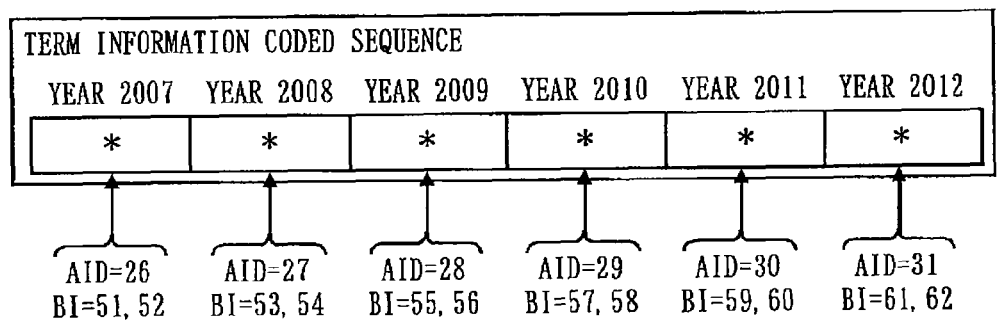
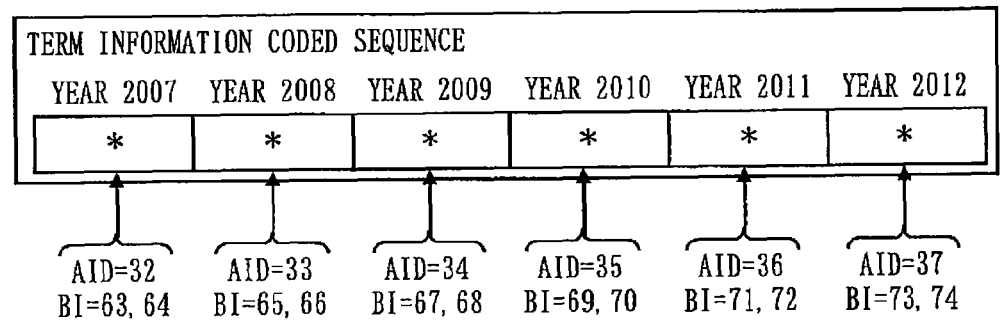
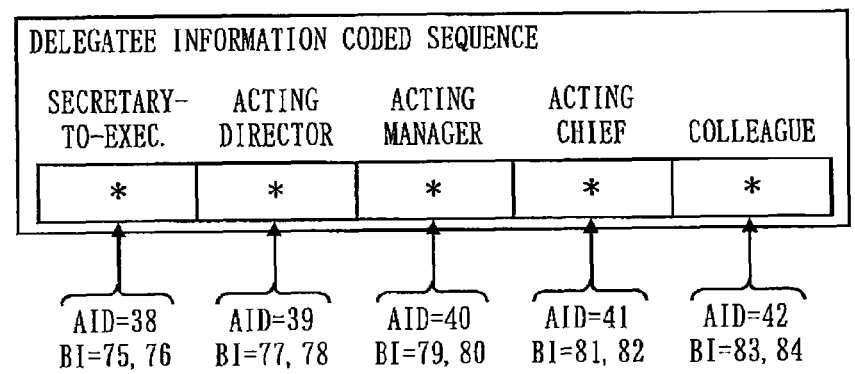

Fig. 52

USER ATTRIBUTE INFORMATION DATABASE

| INDIVIDUAL ID | BELONGING-OFFICE INFORMATION | POST INFORMATION | DATA CATEGORY | SECRET LEVEL | EMPLOYMENT TYPE | REGISTERED SINCE |
|---|---|---|---|---|---|---|
| TANAKA | HQ./ACCOUNTING DEPT. | MANAGER | ALL | ALL | MAJOR CAREER | 2005/4~ |
| ................ | ................ | ................ | ................ | ................ | ................ | ................ |

Fig. 53

INTERIM SECRET KEY ATTRIBUTE INFORMATION CODED SEQUENCE

INDIVIDUAL ID: *

BELONGING-OFFICE INFORMATION CODED INFORMATION

| COMPANY | BUSINESS PLACE | DEPARTMENT | SECTION | UNIT |
|---|---|---|---|---|
| A COMPANY | HQ. | * | * | * |

POST INFORMATION CODED SEQUENCE

| EXECUTIVE | DIRECTOR | MANAGER | CHIEF | SUBCHIEF | STAFF |
|---|---|---|---|---|---|
| * | * | * | * | * | * |

CATEGORY CODED SEQUENCE

| MAJOR CATEGORY | MEDIUM CATEGORY | MINOR CATEGORY |
|---|---|---|
| * | * | * |

SECRET LEVEL CODED SEQUENCE

| TOP SECRET | SECRET | IN-HOUSE SECRET | NON-RELEVANCE |
|---|---|---|---|
| * | * | * | * |

EMPLOYMENT TYPE CODED SEQUENCE

| MAJOR CAREER | GENERAL CAREER | VISITING STAFF | AFFILIATE STAFF | DISPATCHED STAFF | OTHER TYPE |
|---|---|---|---|---|---|
| * | * | * | * | * | * |

TERM INFORMATION CODED SEQUENCE

| YEAR 2007 | YEAR 2008 | YEAR 2009 | YEAR 2010 | YEAR 2011 | YEAR 2012 |
|---|---|---|---|---|---|
| * | * | * | * | * | * |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| * | * | * | * | * |

KEY USAGE FLAG: *

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

Fig. 54

USER SECRET KEY ATTRIBUTE INFORMATION CODED SEQUENCE

INDIVIDUAL ID: TANAKA

BELONGING-OFFICE INFORMATION CODED SEQUENCE

| COMPANY | BUSINESS PLACE | DEPARTMENT | SECTION | UNIT |
|---|---|---|---|---|
| A COMPANY | HQ. | GENERAL AFFAIR DEPT. | GENERAL AFFAIR SECTION | WELFARE |

POST INFORMATION CODED SEQUENCE

| EXECUTIVE | DIRECTOR | MANAGER | CHIEF | SUBCHIEF | STAFF |
|---|---|---|---|---|---|
| * | * | * | * | * | 1 |

CATEGORY CODED SEQUENCE

| MAJOR CATEGORY | MEDIUM CATEGORY | MINOR CATEGORY |
|---|---|---|
| * | * | * |

SECRET LEVEL CODED SEQUENCE

| TOP SECRET | SECRET | IN-HOUSE SECRET | NON-RELEVANCE |
|---|---|---|---|
| R | 1 | 1 | 1 |

EMPLOYMENT TYPE CODED SEQUENCE

| MAJOR CAREER | GENERAL CAREER | VISITING STAFF | AFFILIATE STAFF | DISPATCHED STAFF | OTHER TYPE |
|---|---|---|---|---|---|
| 1 | * | * | * | * | * |

TERM INFORMATION CODED SEQUENCE

| YEAR 2007 | YEAR 2008 | YEAR 2009 | YEAR 2010 | YEAR 2011 | YEAR 2012 |
|---|---|---|---|---|---|
| 1 | 1 | 1 | 1 | R | R |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| * | * | * | * | * |

KEY USAGE FLAG: *

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

Fig. 55

ATTRIBUTE INFORMATION CODED SEQUENCE OF ENCRYPTED DATA

INDIVIDUAL ID: *

BELONGING-OFFICE INFORMATION CODED SEQUENCE

| COMPANY | BUSINESS PLACE | DEPARTMENT | SECTION | UNIT |
|---|---|---|---|---|
| A COMPANY | HQ. | GENERAL AFFAIR DEPT. | GENERAL AFFAIR SECTION | * |

POST INFORMATION CODED SEQUENCE

| EXECUTIVE | DIRECTOR | MANAGER | CHIEF | SUBCHIEF | STAFF |
|---|---|---|---|---|---|
| * | * | * | * | * | * |

CATEGORY CODED SEQUENCE

| MAJOR CATEGORY | MEDIUM CATEGORY | MINOR CATEGORY |
|---|---|---|
| BUDGET PLANNING | FISCAL YR. 2009 | GOODS |

SECRET LEVEL CODED SEQUENCE

| TOP SECRET | SECRET | IN-HOUSE SECRET | NON-RELEVANCE |
|---|---|---|---|
| * | * | 1 | * |

EMPLOYMENT TYPE CODED SEQUENCE

| MAJOR CAREER | GENERAL CAREER | VISITING STAFF | AFFILIATE STAFF | DISPATCHED STAFF | OTHER TYPE |
|---|---|---|---|---|---|
| 1 | 1 | R | R | R | R |

TERM INFORMATION CODED SEQUENCE

| YEAR 2007 | YEAR 2008 | YEAR 2009 | 2YEAR 010 | YEAR 2011 | YEAR 2012 |
|---|---|---|---|---|---|
| * | * | 1 | * | * | * |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| R | R | R | R | R |

KEY USAGE FLAG: $\rho$

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| 15 | YR. 2009 | OCT. | DAY 5 | P C | 3 | 100,000 YEN | PURCHASE |

Fig. 56

SEARCH ATTRIBUTE INFORMATION CODED SEQUENCE

| INDIVIDUAL ID | TANAKA |
|---|---|

BELONGING-OFFICE INFORMATION CODED SEQUENCE

| COMPANY | BUSINESS PLACE | DEPARTMENT | SECTION | UNIT |
|---|---|---|---|---|
| A COMPANY | HQ. | GENERAL AFFAIR | GENERAL AFFAIR | WELFARE |

POST INFORMATION CODED SEQUENCE

| EXECUTIVE | DIRECTOR | MANAGER | CHIEF | SUBCHIEF | STAFF |
|---|---|---|---|---|---|
| * | * | * | * | * | 1 |

CATEGORY CODED SEQUENCE

| MAJOR CATEGORY | MEDIUM CATEGORY | MINOR CATEGORY |
|---|---|---|
| * | * | * |

SECRET LEVEL CODED SEQUENCE

| TOP SECRET | SECRET | IN-HOUSE SECRET | NON-RELEVANCE |
|---|---|---|---|
| R | 1 | 1 | 1 |

EMPLOYMENT TYPE CODED SEQUENCE

| MAJOR CAREER | GENERAL CAREER | VISITING STAFF | AFFILIATE | AFFILIATE STAFF | OTHER TYPE |
|---|---|---|---|---|---|
| 1 | * | * | * | * | * |

TERM INFORMATION CODED SEQUENCE

| YEAR 2007 | YEAR 2008 | YEAR 2009 | YEAR 2010 | YEAR 2011 | YEAR 2012 |
|---|---|---|---|---|---|
| 1 | 1 | 1 | 1 | R | R |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| * | * | * | * | * |

| KEY USAGE FLAG | 0 |
|---|---|

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | YR. 2009 | * | * | * | * | * | PURCHASE |

Fig. 57

| DELEGATION USER SECRET KEY ATTRIBUTE INFORMATION CODED SEQUENCE |||||
|---|---|---|---|---|
| INDIVIDUAL ID | TANAKA ||||

| BELONGING-OFFICE INFORMATION CODED SEQUENCE |||||
|---|---|---|---|---|
| COMPANY | BUSINESS PLACE | DEPARTMENT | SECTION | UNIT |
| COMPANY A | HQ. | GENERAL AFFAIR | GENERAL AFFAIR | FRINGE BENEFIT |

| POST INFORMATION CODED SEQUENCE ||||||
|---|---|---|---|---|---|
| EXECUTIVE | DIRECTOR | MANAGER | CHIEF | SUBCHIEF | STAFF |
| * | * | * | * | * | 1 |

| CATEGORY CODED SEQUENCE | MAJOR CATEGORY | MEDIUM CATEGORY | MINOR CATEGORY |
|---|---|---|---|
|  | * | * | * |

| SECRET LEVEL CODED SEQUENCE | TOP SECRET | SECRET | IN-HOUSE SECRET | NON-RELEVANCE |
|---|---|---|---|---|
|  | R | 1 | 1 | 1 |

| EMPLOYMENT TYPE CODED SEQUENCE ||||||
|---|---|---|---|---|---|
| MAJOR CAREER | GENERAL CAREER | VISITING STAFF | AFFILIATE STAFF | DISPATCHED STAFF | OTHER TYPE |
| 1 | * | * | * | * | * |

| TERM INFORMATION CODED SEQUENCE ||||||
|---|---|---|---|---|---|
| YEAR 2007 | YEAR 2008 | YEAR 2009 | YEAR 2010 | YEAR 2011 | YEAR 2012 |
| 1 | 1 | 1 | 1 | R | R |

| DELEGATEE INFORMATION CODED SEQUENCE |||||
|---|---|---|---|---|
| SECRETARY-TO-EXEC. | ACTING DIRECTOR | ACTING MANAGER | ACTING CHIEF | COLLEAGUE |
| * | * | * | * | 1 |

| KEY USAGE FLAG | * |
|---|---|

| SEARCH QUERY CODED SEQUENCE ||||||||
|---|---|---|---|---|---|---|---|
| COLUMN 1 | COLUMN 2 | COLUMN 3 | COLUMN 4 | COLUMN 5 | COLUMN 6 | COLUMN 7 | COLUMN 8 |
| * | YR. 2009 | * | * | * | * | * | * |

Fig. 64

GROUP CERTIFICATE ATTRIBUTE INFORMATION CODED SEQUENCE 1

INDIVIDUAL ID: TANAKA

BELONGING-OFFICE INFORMATION CODED SEQUENCE

| COMPANY | BUSINESS PLACE | DEPARTMENT | SECTION | UNIT |
|---|---|---|---|---|
| A COMPANY | HQ. | GENERAL AFFAIR | GENERAL AFFAIR | WELFARE |

POST INFORMATION CODED SEQUENCE

| EXECUTIVE | DIRECTOR | MANAGER | CHIEF | SUBCHIEF | STAFF |
|---|---|---|---|---|---|
| * | * | * | * | * | 1 |

CATEGORY CODED SEQUENCE

| MAJOR CATEGORY | MEDIUM CATEGORY | MINOR CATEGORY |
|---|---|---|
| * | * | * |

SECRET LEVEL CODED SEQUENCE

| TOP SECRET | SECRET | IN-HOUSE SECRET | NON-RELEVANCE |
|---|---|---|---|
| R | 1 | 1 | 1 |

EMPLOYMENT TYPE CODED SEQUENCE

| MAJOR CAREER | GENERAL CAREER | VISITING STAFF | AFFILIATE STAFF | DISPATCHED STAFF | OTHER TYPE |
|---|---|---|---|---|---|
| 1 | * | * | * | * | * |

TERM INFORMATION CODED SEQUENCE

| YEAR 2007 | YEAR 2008 | YEAR 2009 | YEAR 2010 | YEAR 2011 | YEAR 2012 |
|---|---|---|---|---|---|
| 1 | R | R | R | R | R |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| * | * | * | * | * |

KEY USAGE FLAG: *

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

Fig. 65

| GROUP CERTIFICATE ATTRIBUTE INFORMATION CODED SEQUENCE 2 |
|---|

INDIVIDUAL ID: TANAKA

BELONGING-OFFICE INFORMATION CODED SEQUENCE

| COMPANY | BUSINESS PLACE | DEPARTMENT | SECTION | UNIT |
|---|---|---|---|---|
| A COMPANY | HQ. | GENERAL AFFAIR | GENERAL AFFAIR | WELFARE |

POST INFORMATION CODED SEQUENCE

| EXECUTIVE | DIRECTOR | MANAGER | CHIEF | SUBCHIEF | STAFF |
|---|---|---|---|---|---|
| * | * | * | * | * | 1 |

CATEGORY CODED SEQUENCE

| MAJOR CATEGORY | MEDIUM CATEGORY | MINOR CATEGORY |
|---|---|---|
| * | * | * |

SECRET LEVEL CODED SEQUENCE

| TOP SECRET | SECRET | IN-HOUSE SECRET | NON-RELEVANCE |
|---|---|---|---|
| R | 1 | 1 | 1 |

ENPLOYMENT TYPE CODED SEQUENCE

| MAJOR CAREER | GENERAL CAREER | VISITING STAFF | AFFILIATE STAFF | DISPATCHED STAFF | OTHER TYPE |
|---|---|---|---|---|---|
| 1 | * | * | * | * | * |

TERM INFORMATION CODED SEQUENCE

| YEAR 2007 | YEAR 2008 | YEAR 2009 | YEAR 2010 | YEAR 2011 | YEAR 2012 |
|---|---|---|---|---|---|
| 1 | 1 | 1 | 1 | R | R |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| * | * | * | * | * |

KEY USAGE FLAG: *

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

Fig. 66

GROUP CERTIFICATE ATTRIBUTE INFORMATION CODED SEQUENCE 3

INDIVIDUAL ID: TANAKA

BELONGING-OFFICE INFORMATION CODED SEQUENCE

| COMPANY | BUSINESS PLACE | DEPARTMENT | SECTION | UNIT |
|---|---|---|---|---|
| COMPANY A | HQ. | GENERAL AFFAIR | GENERAL AFFAIR | WELFARE |

POST INFORMATION CODED SEQUENCE

| EXECUTIVE | DIRECTOR | MANAGER | CHIEF | SUBCHIEF | STAFF |
|---|---|---|---|---|---|
| * | * | * | * | 1 | * |

CATEGORY CODED SEQUENCE

| MAJOR CATEGORY | MEDIUM CATEGORY | MINOR CATEGORY |
|---|---|---|
| * | * | * |

SECRET LEVEL CODED SEQUENCE

| TOP SECRET | SECRET | IN-HOUSE SECRET | NON-RELEVANCE |
|---|---|---|---|
| R | 1 | 1 | 1 |

EMPLOYMENT TYPE CODED SEQUENCE

| MAJOR CAREER | GENERAL CAREER | VISITING STAFF | AFFILIATE STAFF | DISPATCHED STAFF | OTHER TYPE |
|---|---|---|---|---|---|
| 1 | * | * | * | * | * |

TERM INFORMATION CODED SEQUENCE

| YEAR 2007 | YEAR 2008 | YEAR 2009 | YEAR 2010 | YEAR 2011 | YEAR 2012 |
|---|---|---|---|---|---|
| R | R | R | 1 | R | R |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| * | * | * | * | * |

KEY USAGE FLAG: *

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

Fig. 67

GROUP CERTIFICATE ATTRIBUTE INFORMATION CODED SEQUENCE 4

INDIVIDUAL ID: TANAKA

BELONGING-OFFICE INFORMATION CODED SEQUENCE

| COMPANY | BUSINESS PLACE | DEPARTMENT | SECTION | UNIT |
|---|---|---|---|---|
| A COMPANY | HQ. | GENERAL AFFAIR | PERSONNEL | RECRUITMENT |

POST INFORMATION CODED SEQUENCE

| EXECUTIVE | DIRECTOR | MANAGER | CHIEF | SUBCHIEF | STAFF |
|---|---|---|---|---|---|
| * | * | * | * | 1 | * |

CATEGORY CODED SEQUENCE

| MAJOR CATEGORY | MEDIUM CATEGORY | MINOR CATEGORY |
|---|---|---|
| * | * | * |

SECRET LEVEL CODED SEQUENCE

| TOP SECRET | SECRET | IN-HOUSE SECRET | NON-RELEVANCE |
|---|---|---|---|
| R | 1 | 1 | 1 |

EMPLOYMENT TYPE CODED SEQUENCE

| MAJOR CAREER | GENERAL CAREER | VISITING STAFF | AFFILIATE STAFF | DISPATCHED STAFF | OTHER TYPE |
|---|---|---|---|---|---|
| 1 | * | * | * | * | * |

TERM INFORMATION CODED SEQUENCE

| YEAR 2007 | YEAR 2008 | YEAR 2009 | YEAR 2010 | YEAR 2011 | YEAR 2012 |
|---|---|---|---|---|---|
| R | R | R | R | 1 | R |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| * | * | * | * | * |

KEY USAGE FLAG: *

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

Fig. 68

GROUP CERTIFICATE ATTRIBUTE INFORMATION CODED SEQUENCE 5

INDIVIDUAL ID: TANAKA

BELONGING-OFFICE INFORMATION CODED SEQUENCE

| COMPANY | BUSINESS PLACE | DEPARTMENT | SECTION | UNIT |
|---|---|---|---|---|
| A COMPANY | HQ. | GENERAL AFFAIR | PERSONNEL | RECRUITMENT |

POST INFORMATION CODED SEQUENCE

| EXECUTIVE | DIRECTOR | MANAGER | CHIEF | SUBCHIEF | STAFF |
|---|---|---|---|---|---|
| * | * | * | * | 1 | * |

CATEGORY CODED SEQUENCE

| MAJOR CATEGORY | MEDIUM CATEGORY | MINOR CATEGORY |
|---|---|---|
| * | * | * |

SECRET LEVEL CODED SEQUENCE

| TOP SECRET | SECRET | IN-HOUSE SECRET | NON-RELEVANCE |
|---|---|---|---|
| R | 1 | 1 | 1 |

EMPLOYMENT TYPE CODED SEQUENCE

| MAJOR CAREER | GENERAL CAREER | VISITING STAFF | AFFILIATE STAFF | DISPATCHED STAFF | OTHER TYPE |
|---|---|---|---|---|---|
| 1 | * | * | * | * | * |

TERM INFORMATION CODED SEQUENCE

| YEAR 2007 | YEAR 2008 | YEAR 2009 | YEAR 2010 | YEAR 2011 | YEAR 2012 |
|---|---|---|---|---|---|
| R | R | R | 1 | 1 | R |

DELEGATEE INFORMATION CODED SEQUENCE

| SECRETARY-TO-EXEC. | ACTING DIRECTOR | ACTING MANAGER | ACTING CHIEF | COLLEAGUE |
|---|---|---|---|---|
| * | * | * | * | * |

KEY USAGE FLAG: *

SEARCH QUERY CODED SEQUENCE

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

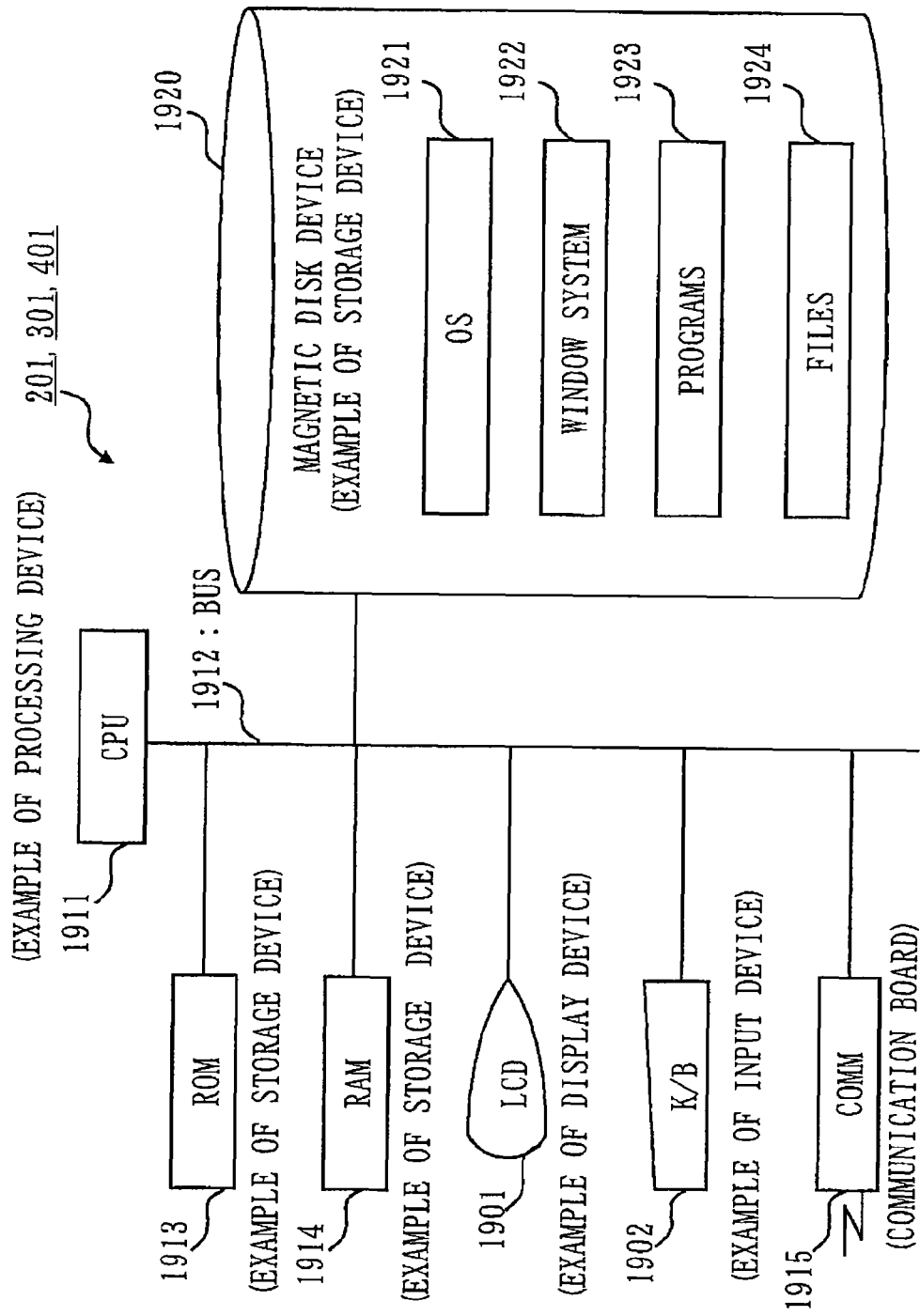

CONFIDENTIAL SEARCH SYSTEM AND CRYPTOGRAPHIC PROCESSING SYSTEM

TECHNICAL FIELD

The present invention relates to an inner-product predicate encryption, and confidential search which searches information in an encrypted state by using an inner-product predicate encryption.

BACKGROUND ART

In recent years, when data is to be kept in a recording medium such as a hard disk, it is becoming more and more common to encrypt the data by using a common key of a user who is the administrator of the data, so that the secret of the data is secured. In this case, the user can utilize the data by decrypting the encrypted data with the common key of his or her own.

For example, in Windows (registered trademark) of Microsoft (registered trademark) Co., Ltd., an encryption file system called EFS has been realized. In this encryption file system, a file (data) stored in a hard disk is encrypted by using a common key which is managed by Windows (registered trademark) by relating it to a login name.

The content of the encrypted data cannot be known unless the encrypted data is decrypted. If the user attempts to search whether the data includes a predetermined keyword, the entire data need be decrypted, which is disadvantageous.

For example, in enterprises, to manage secret information in a lump by a file server is becoming common. Let us suppose that data stored in the server is encrypted data. In this case, it is necessary to download every encrypted data stored in the server to the terminal side, decrypt the data, and then perform keyword search. Hence, depending on the communication channel, the entire process may take a very long time, and communication by other users may also be delayed.

As a method of solving these problems, a technique called confidential search is available which enables keyword search of data in an encrypted state without decrypting the encrypted data.

Patent Literature 1 and Non-Patent Literature 3 describe a confidential search scheme according to which information called tag is added to encrypted data, so that keyword search can be performed without decrypting the encrypted data.

In confidential search described in Non-Patent Literature 3, when an arbitrary user is to encrypt data for a user A, a tag is generated by encrypting a keyword by using the public key of the user A, the tag is attached to the encrypted data, and the encrypted data is kept in the server. According to this scheme, only the user A who possesses a secret key corresponding to the public key used for encrypting the keyword can search the encrypted data.

Confidential search described in Non-Patent Literature 3 is realized based on public key encryption. As opposed to this, confidential search described in Patent Literature 1 is realized based on common key encryption such as Caesar cipher. Therefore, only the user who knows the common key can encrypt the data (generate a tag) and search the data.

CITATION LIST

Patent Literature

Patent Literature 1: JP 2002-278970
Patent Literature 2: JP 2008-176040
Patent Literature 3 JP 2008-288837

Non-Patent Literature

Non-Patent Literature 1: T. Okamoto, K. Takashima, "Homomorphic encryption and signatures from vector decomposition", Pairing 2008, Lecture Notes in Computer Science, Vol. 5209, 2008.
Non-Patent Literature 2: T. Okamoto, K. Takashima, "Hierarchical Predicate Encryption for Inner-Products", ASIACRYPT 2009, Lecture Notes in Computer Science, Vol. 5912, 2009.
Non-Patent Literature 3: D. Boneh, G. D. Crescenzo, R. Ostrovsky, G. Persiano, "Public Key Encryption with Keyword Search", EUROCRYPT 2004, Lecture Notes in Computer Science, Vol. 3027, 2004.
Non-Patent Literature 4: J. Katz, A. Sahai, B. Waters, "Predicate Encryption Supporting Disjunctions, Polynomial Equations, and Inner Products", EUROCRYPT 2008, Lecture Notes in Computer Science, Vol. 4965, 2008.
Non-Patent Literature 5: H. A. Park, J. W. Byun, D. H. Lee, "Secure Index Search for Groups", TrustBus 2005, Lecture Notes in Computer Science, Vol. 3592, 2005.
Non-Patent Literature 6: P. Wang, H. Wang, J. Pieprzyk, "Keyword Field-Free Conjunctive Keyword Searches on Encrypted Data and Extension for Dynamic Groups", CANS 2008, Lecture Notes in Computer Science, Vol. 5339, 2008.

SUMMARY OF INVENTION

Technical Problem

With conventional confidential search, however, when data is shared in a group, searchable data cannot be flexibly controlled depending on the role or authority of the user.

It is an object of the present invention to realize confidential search that can flexibly control searchable data depending on the role or authority of the user when the data is shared in a group.

Solution to Problem

A confidential search system according to the present invention includes an encrypted data accumulation device which accumulates encrypted data, and a search device which searches encrypted data that satisfies a predetermined search condition, from the encrypted data accumulated in the encrypted data accumulation device, wherein the encrypted data accumulation device includes an encrypted data accumulation part which accumulates encrypted data including an encryption vector c1 in which respective elements of an attribute vector generated from first attribute information indicating a searchable range are set as a coefficient for one or more of basis vectors of basis vectors $b_i$ (i=1, . . . , n) (n is an integer of 2 or more) that constitute a predetermined basis B, in a storage device, wherein the search device includes a user secret key storage part which stores a key vector $k^*_{L,0}$ in which respective elements of a first predicate vector generated from second attribute information indicating an attribute of a user are set as the coefficient for one or more, but not all, of basis vectors of basis vectors $b_i$ (i=1, . . . , n) that constitute a predetermined basis B*, in the storage device, a trap door generation part which generates a search condition vector SV in which respective elements of a second predicate vector generated from third attribute information indicating the predetermined search condition are set as the coefficient for a predetermined basis vector, where the elements of the first predicate vector are not set, in the key vector $k^*_{L,0}$ stored in the user secret key storage part, and which generates a vector obtained by adding the search condition vector SV generated, to the key vector $k^*_{L,0}$, as a trap door X with a processing device, and a data transmission part which transmits the trap door X generated by the trap door generation part to the encrypted data accumulation device via a communication device, and wherein the encrypted data accumulation device further includes a search execution part which searches encrypted data that satisfies the search condition, among the encrypted data accumulated by the encrypted data accumulation part, by conducting a predetermined computation with the processing device using the encryption vector c1 included in the encrypted data accumulated by the encrypted data accumulation part and the trap door X transmitted by the data transmission part, and by checking whether or not the encrypted data satisfies the search condition based on a result obtained by the predetermined computation.

Advantageous Effects of Invention

In a confidential search system according to the present invention, an attribute vector is set depending on the role or authority of a user who can search, and a predicate vector is set depending on the role or authority of a user who uses a key vector, so that if data is shared in a group, searchable data can be searched can be controlled.

BRIEF DESCRIPTION OF DRAWINGS

FIG. 11 is an illustration showing a structure example of a belonging-office information coded sequence 503.

FIG. 12 is an illustration showing setting examples of the belonging-office information coded sequence 503.

FIG. 13 is an illustration showing a structure example of a post information coded sequence 504.

FIG. 14 is an illustration showing setting examples of the post information coded sequence 504 according to the first setting.

FIG. 15 is an illustration showing setting examples of the post information coded sequence 504 according to the second setting.

FIG. 16 is an illustration showing a structure example of a category coded sequence 505.

FIG. 17 is an illustration showing setting examples of the category coded sequence 505.

FIG. 19 is an illustration showing setting examples of the secret level coded sequence 506 according to the first setting.

FIG. 20 is an illustration showing setting examples of the secret level coded sequence 506 according to the second setting.

FIG. 21 is an illustration showing a structure example of an employment type coded sequence 507.

FIG. 22 is an illustration showing setting examples of the employment type coded sequence 507 according to the first setting.

FIG. 23 is an illustration showing setting examples of the employment type coded sequence 507 according to the second setting.

FIG. 25 is an illustration showing setting examples of the term information coded sequence 508 according to the first setting of the structure example 1.

FIG. 26 is an illustration showing setting examples of the term information coded sequence 508 according to the second setting of the structure example 1.

FIG. 28 is an illustration showing setting examples of the term information coded sequence 508 of the structure example 2.

FIG. 29 is an illustration showing setting examples of the term information coded sequence 508 of the structure example 2.

FIG. 30 is an illustration showing setting examples of the term information coded sequence 508 of the structure example 2.

FIG. 32 is an illustration showing setting examples of the structure example 3 of the term information coded sequence 508.

FIG. 33 is an illustration showing a structure example of a delegatee information coded sequence 509.

FIG. 34 is an illustration showing setting examples of the delegatee information coded sequence 509.

FIG. 36 is an illustration showing a setting example 1 of a search query coded sequence 511.

FIG. 37 is an illustration showing a setting example 2 of the search query coded sequence 511.

FIG. 38 is an illustration explaining a vectorization method in a case where comparison of a coded sequence in the attribute information coded sequence 501 is to be performed by AND test.

FIG. 39 is an illustration explaining a vectorization method in a case where comparison of a coded sequence in the attribute information coded sequence 501 is to be performed by OR test.

FIG. 40 is an illustration explaining a vectorization method in a case where comparison of a coded sequence in the attribute information coded sequence 501 is to be performed by inclusion relation test.

FIG. 43 is a flowchart showing the flow of the process of (3) user secret key generation.

FIG. 44 is a flowchart showing the flow of the process of (4) encrypted data generation.

FIG. 45 is a flowchart showing the flow of the process of (5) keyword search.

FIG. 46 is a flowchart showing the flow of the process of (6) delegation user secret key generation.

FIG. 47 is an illustration showing a structure example of the attribute information coded sequence 501 employed by the confidential search system 100.

FIG. 49 is an illustration showing an assignment example of AID which is the attribute ID and an assignment example of the index number BI in AND test.

FIG. 52 is a table showing a structure example of a user attribute information database.

FIG. 53 is an illustration showing an example of an interim secret key attribute information coded sequence.

FIG. 54 is an illustration showing an example of a user secret key attribute information coded sequence.

FIG. 55 is an illustration showing an example of an encrypted data attribute information coded sequence.

FIG. 56 is an illustration showing an example of a search attribute information coded sequence.

FIG. 57 is an illustration showing an example of a delegation user secret key attribute information coded sequence.

FIG. 64 is an illustration showing an example of an attribute information coded sequence 501 concerning a group certificate.

FIG. 65 is an illustration showing an example of the attribute information coded sequence 501 concerning a group certificate.

FIG. 66 is an illustration showing an example of the attribute information coded sequence 501 concerning a group certificate.

FIG. 67 is an illustration showing an example of the attribute information coded sequence 501 concerning a group certificate.

FIG. 68 is an illustration showing an example of the attribute information coded sequence 501 concerning a group certificate.

FIG. 69 is an illustration showing an example of the hardware configuration of the key management server 201, access terminal 301, and data center 401.

DESCRIPTION OF EMBODIMENTS

Figure 1:
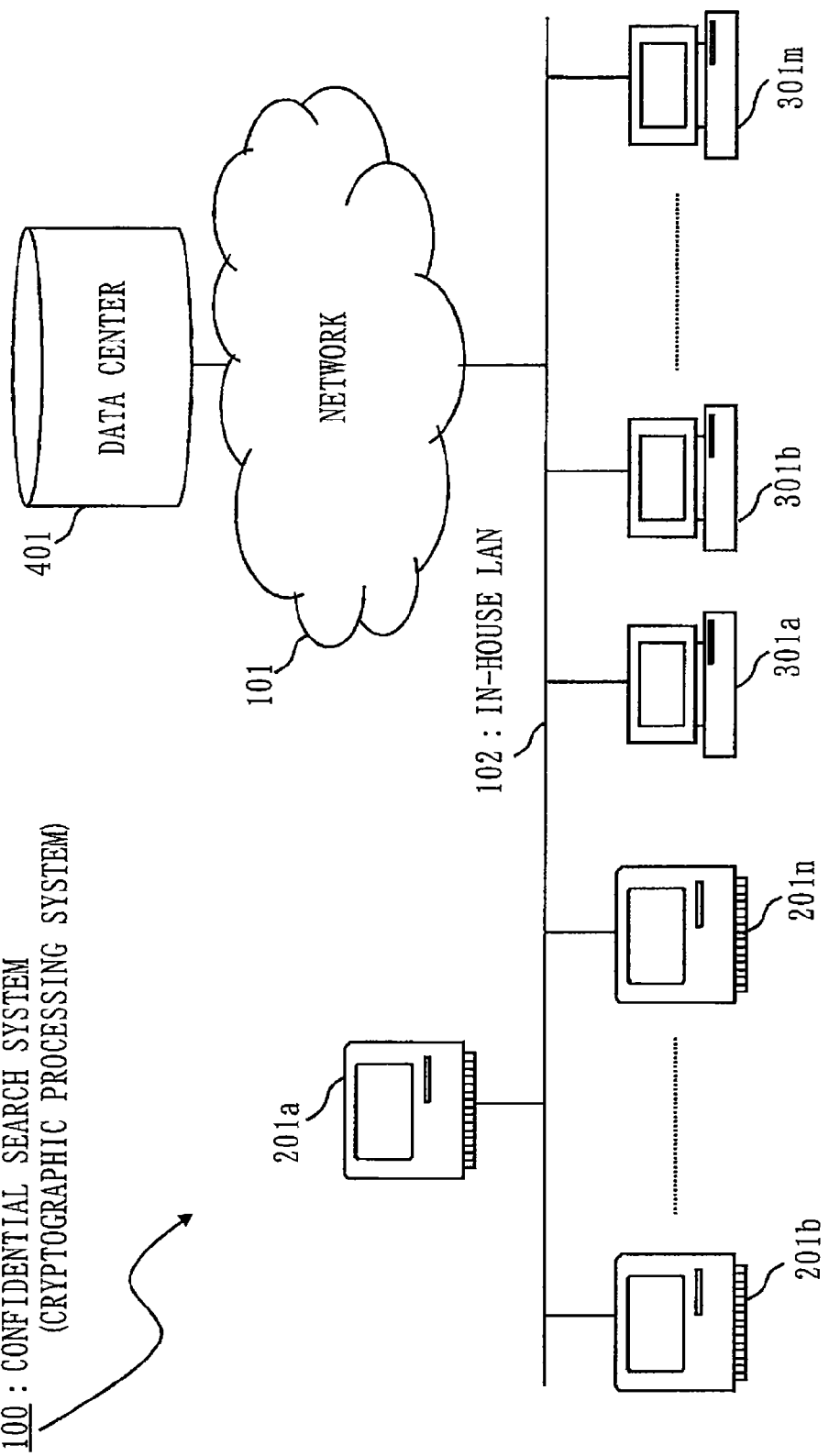
FIG. 1 is an illustration showing a configuration of a confidential search system 100.

Embodiments of the present invention will be described with reference to the accompanying drawings.

In the following description, note that Formula 101 indicates selecting y uniformly from A. Namely, in Formula 101, y is a uniform random number.

$$y \xleftarrow{U} A \qquad \text{[Formula 101]}$$

In the following description, the processing device is, for example, a CPU 1911 to be described later. The storage device is, for example, a ROM 1913, a RAM 1914, or a magnetic disk 1920 to be described later. The communication device is, for example, a communication board 1915 to be described later. The input device is, for example, a keyboard 1902 or the communication board 1915 to be described later. Namely, the processing device, storage device, communication device, and input device are hardware.

In the following description, when encrypted data and a tag are to be generated, an encryption called predicate encryption is employed in order to specify the attribute of a user capable of search. The predicate encryption can specify an attribute x when generating encrypted data C by encrypting data M, and can specify a predicate fv when generating a secret key sk. Furthermore, the predicate encryption is a cryptography characterized in that only a user who possesses a secret key sk satisfying a certain condition (for example, fv(x)=1) can decrypt the encrypted data C encrypted with the attribute x.

The specific algorithm of the predicate encryption is described in Non-Patent Literatures 2 and 4. These schemes are an algorithm called inner-product predicate encryption among predicate encryptions. In this inner-product predicate encryption, the user attribute is expressed by an attribute vector $\vec{x}=(x_1, \ldots, x_N)$. This vector is embedded in the encrypted data C. The predicate is expressed by a predicate vector $\vec{v}=(v_1, v_2, \ldots, v_N)$. This vector is embedded in the secret key sk. The user who possesses the secret key sk can decrypt data only when the inner product of the attribute vector and the predicate vector takes a predetermined value (in the explanation, the predetermined value is "0").

In realization of confidential search in which the searchable range and decryptable range can be controlled depending on the role or authority of the user, an attribute vector and a predicate vector suited to the in-house system must be generated by considering the attributes such as the organization information of the enterprise, the post of the staff, and the type and secret level of the document.

For example, Mr/Ms. C belonging to B section, A department has the authority to decrypt encrypted data addressed to the A department and encrypted data addressed to the B section. K however, a plurality of secret keys such as a secret key for the A department and a secret key for the B section are issued to one user, key management becomes complicated for the user. Therefore, it is preferable to be able to search and decrypt all data to which the user is accessible, with only one secret key. In the following embodiments, an attribute vector and a predicate vector that can reduce such cumbersome secret key management are generated.

The algorithm of the inner-product predicate encryption described in Non-Patent Literature 2 will be briefly explained hereinafter by focusing on a range necessary for the following description (for the details, refer to Non-Patent Literature 2).

The inner-product predicate encryption described in Non-Patent Literature 2 is an encryption that uses pairing vector spaces defined using an elliptic curve. A plurality of methods may be available for constituting the pairing vector spaces. An explanation will be made hereinafter based on a method that constitutes pairing vector spaces by using a direct product of an elliptic curve. Generally, a computation on a group on an elliptic curve is often described as a computation on an additive group. In the following explanation, however, all computations including one on a finite field will be described as a computation on a multiplicative group. Although explanation will be made by using symmetric pairing that can be described most simply, it is easy to extend the explanation to a general scheme that employs asymmetric pairing.

Assume that G and $G_T$ are groups each having a prime order q. Assume that $F_q = \{0, 1, \ldots, q-1\}$. Assume that e: $G \times G \to G_T$ is a pairing that satisfies bilinearity (a property with which $e(u^a, v^b) = e(u, v)^{ab}$ is established for arbitrary u, v∈G, a, b∈$F_q$) and non-degenerateness (a property with which g∈G that satisfies $e(g, g) \neq 1$ exists). Assume that the direct product set of N pieces of groups G is $V = G \times G \times \ldots \times G$. An element $x = (g^{x1}, g^{x2}, \ldots, g^{xN}) \in V$ of the direct product set is related to $\vec{x} = (x_1, x_2, \ldots, x_N) = F^N_q$.

At this time, for $x = (g^{x1}, g^{x2}, \ldots, g^{xN}) \in V$, $y = (g^{y1}, g^{y2}, \ldots, g^{yN}) \in V$, and $\alpha \in F_q$, if it is defined that $$x+y = (g^{x1+y1}, g^{x2+y2}, \ldots, g^{xN+yN}) \text{ and}$$
$$\alpha x = (g^{\alpha x1}, g^{\alpha x2}, \ldots, g^{\alpha xN})$$

then V constitutes a vector space.

As the pairing of the vector space V, a pairing for $u = (u_1, u_2, \ldots, u_N) \in V$ and $v = (v_1, v_2, \ldots, v_N) \in V$ is defined as indicated by Formula 102.

$$e(u, v) = \prod_{i=1}^{N} e(u_i, v_i) \qquad \text{[Formula 102]}$$

In the vector space V, let us define the following vectors:

$$a_1 = (g, 1, 1, \ldots, 1), a_2 = (1, g, \ldots, 1), \ldots, a_N = (1, 1, 1, \ldots, g)$$

At this time, $A = (a_1, a_2, \ldots, a_N)$ is the basis of the vector space V. This basis A will be called canonical basis.

When the two vectors $x = (g^{x1}, g^{x2}, \ldots, g^{xN}) \in V$ and $y = (g^{y1}, g^{y2}, \ldots, g^{yN}) \in V$ are given, they can be expressed as $x = x_1 a_1 + x_2 a_2 + \ldots + x_N a_N$ and $y = y_1 a_1 + y_2 a_2 + \ldots + y_N a_N$, respectively, by using the canonical basis A.

The canonical basis A satisfies Formula 103.

$$e(a_i, a_j) = e(g, g)^{\delta_{i,j}} \qquad \text{[Formula 103]}$$

Note that $\delta_{i,j}$ is a Kronecker's delta. This indicates that when the vector $x = x_1 a_1 + x_2 a_2 + \ldots + x_N a_N$ and $y = y_1 a_1 + y_2 a_2 + \ldots + y_N a_N$ are given, their pairing is represented by Formula 104.

$$e(x, y) = \prod_{i=1}^{N} e(g, g)^{x_i \cdot y_i} \qquad \text{[Formula 104]}$$

Assume that $X = (X_{i,j})$ is an N-row, N-column square matrix whose elements are formed of values uniform randomly selected from $F_q$. X which is formed in this manner will form a regular matrix at a very high probability. Formula 105 is defined using such a regular matrix.

$$b_i = \sum_{j=1}^{N} \chi_{i,j} a_j \qquad \text{[Formula 105]}$$

Then, $B = (b_1, b_2, \ldots, b_N)$ also becomes the basis of the vector space V. This basis B will be called a random basis. The respective elements $b_1, b_2, \ldots,$ and $b_N$ of the basis B will be called basis vectors of the basis B.

Let us define $(v_{i,j}) = (X^T)^{-1}$ by using the inverse matrix of the transposed matrix of the matrix X. Formula 106 is defined using this matrix $(v_{i,j})$.

$$b_i^* = \sum_{j=1}^{N} v_{i,j} a_j \qquad \text{[Formula 106]}$$

Then, $B^* = (b^*_1, b^*_2, \ldots, b^*_N)$ also becomes the random basis of the vector space V. Note that the respective elements $b^*_1, b^*_2, \ldots,$ and $b^*_N$ of the basis B* are also called the basis vectors of the basis B*.

In the same manner as the canonical basis A, the random bases B and B* satisfy Formula 107.

$$e(b_i, b_j^*) = e(g, g)^{\delta_{i,j}} \qquad \text{[Formula 107]}$$

Note that $\delta_{i,j}$ is a Kronecker's delta.

This indicates that when the vector $x = x_1 b_1 + x_2 b_2 + \ldots + x_N b_N$ is expressed using the random basis B and the vector $y = y_1 b^*_1 + y_2 b^*_2 + \ldots + y_N b^*_N$ is expressed by using the random basis B*, Formula 108 is established.

$$e(x, y) = \prod_{i=1}^{N} e(g, g)^{x_i \cdot y_i} \qquad \text{[Formula 108]}$$

According to Non-Patent Literature 1, concerning random basis $B = (b_1, b_2, \ldots, b_N)$ in the vector space V, the following property is established. When the elements $(x_1, x_2, \ldots, x_N)$ of $F^N_q$ are given, it is easy to obtain $x = x_1 b_1 + x_2 b_2 + \ldots + x_N b_N$. However, when $x = x_1 b_1 + x_2 b_2 + \ldots + x_L b_L$ ($1 < L \leq N$) is given, it is as difficult to obtain a vector $y = y_1 b^*_1 + y_2 b^*_2 + \ldots + y_l b^*_1$ ($1 \leq l < L$) without using $X = (X_{i,j})$, as a generalized Diffie-Hellman calculation problem.

In Non-Patent Literature 2, the algorithm of the inner-product predicate encryption is constituted by utilizing the above properties.

Embodiment 1

Embodiment 1 will describe a confidential search system 100 (cryptographic processing system) which can search information in an encrypted state.

In Embodiment 1, explanation will be given in the following order.

First, the configuration and function of the confidential search system 100 will be described.

Second, the structure of encrypted data will be described, as well as the flow of the encrypted data and other data.

Third, a method of generating an attribute vector and predicate vector will be described. An attribute information coded sequence 501 will be described first. The attribute information coded sequence 501 serves to generate coded information from which the attribute vector and predicate vector will be generated. Then, a method of generating the attribute vector and predicate vector from coded information generated using the attribute information coded sequence 501 will be described. Although Non-Patent Literatures 2 and 4 describe an inner-product predicate encryption, they do not include a practical method of determining an attribute vector or predicate vector. Particularly, Non-Patent Literatures 2 and 4 do not point out that, in realizing confidential search, unless a common structure is employed for the attribute vector and predicate vector in the entire system, search across all documents cannot be achieved with one trap door. Hence, the method of generating the attribute vector and predicate vector is one significant aspect.

Fourth, the operation of the confidential search system 100 will be described. Namely, a practical method with which the confidential search system 100 implements confidential search will be described. Explanation will be given by separating the operation of the confidential search system 100 into six processes. Note that the explanation will be based on the inner-product predicate encryption described in Non-Patent Literature 2. Non-Patent Literature 2 does not include description on a practical method of implementing confidential search. Hence, the method with which the confidential search system 100 implements confidential search is also another significant aspect.

Assume a situation where data (for example, documents) generated within the enterprise is kept in a data center 401 and respective data are shared in each department and section. Based on the attribute, such as the belonging office, associated with each user (employee), a user secret key is issued to the user. When keeping the data in the data center 401, the data is encrypted by setting attribute information indicating the decryptable range or searchable range, so only an authorized user can decrypt or search the encrypted data.

<1. Configuration and Function of Confidential Search System 100>

FIG. 1 is an illustration showing a configuration of the confidential search system 100.

The confidential search system 100 includes a key management server 201 (201a to 201n), an access terminal 301 (301a to 301m), and the data center 401. The key management server 201 and the access terminal 301 are connected to an in-house LAN 102. The in-house LAN 102 is connected to the data center 401 via a network 101.

The key management server 201 (key generation device) generates public parameters for encryption, and a master key and an interim secret key which are used for issuing a user secret key to the user. The key management server 201 manages the attribute information such as the office to which each user belongs and the post of each user, and issues a user secret key to the employee based on the attribute information. In a general configuration, the master key is managed by, for example, the key management server 201a, and utilized by setting the key management servers 201b to 201n which manage the interim secret key, at each business place.

The access terminal 301 (search device, encryption device, and decryption device) is a PC (Personal Computer) which the user of the enterprise uses. The access terminal 301 encrypts the generated data and keeps it in the data center 401. The access terminal 301 also searches data accumulated in the data center 401, extracts the data from the data center 401, and decrypts and edits the data.

The data center 401 (encrypted data accumulation device) is a server having a large-capacity storage device which keeps the encrypted data generated in the enterprise. As the data is kept in an encrypted state, the data center 401 cannot read the content of the data.

The network 101 is a communication channel that connects the in-house LAN 102 and the data center 401. For example, the network 101 is typically represented by the Internet.

The in-house LAN 102 is a communication channel installed in the enterprise. Various types of servers and personal computers employed in the enterprise are connected to the in-house LAN 102. If the enterprise has offices in a plurality of buildings, the communication channel forms a complex structure extending via routers and common carrier leased lines.

Figure 2:
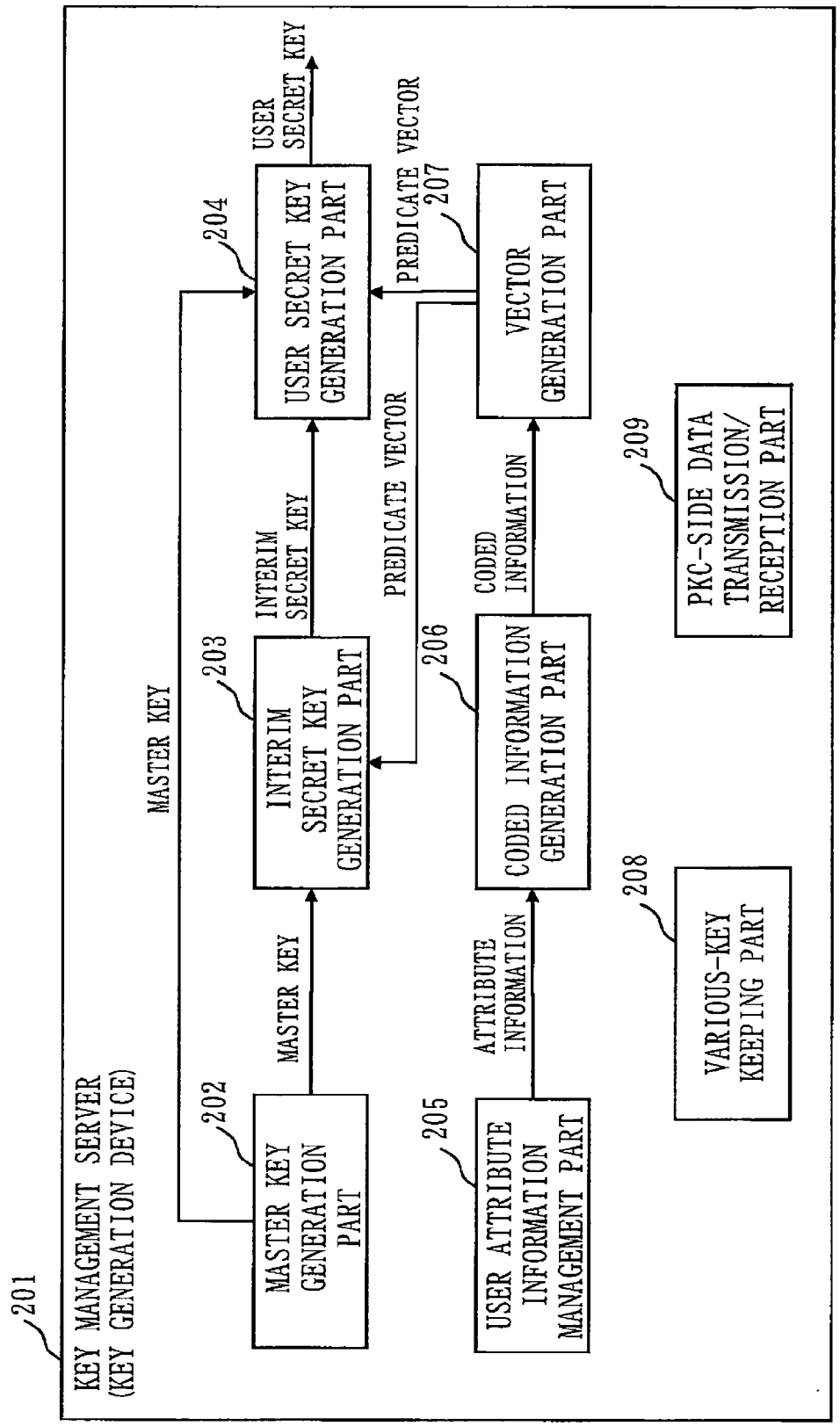
FIG. 2 is a function block diagram showing the function of a key management server 201.

FIG. 2 is a function block diagram showing the function of a key management server 201.

The key management server 201 has a master key generation part 202, an interim secret key generation part 203, a user secret key generation part 204, a user attribute information management part 205, a coded information generation part 206, a vector generation part 207, a various-key keeping part 208, and a PKG-side data transmission/reception part 209.

Based on the key length utilized by the system, the master key generation part 202 generates public parameters to be commonly used by all the users who utilize confidential search, with a processing device, and generates a master key based on which various types of secret keys are to be generated, with the processing device.

The interim secret key generation part 203 generates, with the processing device, an interim secret key to be used for issuing a user secret key to another key management server 201 when a plurality of key management servers 201 are provided. The interim secret key generation part 203 generates the interim secret key by using a predicate vector generated by the vector generation part 207 (to be described later).

Using the predicate vector generated by the vector generation part 207 (to be described later), the user secret key generation part 204 generates the user key from the master key or interim secret key.

The user attribute information management part 205 manages attribute information indicating various types of attributes, such as the office to which the user belongs, the post of the user, the secret level of the accessible document, and the employment type of the user, with the storage device. The user attribute information management part 205 manages not only the current attribute information but also past attribute information, as a record.

Based on the attribute information managed by the user attribute information management part 205, the coded information generation part 206 (second coded information generation part) generates coded information (second coded information) with the processing device.

Based on the coded information generated by the coded information generation part 206, the vector generation part 207 generates a predicate vector with the processing device.

The various-key keeping part 208 (key storage part) stores the master key generated by the master key generation part 202, the interim secret key generated by the interim secret key generation part 203, and the user secret key generated by the user secret key generation part 204, in the storage device.

The PKG-side data transmission/reception part 209 transmits the interim secret key and the public parameters to another key management server 201 via a communication device, and the public parameters and the user secret key to the access terminal 301 to be used by the user, via the communication device.

Figure 3:
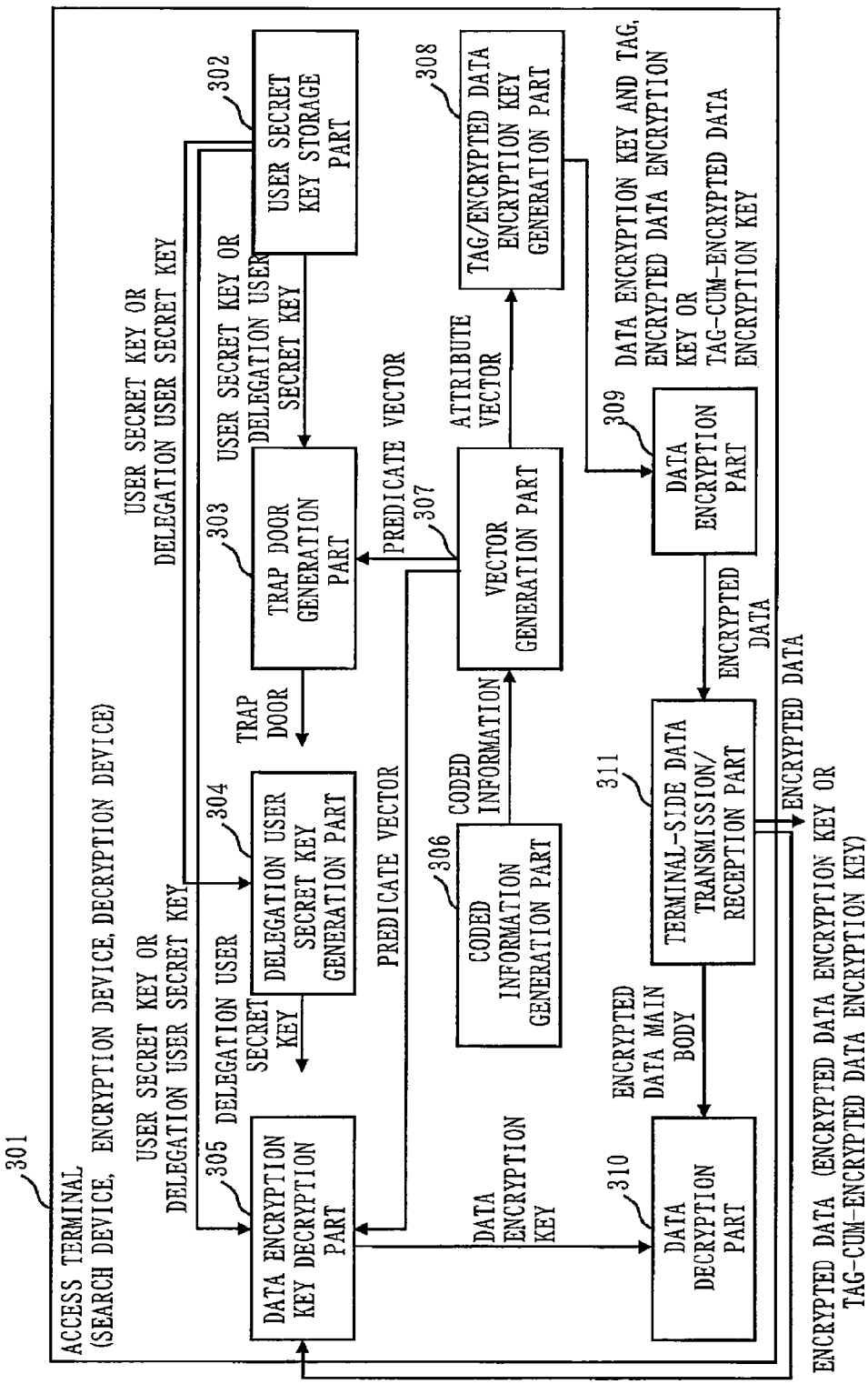
FIG. 3 is a function block diagram showing the function of an access terminal 301.

FIG. 3 is a function block diagram showing the function of the access terminal 301.

The access terminal 301 includes a user secret key storage part 302, a trap door generation part 303, a delegation user secret key generation part 304, a data encryption key decryption part 305, a terminal-side data transmission/reception part 311, a coded information generation part 306, a vector generation part 307, a tag/encrypted data encryption key generation part 308, a data encryption part 309, and a data decryption part 310.

The user secret key storage part 302 (key storage part) stores the user secret key issued for the individual user, a delegation user secret key issued by another user, and the public parameters, in the storage device.

Based on the user secret key or delegation user secret key stored in the user secret key storage part 302, and the predicate vector generated from a keyword that the user wishes to search, the trap door generation part 303 generates a trap door corresponding to a search request, with the processing device.

The delegation user secret key generation part 304 generates the delegation user secret key with the processing device when the user is to delegate his or her search/decryption authority restricted to another user. Based on the user secret key or delegation user secret key stored by the user secret key storage part 302, and the predicate vector generated from the attribute information indicating the authority to be delegated to the delegatee user, the delegation user secret key generation part 304 generates the delegation user secret key.

The data encryption key decryption part 305 (common key acquisition part) decrypts an encrypted data encryption key or tag-cum-encrypted data encryption key attached to the encrypted data received by the terminal-side data transmission/reception part 311 (to be described later) from the data center 401, using the user secret key or delegation user secret key. Hence, with the processing device, the data encryption key decryption part 305 extracts the data encryption key.

The structure of the encrypted data will be described later.

The coded information generation part 306 (first coded information generation part) extracts a keyword that may be searched, automatically from the data, and accepts the keyword that may be searched, from the user. The coded information generation part 306 then generates coded information (first coded information) from the keyword, with the processing device.

The coded information generation part 306 also receives attribute information representing the attribute of the user capable of decryption, from the user. The coded information generation part 306 then generates coded information (first coded information) from the attribute information, with the processing device.

Based on the coded information generated by the coded information generation part 306, the vector generation part 307 generates an attribute vector or predicate vector, with the processing device.

Based on a random number, and the attribute vector generated by the vector generation part 307, the tag/encrypted data encryption key generation part 308 (encrypted data generation part) generates a plurality of tags, with the processing device. Using the random number employed in generation of the tags, the tag/encrypted data encryption key generation part 308 generates the data encryption key, with the processing device. The tag/encrypted data encryption key generation part 308 then encrypts the generated data encryption key based on the attribute information of the decryptable user, and generates the encrypted data encryption key, with the processing device.

As will be described later, when the inner-product predicate encryption described in Non-Patent Literature 2 is employed, the tag and the encrypted data encryption key can be made as one item. Therefore, when the inner-product predicate encryption described in Non-Patent Literature 2 is employed, the tag/encrypted data encryption key generation part 308 generates a tag-cum-encrypted data encryption key in which the tag and encrypted data encryption key are made as one item.

Using the data encryption key generated by the tag/encrypted data encryption key generation part 308, the data encryption part 309 encrypts the data main body with the processing device, thus generating an encrypted data main body. Furthermore, the data encryption part 309 generates encrypted data with the processing device by adding the plurality of tags and the encrypted data encryption key which are generated by the tag/encrypted data encryption key generation part 308, to the encrypted data main body.

When the inner-product predicate encryption described in Non-Patent Literature 2 is employed, the data encryption part 309 generates the encrypted data by adding the tag-cum-encrypted data encryption key to the encrypted data main body.

Using the data encryption key acquired by the data encryption key decryption part 305, the data decryption part 310 decrypts, with the processing device, the encrypted data main body included in the encrypted data accepted from the data center 401.

The terminal-side data transmission/reception part 311 (data transmission part) transmits the encrypted data generated by the access terminal 301 to the data center 401 via the communication device, and receives the encrypted data kept in the data center 401, via the communication device.

The terminal-side data transmission/reception part 311 receives the user secret key from the key management server 201 via the communication device. The terminal-side data transmission/reception part 311 also receives the delegation user secret key from another access terminal 301 via the communication device, and transmits the delegation user secret key to another access terminal 301 via the communication device.

Figure 4:
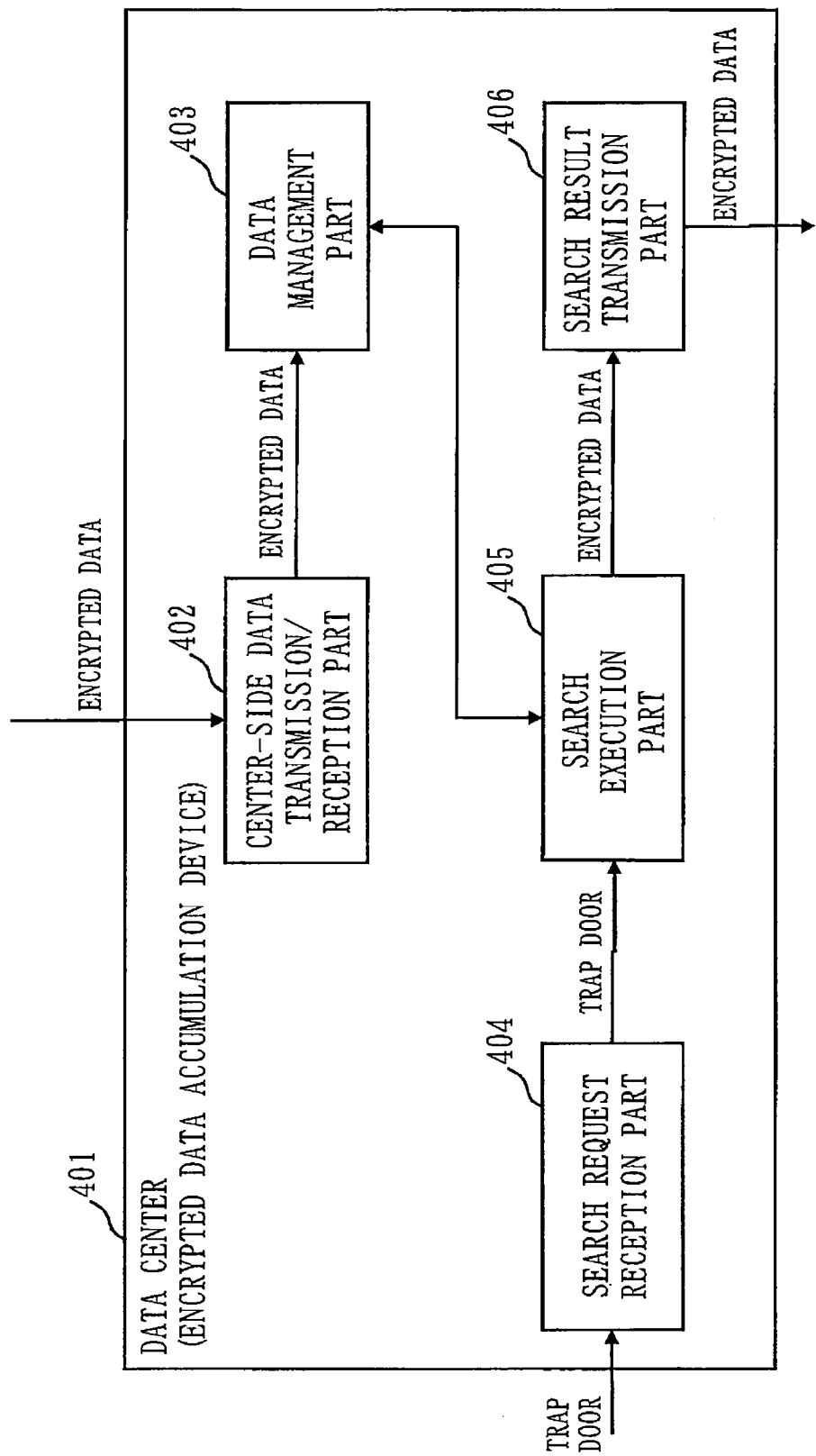
FIG. 4 is a function block diagram showing the function of a data center 401.

FIG. 4 is a function block diagram showing the function of the data center 401.

The data center 401 includes a center-side data transmission/reception part 402, a data management part 403, a search request reception part 404, a search execution part 405, and a search result transmission part 406.

The center-side data transmission/reception part 402 receives the encrypted data from the access terminal 301 via the communication device.

The center-side data transmission/reception part 402 also receives the public parameters from the key management server 201 via the communication device.

The data management part 403 (encrypted data accumulation part) stores the encrypted data received from the access terminal 301, the public parameters received from the key management server 201, and the like in the storage device.

The search request reception part 404 receives the trap door which is a search request for the encrypted data, from the access terminal 301 via the communication device.

The search execution part 405 executes test on the trap door received by the search request reception part 404, and the tag of the encrypted data or the tag-cum-encrypted data encryption key which is kept by the data management part 403, with the processing device. The search execution part 405 thus checks whether or not the encrypted data kept by the data management part 403 includes encrypted data having a coincident keyword.

The search result transmission part 406 transmits, as the result of the search request received from the access terminal 301, the encrypted data that hits the search, to the access terminal 301 via the communication device.

<2. Structure of Encrypted Data, Flow of Data>

The structure of the encrypted data will be described.

Figure 5:
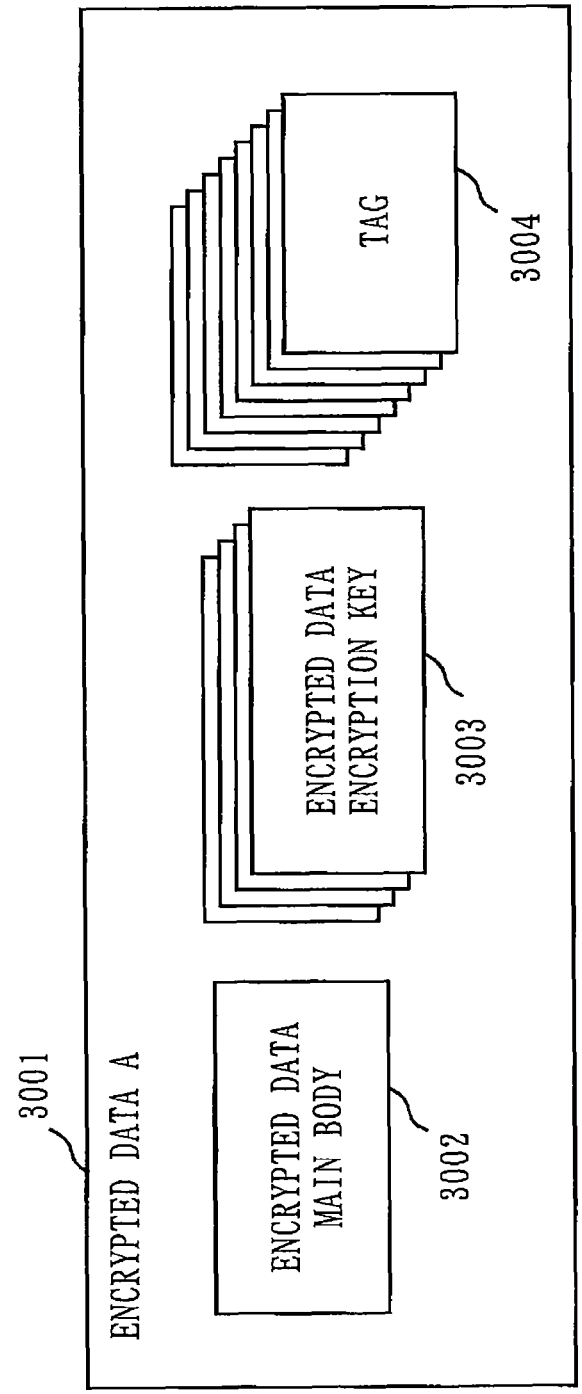
FIG. 5 is an illustration showing a structure example of encrypted data 3001 in a case where a general inner-product predicate encryption is used.

FIG. 5 is an illustration showing a structure example of encrypted data 3001 in a case where a general inner-product predicate encryption is used.

This structure example will be defined as encrypted data A. An encrypted data main body 3002 is obtained by encrypting data with a common key encryption such as AES (Advanced Encryption Standard) or Camellia (registered trademark), by using the data encryption key. An encrypted data encryption key 3003 is obtained by encrypting the data encryption key with an inner-product predicate encryption. A tag 3004 is generated by using the keyword included in the text, and the attribute vector.

Figure 6:
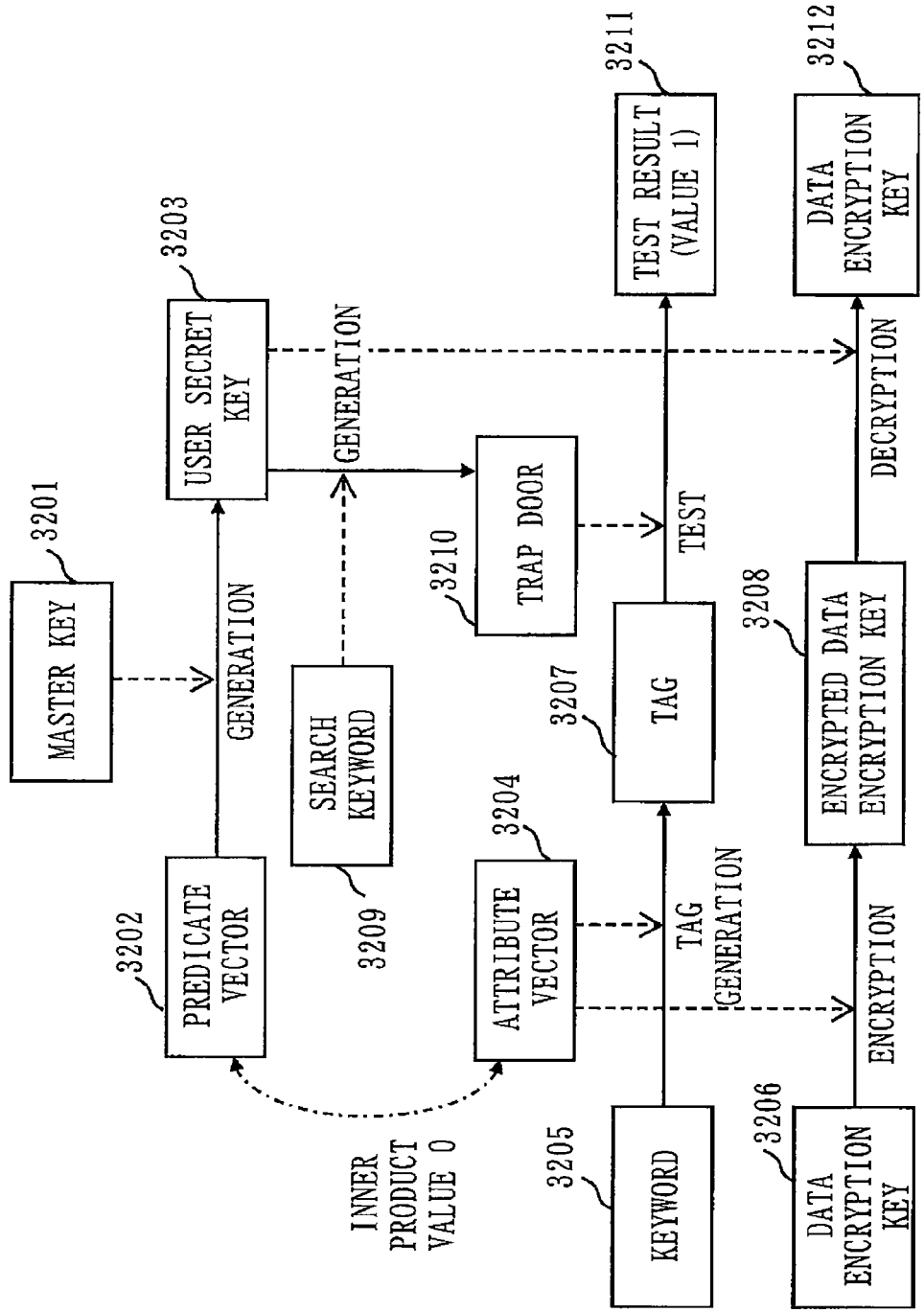
FIG. 6 is a diagram showing the relation among respective data included in encrypted data A and among respective data referred to in the above explanation.

FIG. 6 is a diagram showing the relation among respective data included in the encrypted data A and among the respective data referred to in the above explanation.

First, the coded information generation part 206 of the key management server 201 generates coded information from the user attribute managed by the user attribute information management part 205. The vector generation part 207 generates a predicate vector 3202 from the generated coded information. Using the predicate vector 3202 and a master key 3201, the user secret key generation part 204 generates a user secret key 3203. The PKG-side data transmission/reception part 209 delivers the generated user secret key 3203 to the user by a secure method.

The data encryption part 309 of the access terminal 301, used by the user who is to encrypt the data, encrypts the data by using a data encryption key 3206. The coded information generation part 306 generates coded information representing the attribute of the user capable of search and decryption. The vector generation part 307 generates an attribute vector 3204 from the generated coded information. Using the attribute vector 3204, the tag/encrypted data encryption key generation part 308 encrypts the data encryption key 3206, used for encrypting the data, using an inner-product predicate encryption, thus generating an encrypted data encryption key 3208. Using the inner-product predicate encryption, the tag/encrypted data encryption key generation part 308 generates a tag 3207 from a keyword 3205 included in the data, and the attribute vector 3204. Generally, the keyword 3205 and the attribute vector 3204 are the public key, and the tag is generated by encrypting a constant 1 or a random number using the public key. The tag 3207 and the encrypted data encryption key 3208 are generated each in a number corresponding to the number of the attribute vectors 3204 of the user who is capable of search and decryption, and are transmitted to the recipient, as the encrypted data A together with the encrypted data main body. Even when the data is to be transmitted to a plurality of users, as far as the attribute vector 3204 can be formed of one vector, it suffices to generate only one tag 3207 and only one encrypted data encryption key 3208.

The trap door generation part 303 of the access terminal 301, used by the user who searches the data, generates a trap door 3210 by using the user secret key 3203 stored in the user secret key storage part 302 and a search keyword 3209 that the user wishes to search. In general, the trap door 3210 is generated by generating a secret key corresponding to a vector which is formed by adding the search keyword 3209 at the end of the predicate vector 3202. If the search request reception part 404 of the data center 401 can recover the constant 1 or the random number used for generating the tag 3207, by decrypting the tag 3297 using the trap door 3210, it indicates that the keyword 3205 is included in the data. If the constant 1 or the random number cannot be recovered, it indicates that the keyword 3205 is not included in the data.

Using the user secret key 3203 stored in the user secret key storage part 302, the data encryption key decryption part 305 of the access terminal 301, used by the user who decrypts the data, decrypts the encrypted data encryption key 3208, and extracts a data encryption key 3212. The data decryption part 310 can acquire the data by decrypting the encrypted data main body using the data encryption key 3212.

When the inner-product predicate encryption described in Non-Patent Literature 2 is employed, the data amount can be reduced by making the tag 3207 and the encrypted data encryption key 3208 as one item.

Figure 7:
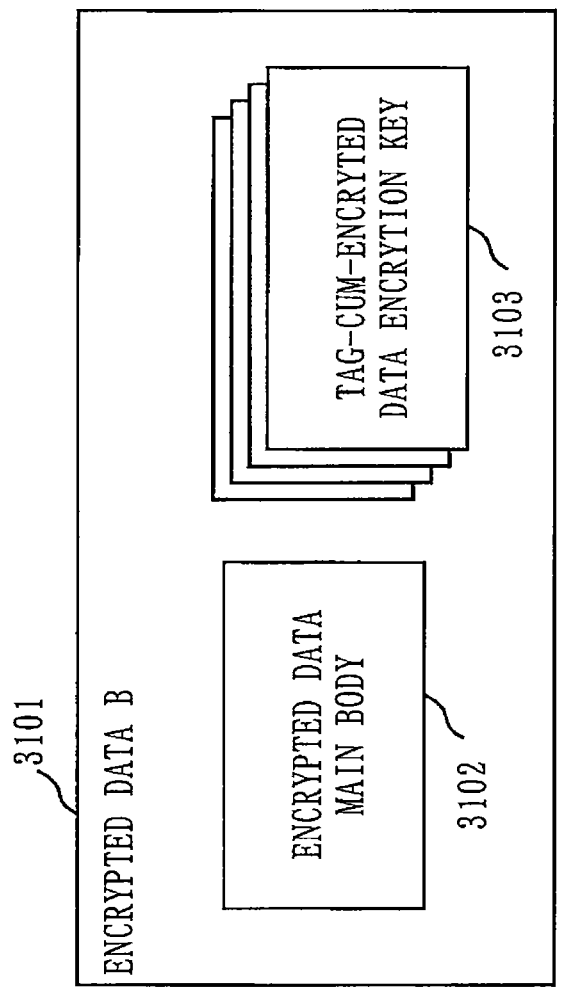
FIG. 7 is an illustration showing a structure example of encrypted data 3101 in a case where an inner-product predicate encryption described in Non-Patent Literature 2 is used.

FIG. 7 is an illustration showing a structure example of encrypted data 3101 in a case where the inner-product predicate encryption described in Non-Patent Literature 2 is used.

Assume that the structure example is defined as encrypted data B. An encrypted data main body 3102 (ciphertext c2) is similar to the encrypted data main body 3002 shown in FIG. 5, and is obtained by encrypting data (plaintext information m) using the data encryption key. A tag-cum-encrypted data encryption key 3103 (encryption vector c1) is obtained by encrypting the data encryption key while treating the keyword and the attribute vector as a public key.

Figure 8:
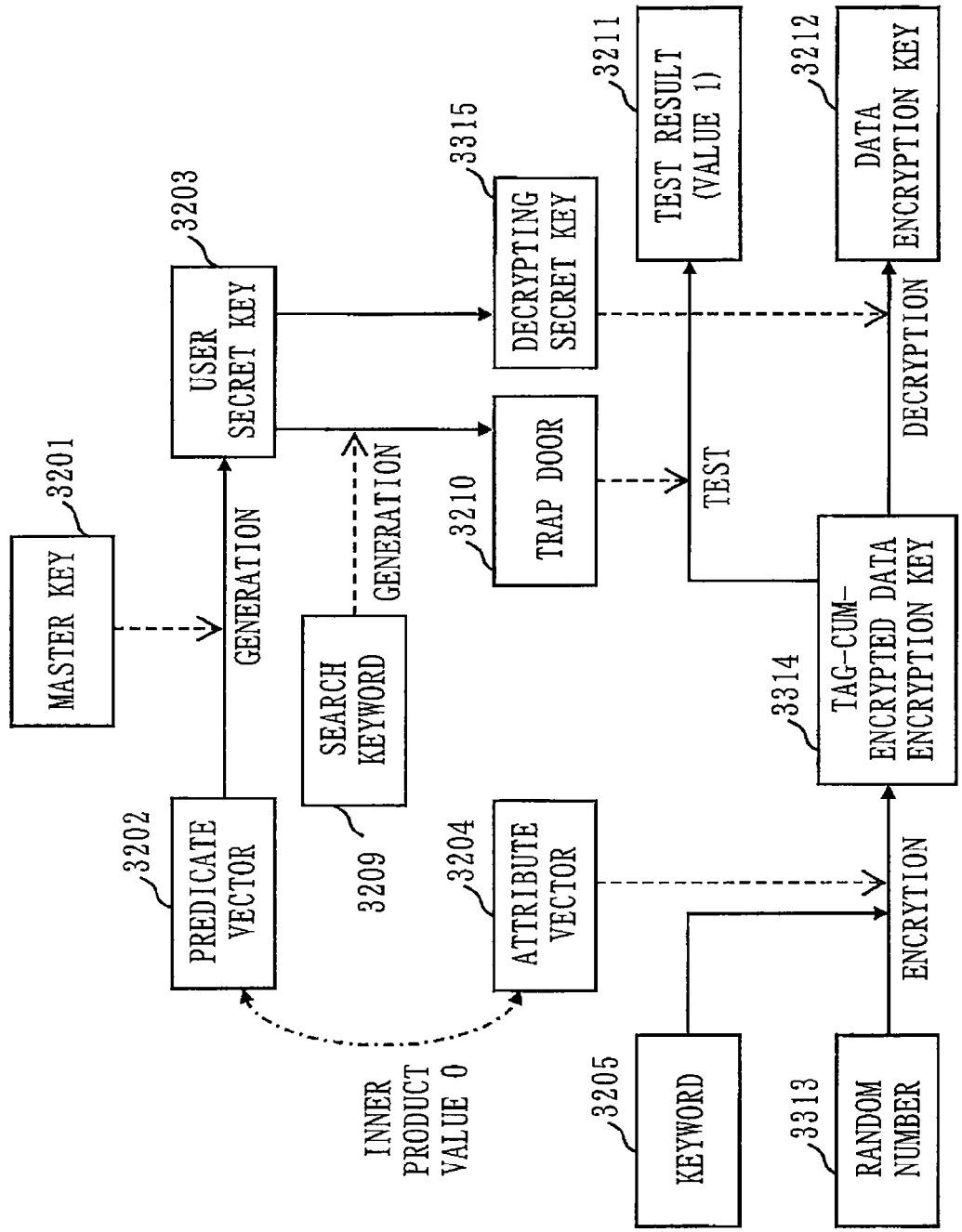
FIG. 8 is a diagram showing the relation among respective data included in encrypted data B and among respective data referred to in the above explanation.

FIG. 8 is a diagram showing the relation among respective data included in the encrypted data B and among the respective data referred to in the above explanation.

Generation of the user secret key and the flow of data search are similar to those described with reference to FIG. 6, and their description will accordingly be omitted.

The data encryption part 309 of the access terminal 301, used by the user who encrypts the data, encrypts the data by using the data encryption key 3206. The coded information generation part 306 generates coded information indicating the attribute of the user capable of search and decryption. The vector generation part 307 generates the attribute vector 3204 from the generated coded information. Based on the attribute vector 3204 and the keyword 3205 which is included in the data, the tag/encrypted data encryption key generation part 308 encrypts a random number 3313 employed for generating the data encryption key 3212, by using an inner-product predicate encryption, thus generating a tag-cum-encrypted data encryption key 3314. The tag-cum-encrypted data encryption key 3314 is generated in a number equal to the number of attribute vectors 3204 of the user who is capable of search and decryption, and is transmitted to the recipient, as the encrypted data B together with the encrypted data main body. Even when the data is to be transmitted to a plurality of users, as far as the attribute vector 3204 can be formed of one vector, it suffices to generate only one tag-cum-encrypted data encryption key 3314.

The data encryption key decryption part 305 of the access terminal 301, used by the user who decrypts the data, generates a decrypting secret key 3315 by transforming the user secret key 3203 stored in the user secret key storage part 302. Using the generated decrypting secret key 3315, the data encryption key decryption part 305 decrypts the tag-cum-encrypted data encryption key 3314 and extracts the data encryption key 3212. The data decryption part 310 can acquire the data by decrypting, with the data encryption key 3212, the encrypted data main body.

In the data flow shown in FIGS. 6 and 8, the master key is employed in order to generate the user secret key. Alternatively, an interim secret key may be employed in place of the master key. Also, a delegation user secret key may be employed in place of the user secret key.

<3. Method of Generating Attribute Vector and Predicate Vector>

The attribute information coded sequence 501 will be described.

The attribute information coded sequence 501 is an array used by the coded information generation part 206 of the key management server 201 and the coded information generation part 306 of the access terminal 301 to generate the coded information. That is, the attribute information coded sequence 501 is used for generating the coded information from which the predicate vector, used when generating the user secret key, interim secret key, and the like, and the attribute vector, used when generating the encrypted data, are to be generated.

The coded information generation part 206 and the coded information generation part 306 generate the coded information by setting values in the attribute information coded sequence 501 in accordance with a method to be described below.

The inner-product predicate encryption has a feature in that it enables checking as to whether or not the inner product value of the attribute vector and the predicate vector is 0. It is known that the AND condition, the OR condition, and the inclusion relation can be tested by using this feature.

The attribute information coded sequence 501 serves to code the attribute information so that the attribute of the user who possesses the user secret key and the attribute of the user capable of decrypting the encrypted data can be compared by using the AND condition, the OR condition, and the inclusion condition. The attribute information coded sequence 501 is fixed-length information. How many of the coded sequences described below should exist as constituent elements in the attribute information coded sequence 501 is information that should be determined in advance when the system is to be used.

Figure 9:
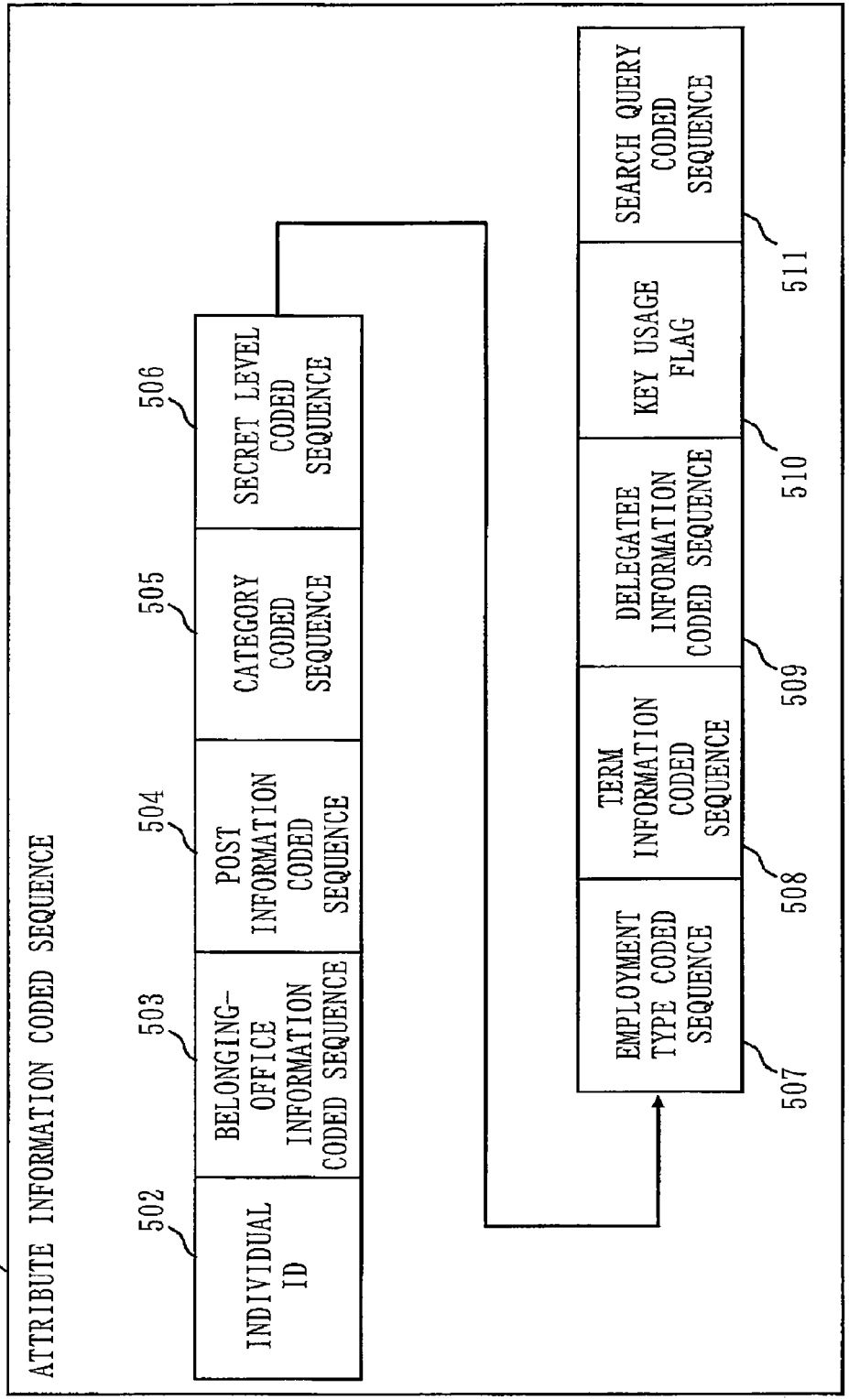
FIG. 9 is an illustration showing a structure example of an attribute information coded sequence 501.

FIG. 9 is an illustration showing a structure example of the attribute information coded sequence 501.

The attribute information coded sequence 501 includes an individual ID 502, a belonging-office information coded sequence 503, a post information coded sequence 504, a category coded sequence 505, a secret level coded sequence 506, an employment type coded sequence 507, a term information coded sequence 508, a delegatee information coded sequence 509, a key usage flag 510, and a search query coded sequence 511.

The individual ID 502 specifies the user. The belonging-office information coded sequence 503 indicates the office to which the user belongs. The post information coded sequence 504 indicates the post of the user. The category coded sequence 505 indicates the type of accessible document. The secret level coded sequence 506 indicates the secret level of the accessible document. The employment type coded sequence 507 indicates the employment type of the user. The term information coded sequence 508 indicates the term during which the accessible document was generated. The delegatee information coded sequence 509 indicates, when the user secret key is a delegation user secret key, the post of the person to whom the delegation user secret key was delegated. When a trap door is to be generated from the user secret key, a flag representing the trap door is set in the key usage flag 510. A keyword that the user wishes to search, when a trap door is to be generated, is set in the search query coded sequence 511.

When the respective coded sequences of the attribute information coded sequence 501 are to be used as the attributes with which the interim secret key, the user secret key, or the delegation user secret key is to be generated, the attribute of the user or group who uses the secret key is set in each coded sequence of the attribute information coded sequence 501. Namely, the coded information generation part 206 of the key management server 201 or the coded information generation part 306 of the access terminal 301 generates coded information by setting, in each coded sequence of the attribute information coded sequence 501, the attribute of the user or group who uses the secret key.

When the respective coded sequences of the attribute information coded sequence 501 are to be used as the attribute to be set in the encrypted data, the attribute of the user or group who can decrypt or search the encrypted data is set in each coded sequence of the attribute information coded sequence 501. In other words, the coded information generation part 306 of the access terminal 301 generates coded information by setting, in each coded sequence of the attribute information coded sequence 501, the attribute of the user or group who can decrypt or search the encrypted data.

As will be described later, regarding some of the coded sequences of the attribute information coded sequence 501, according to which one of AND test, OR test, and inclusion relation test comparison is to be performed must be determined for each coded sequence. AND test is a process of testing that a coincidence is established in all elements constituting the coded sequence with their counterparts. OR test is a process of testing that a coincidence is established in some elements. Inclusion relation test is a process of testing that an element set is included in the other element set.

More specifically, the respective coded sequences of the coded information which is the generator of a predicate vector set in the user secret key are compared with the respective coded sequences of the coded information which is the generator of the attribute vector set in the tag, encrypted data encryption key, or tag-cum-encrypted data encryption key by any one of AND test, OR test, and inclusion relation test. If the test result is true for all the coded sequences, namely, if all the coded sequences are tested by AND test with the result representing true, search or decryption is possible.

The respective constituent elements of the attribute information coded sequence 501 will be described.

The following description on the respective constituent elements of the attribute information coded sequence 501 refers to a case of generating a user secret key and a case of generating encrypted data. A case of generating an interim secret key and a case of generating a delegation user secret key are the same as the case of generating the user secret key.

The individual ID 502 will be explained.

An ID such as the employee number representing the individual is set in the individual ID 502. When generating the user secret key, the individual ID 502 is always set. When generating the encrypted data, if the encrypted data is to be sent to an individual, the ID of the individual is set in the individual ID 502. If the person capable of decryption is not particularly specified, predetermined information "*" that matches all values is set.

Concerning the individual ID 502, the user secret key and the encrypted data are compared by AND test. In the following explanation as well, the symbol "*" is used as a special symbol (a so-called wildcard) that coincides with all values.

Figure 10:
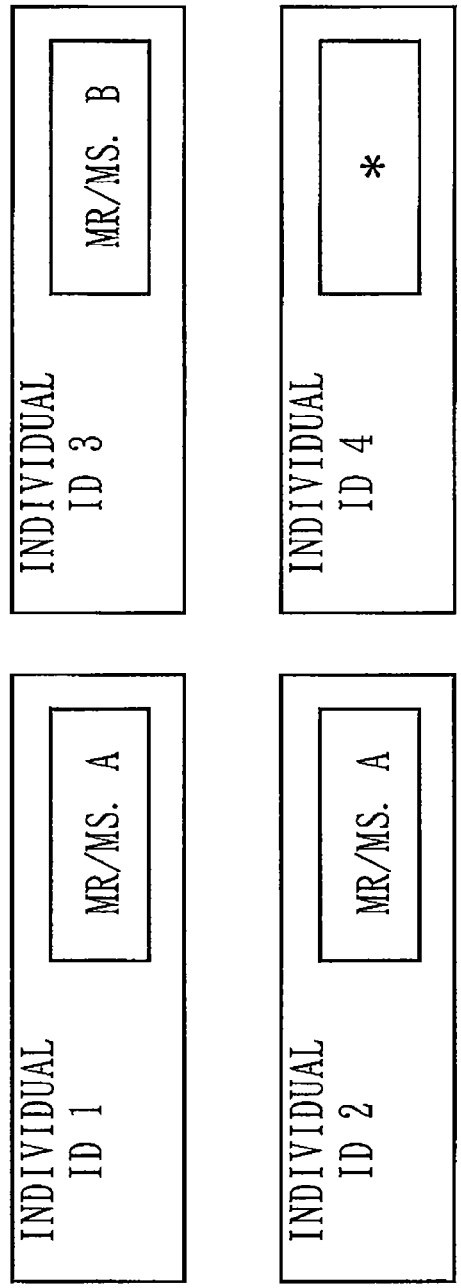
FIG. 10 is an illustration showing setting examples of an individual ID 502.

FIG. 10 is an illustration showing setting examples of the individual ID 502.

Assume that a value representing "Mr/Ms. A" is set in the user secret key, as in individual ID 1. If a value representing "Mr/Ms. A" is also set in the encrypted data as in individual ID 2, the value of the user secret key and the value of the encrypted data coincide, so search or decryption is possible with this user secret key. If however, "Mr/Ms. B" is set in the encrypted data as in individual ID 3, the value of the user secret key and the value of the encrypted data differ, so search nor decryption cannot be performed with this user secret key.

If "*" is set in the encrypted data as in individual ID 4, the result of AND test is true with the user secret key which is set as with the individual ID1 as well as with the user secret key which is set as with the individual ID 3. Hence, search or decryption is possible with either user secret key.

The belonging-office information coded sequence 503 will be explained.

FIG. 11 is an illustration showing a structure example of the belonging-office information coded sequence 503.

The name of the office to which the user belongs is set in the belonging-office information coded sequence 503 downward in the hierarchical order. For example, company ID 601 representing the company the user belongs to, business place ID 602 representing the business place the user belongs to, department ID 603 representing the department the user belongs to, section ID 604 representing the section the user belongs to, and unit ID 605 representing the unit the user belongs to are set in order.

Concerning the belonging-office information coded sequence 503, the user secret key and the encrypted data are compared by AND test which tests whether or not a coincidence is established in all elements. If the test result is true, it is regarded that the condition is established.

FIG. 12 is an illustration showing setting examples of the belonging-office information coded sequence 503.

For example, a belonging-office information coded sequence 1 is an example of a user secret key generated for a user who belongs to "A company/B business place/C department/D section/E unit".

When encrypted data that can be decrypted or searched by any user belonging to the D section is to be generated, "A company/B business place/C department/D section/*" indicated by a belonging-office information coded sequence 2 is set. In this case, with any user belonging to the D section, when AND test is conducted, a coincidence is established in all elements. Hence, the result is true, and this user can search and decrypt the data. If search and decryption are to be allowed for any user belonging to the C department, the attribute indicated by a belonging-office information coded sequence 3 is set.

If the encrypted data is of the type that can be decrypted or searched by any member belonging to the E section, the attribute indicated by a belonging-office information coded sequence 4 is set. In this case, with a user belonging to the D section and possessing a secret key in which an attribute indicated by the belonging-office information coded sequence 1 is set, as the section information differs between "D section" and "E section", the result of AND test is false, and this user is not capable of search nor decryption.

Similarly, when encrypted data that can be decrypted or searched only by a user who belongs to the D section but does not belong to any unit is to be generated, a random number R may be set in the unit ID 605 as indicated by a belonging-office information coded sequence 5. As indicated by the belonging-office information coded sequence 1, with a user belonging to the "E unit", as the unit ID 605 differs, the result of AND test is false. Hence, this user is not capable of search or decryption. With the user who belongs to the D section but does not belong to any unit, as the user possesses a user secret key in which the attribute as indicated by the belonging-office information coded sequence 2 is set, a coincidence is established in all elements. Thus, the result of AND test is true, so the user is capable of search and decryption.

In the above explanation, the random number is indicated by symbol R. In the following explanation as well, the random number will be indicated by symbol R. Note that the random number R is a randomly selected value. Even if two random numbers R appear in different portions in a coded sequence, they are random values different from each other.

The post information coded sequence 504 will be explained.

FIG. 13 is an illustration showing a structure example of the post information coded sequence 504.

Information on the post of the user is set in the post information coded sequence 504.

For example, the post information coded sequence 504 is constituted by an executive class flag 701, a director class flag 702, a manager class flag 703, a chief class flag 704, a subchief class flag 705, and a staff class flag 706. The executive class flag 701 indicates that the user is in an executive post. The director class flag 702 indicates that the user is in a director post. The staff class flag 706 indicates that the user is an ordinary staff member.

Two types of examples will be shown as a method of setting the flags of the post information coded sequence 504.

According to the first setting, when generating a user secret key, a value "1" is set in the flag of the post of the user, and "*" is set in the other flags indicating posts. When generating encrypted data, a value "1" is set in the flag of a post capable of accessing the data, and different random numbers R are set in the flags of the posts incapable of accessing the data. In this case, concerning the post information coded sequence 504, the user secret key and the encrypted data are compared by AND test which tests whether or not a coincidence is established in all elements. Only when the test result is true, the user is capable of search and decryption.

FIG. 14 is an illustration showing setting examples of the post information coded sequence 504 according to the first setting.

For example, in the user secret key of a chief, a value "1" is set in the chief class flag 704 and "*" is set in the remaining flags, as indicated by the post information coded sequence 1. In the user secret key of a subchief, a value "1" is set in the subchief class flag 705 and "*" is set in the remaining flags, as indicated by the post information coded sequence 2.

If the encrypted data is of a type that can be searched or decrypted by managers and chiefs, an attribute as indicated by the post information coded sequence 3 is set. More specifically, a value "1" is set in the manager flag and the chief flag, and different random numbers R are set in the remaining flags. When this encrypted data is compared with the user secret key of the chief described above, a coincidence is established in all elements. The result of AND test is true accordingly, so the encrypted data can be searched or decrypted with the user secret key of the chief. With the user secret key of the subchief described above, the value of the subchief class flag 705 is "1", which is different from the random number "R" set in the subchief class flag of the encrypted data. Thus, the test result is false, and the user is not capable of search nor decryption.

If the encrypted data is of a type that can be searched or decrypted by all of the department managers, the chiefs, the subchiefs, and the staff members, an attribute as indicated by the post information coded sequence 4 is set. In this case, a coincidence is established in all elements, with both the user secret key of the chief and the user secret key of the subchief described above. Thus, the test result is true, and the corresponding user is capable of search and decryption.

According to the second setting, when generating a user secret key, a value "1" is set in the flag of the post the user, and different random numbers R are set in the flags of the other posts. When generating encrypted data, a value "1" is set in the flag of the post capable of accessing the data, and different random numbers R are set in the flags of the posts incapable of accessing the data. In this case, concerning the post information coded sequence 504, the user secret key and the encrypted data are compared by OR test with which only one coincidence is sufficient. Only when the test result is true, the user can search and decrypt the data.

FIG. 15 is an illustration showing setting examples of the post information coded sequence 504 according to the second setting.

For example, in the user secret key of the chief, a value "1" is set in the chief class flag 704 and different random numbers R are set in the remaining flags, as indicated by the post information coded sequence 5. In the user secret key of a user who holds the post of both the department manager and chief concurrently, a value "1" is set in the manager class flag 703 and chief class flag 704, and different random numbers R are set in the remaining flags.

If the encrypted data is of a type that can be searched and decrypted by a chief; a value "1" is set in the chief flag and different random numbers R are set in the remaining flags, as indicated by the post information coded sequence 7. When this encrypted data is compared with the user secret key of the chief described above, a coincidence is established in the chief class flags 704, and the result of OR test is true. Therefore, the encrypted data can be searched and decrypted with the user secret key of the chief. This encrypted data can also be similarly searched or decrypted with the user secret key described above of the user who holds the post of both department manager and chief.

If the encrypted data is of a type that can be searched and decrypted by a manager, an attribute as indicated by the post information coded sequence 8 is set. In this case, with the user secret key of the user who holds the post of both department manager and chief concurrently, a coincidence is established in the manager class flag 703 representing a value "1". Therefore, the user can search and decrypt the encrypted data. With the user secret key of the chief described above, no coincidence is established in the value of any element. Therefore, the result of OR test is false, and the user can neither search nor decrypt the encrypted data.

All the random numbers in FIG. 15 are denoted by R. As different random number values are assigned to the different random numbers R in FIG. 15, the probability of a coincidence is very small to be almost negligible.

The category coded sequence 505 will be explained.

FIG. 16 is an illustration showing a structure example of a category coded sequence 505.

The category coded sequence 505 is used to limit the type of document that can be searched and decrypted.

For example, the category coded sequence 505 is constituted by major category identification ID 801 indicating a major category, medium category identification ID 802 indicating a medium category, and minor category identification ID 803 indicating a minor category.

Concerning the category coded sequence 505, the user secret key and the encrypted data are compared by AND test which tests whether or not a coincidence is established in all elements.

FIG. 17 is an illustration showing setting examples of the category coded sequence 505.

For example, if the user is allowed to access all data, "s" is set in all IDs of the user secret key, as indicated by a category coded sequence 1. If the user is allowed to access only data related to A development, "A development" is set in the minor category group identification ID 801, as indicated by a category coded sequence 2.

When generating encrypted data, values are set to specify all categories. For example, in the case of an external spec sheet of the A development, the attribute of the encrypted data is set as indicated by a category coded sequence 3. In this case, a coincidence is established in all elements, with both the user secret key of the category coded sequence 1 and the user secret key of the category coded sequence 2. Thus, the result of AND test is true, and the user can search and decrypt the encrypted data.

As indicated by a category coded sequence 4, when a category that indicates the budget planning of the employment cost of the fiscal year 2009 is set, with the user secret key of the category coded sequence 1, the result of AND test is true, and the user can both search and decrypt the encrypted data. With the user secret key of the category coded sequence 2, since the values of the major category differ, the result of AND test is false, and the user can neither search nor decrypt the encrypted data.

The secret level coded sequence 506 will be described.

Figure 18:
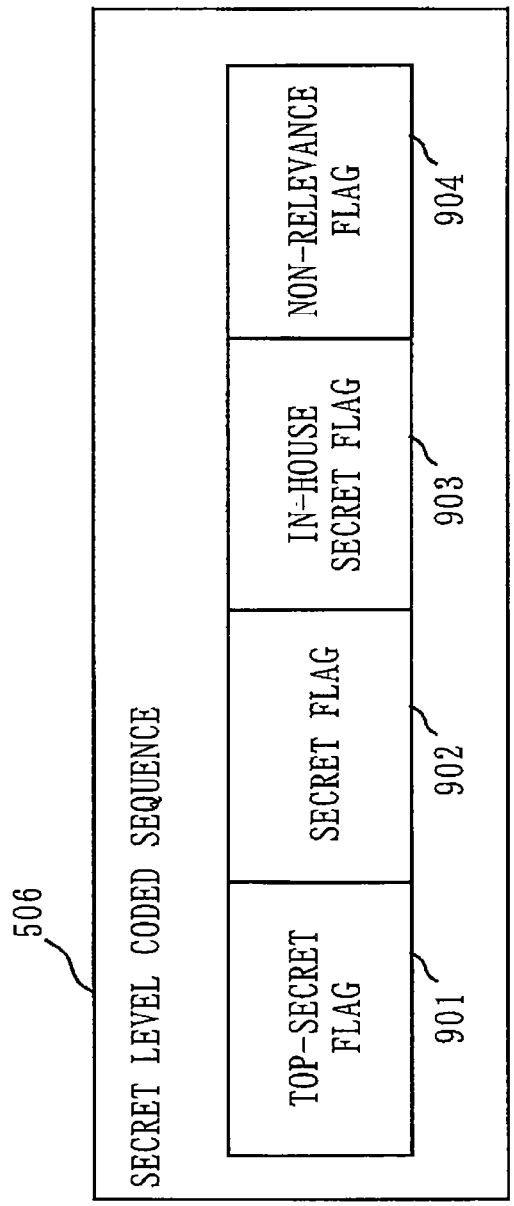
FIG. 18 is an illustration showing a structure example of a secret level coded sequence 506.

FIG. 18 is an illustration showing a structure example of the secret level coded sequence 506.

The secret level coded sequence 506 is used to limit the secret level of document that can be searched and decrypted.

For example, the secret level coded sequence 506 is constituted by a top-secret flag 901, a secret flag 902, an in-house secret flag 903, and a non-relevance flag 904. The top-secret flag 901 indicates that the data is top secret. The secret flag 902 indicates that the data is secret. The in-house secret flag 903 indicates that the data is for in-house use only. The non-relevance flag 904 indicates that the data does not fall on any of the secret levels.

Two types of examples will be shown as a method of setting the flags of the secret level coded sequence 506.

According to the first setting, when generating a user secret key, a value "1" is set in a flag corresponding to the secret level of a document that can be searched and decrypted, and different random numbers "R" are set in flags corresponding to secret levels of documents that cannot be searched nor decrypted. When generating encrypted data, a value "1" is set in a flag corresponding to the secret level of the data, and "*" is set in a non-relevance flag. The user secret key and the encrypted data are compared by AND test which tests whether or not a coincidence is established in all elements. Only when the test result is true, the user can search and decrypt the data.

FIG. 19 is an illustration showing setting examples of the secret level coded sequence 506 according to the first setting.

For example, in the user secret key that allows access to data having a secret level lower than top secret, a value "1" is set in the secret flag 902, the in-house secret flag 903, and the non-relevance flag 904, and a random number R is set in the top-secret flag 901, as indicated by a secret level coded sequence 1. In the user secret key that allows access to the data of all secret levels, a value "1" is set in all the flags, as indicated by a secret level coded sequence 2.

When generating encrypted data, "1" is set in a flag corresponding to the secret level of the data, and "*" is set in the remaining flags. For example, when encrypting secret data, a value "1" is set in the secret flag 902 and "*" is set in the remaining flags, as indicated by a secret level coded sequence 3. In this case, when AND test is conducted for the encrypted data and the user secret key which is set with the secret level coded sequence 1 that allows access to data having a secret level lower than the top secret level described above, a coincidence is established in all elements. Thus, the result is true, and the user can search and decrypt the data. Likewise, when AND test is conducted for the encrypted data and the user secret key which is set with the secret level coded sequence 2 that allows access to data of all secret levels described above, a coincidence is established in all elements. Thus, the result is true, and the user can search and decrypt the data.

When encrypting top-secret data, a value "1" is set in the top-secret flag 901 and "*" is set in the remaining flags, as indicated by a secret level coded sequence 4. In this case, when AND test is conducted for the top-secret data and the user secret key which is set with the secret level coded sequence 1 that can access data having a secret level lower than the top-secret level described above, as the values of the top-secret flag 901 differ, the result is false, and the user cannot search nor decrypt the top-secret data. When, however, AND test is conducted for the top-secret data and the user secret key which is set with the secret level coded sequence 2 that allows access to data of all secret levels described above, a coincidence is established in all elements. Thus, the result is true, and the user can search and decrypt the data.

According to the second setting, when generating a user secret key, a value "1" is set in a flag corresponding to the secret level that allows search and decryption, and different random numbers "R" are set in flags corresponding to secret levels that do not allow search nor decryption. When generating encrypted data, a value "1" is set in a flag corresponding to the secret level of the data, and different random numbers "R" are set in non-relevance flags. The user secret key and the encrypted data are compared by OR test with which only one coincidence is sufficient. Only when the test result is true, the user can search and decrypt the data.

FIG. 20 is an illustration showing setting examples of the secret level coded sequence 506 according to the second setting.

The setting examples of the secret level coded sequences to be included in the user secret key are the same as in the case shown in FIG. 19, and its description will accordingly be omitted.

When generating encrypted data, a value "1" is set in a flag corresponding to the secret level of the data, and different random numbers R are set in the remaining flags. For example, when encrypting secret data, a value "1" is set in the secret flag 902 and different random numbers R are set in the remaining flags, as indicated by a secret level coded sequence 5. In this case, when OR test is conducted for the encrypted data and the user secret key which is set with the secret level coded sequence 1 that allows access to data having a secret level lower than the top secret level described above, a coincidence is established in the value of the secret flag 902. Thus, the result is true, and the user can search and decrypt the data. Likewise, when OR test is conducted for the encrypted data and the user secret key which is set with the secret level coded sequence 2 that allows access to data of all secret levels described above, a coincidence is established in the value of the secret flag 902. Thus, the result is true, and the user can search and decrypt the data.

When encrypting top-secret data, a value "1" is set in the top-secret flag 901 and different random numbers R are set in the remaining flags, as indicated by a secret level coded sequence 6. In this case, when OR test is conducted for the top-secret data and the user secret key which is set with the secret level coded sequence 1 that allows access to data having a secret level lower than the top-secret level described above, as the values of all flags differ, the result is false, and the user cannot search nor decrypt the top-secret data. When, however, OR test is conducted for the top-secret data and the user secret key which is set with the secret level coded sequence 2 that allows access to data of all secret levels described above, a coincidence is established in the value of the top-secret flag. Thus, the result is true, and the user can search and decrypt the data.

The employment type coded sequence 507 will be explained.

FIG. 21 is an illustration showing a structure example of an employment type coded sequence 507.

The employment type coded sequence 507 is used to limit the user who can search and decrypt, depending on his or her employment type.

For example, the employment type coded sequence 507 is constituted by a major career flag 1001, a general career flag 1002, a visiting staff flag 1003, an affiliate staff flag 1004, a dispatched staff flag 1005, and an other-type flag 1006. The major career flag 1001 represents a major career staff member. The general career flag 1002 represents a general carrier staff member. The visiting staff flag 1003 represents a regular but visiting staff member from a different area. The affiliate staff flag 1004 represents a staff member of an affiliated company. The dispatched staff flag 1005 represents a dispatched staff member. The other-type flag 1006 represents any other employment type.

Two types of examples will be shown as a method of setting the flags of the employment type coded sequence 507.

According to the first setting, when generating a user secret key, a value "1" is set in the flag of a corresponding employment type, and "*" is set in the flag of a non-relevant employment type. When generating encrypted data, a value "1" is set in the flag of an accessible employment type, and different random numbers R are set in the flags of non-accessible employment types. The user secret key and the encrypted data are compared by AND test which tests whether or not a coincidence is established in all elements. Only when the test result is true, the user can search and decrypt the data.

FIG. 22 is an illustration showing setting examples of the employment type coded sequence 507 according to the first setting.

For example, in the user secret key of a user who is employed to take a major career path, a value "1" is set in the major career flag 1001 and "*" is set in the remaining flags, as indicated by an employment type coded sequence 1. In the user secret key of a visiting staff member, a value "1" is set in the visiting staff flag 1003 and "*" is set in the remaining flags, as indicated by an employment type coded sequence 2.

When generating encrypted data, depending on the employment type of the user who can search and decrypt the data, a value "1" is set in the corresponding flag and different random numbers R are set in the remaining flags. For example, when encrypting data such that it can be decrypted by any staff member, a value "1" is set in the major career flag 1001, the general career flag 1002, and the visiting staff flag 1003 each representing a staff member, and different random numbers R are set in the remaining flags, as indicated by an employment type coded sequence 3. In this case, when AND test is conducted for the encrypted data and the employment type coded sequence 1 which indicates a major carrier staff member described above, a coincidence is established in all elements. Thus, the result is true, and the user can search and decrypt the data. Likewise, when AND test is conducted for the encrypted data and employment type coded sequence 2 which indicates a visiting staff member described above, a coincidence is established in all elements. Thus, the result is true, and the user can search and decrypt the data.

When encrypting data such that it can be searched and decrypted only by major career staff members and general staff members, a value "1" is set in the major career flag 1001 and general career flag 1002 and different random numbers R are set in the remaining flags, as indicated by an employment type coded sequence 4. In this case, when AND test is conducted with the example of the employment type coded sequence 2 representing the visiting staff member described above, as the values of the visiting staff flag differ, the result is false, and the user cannot search nor decrypt the data. When, however, AND test is conducted with the example of the encrypted data and the employment type coded sequence 1 representing the major carrier staff member described above, a coincidence is established in all elements. Thus, the result is true, and the user can search and decrypt the data.

According to the second setting, when generating a user secret key, a value "1" is set in the flag of a corresponding employment type, and different random numbers "R" are set in the flags of non-relevant employment types. When generating encrypted data, a value "1" is set in the flag representing an accessible employment type, and different random numbers "R" are set in the flags of non-accessible employment types. The user secret key and the encrypted data are compared by OR test with which only one coincidence is sufficient. Only when the test result is true, the user can search and decrypt the data.

FIG. 23 is an illustration showing setting examples of the employment type coded sequence 507 according to the second setting.

For example, in the user secret key of a user employed to take the position of a major career path, a value "1" is set in the major carrier flag, and different random numbers R are set in the remaining flags, as indicated by an employment type coded sequence 5. In the user secret key of a visiting staff member, a value "1" is set in the visiting staff flag and different random numbers R are set in the remaining flags, as indicated by an employment type coded sequence 6.

When encrypting data, flags are set in the same manner as with the employment type coded sequences 3 and 4 described in the first setting described above. When OR test is conducted for the employment type coded sequence 5 representing a major carrier staff member described above and the employment type coded sequence 3 described above, a coincidence is established in the value of the major career flag. Thus, the result is true, and the user can search and decrypt the data. Likewise, when OR test is conducted for the employment type coded sequence 6 presenting a visiting staff member described above and the employment type coded sequence 3 described above, a coincidence is established in the value of the visiting staff flag. Thus, the result is true, and the user can search and decrypt the data.

When OR test is conducted for the employment type coded sequence 6 representing the visiting staff member described above and the employment type coded sequence 4 described above, as the values of all flags differ, the result is false, and the user cannot search nor decrypt the data. When, however, OR test is conducted for the employment type coded sequence 5 representing the major career staff member described above and the employment type coded sequence 4 described above, a coincidence is established in the value of the major career flag. Thus, the result is true, and the user can search and decrypt the data.

The term information coded sequence 508 will be explained.

Figure 24:
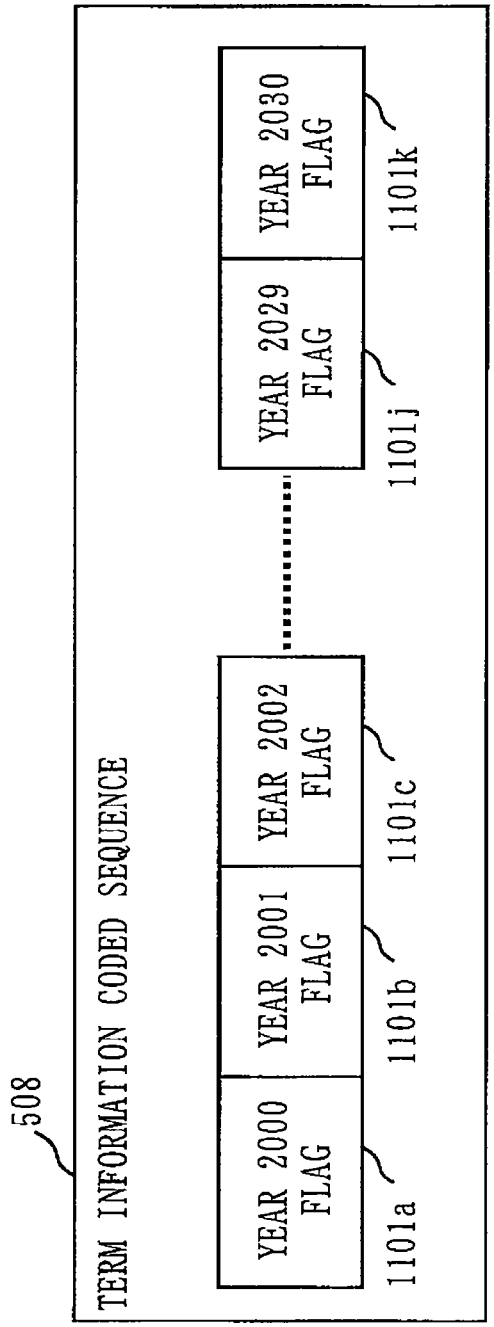
FIG. 24 is an illustration showing a structure example 1 of a term information coded sequence 508.

FIG. 24 is an illustration showing a structure example 1 of the term information coded sequence 508.

The term information coded sequence 508 is used for controlling the accessibility of the user based on the date when the data is generated.

In the structure example 1, the term information coded sequence 508 is constituted by flags prepared for the respective years, for example, a year 2000 flag 1101*a* and a year 2001 flag 1101*b*.

Two types of examples will be shown as a method of setting the flags of the structure example 1 of the term information coded sequence 508.

According to the first setting, when generating a user secret key, a value "1" is set in a flag corresponding to the year when an accessible document was formed, and different random numbers "R" are set in flags corresponding to the years when non-accessible documents were formed. When generating encrypted data, a value "1" is set in a flag corresponding to the year when the data is formed, and "*" are set in the remaining flags. The user secret key and the encrypted data are compared by AND test which tests whether or not a coincidence is established in all elements. Only when the test result is true, the user can search and decrypt the data.

FIG. 25 is an illustration showing setting examples of the term information coded sequence 508 according to the first setting of the structure example 1. In FIG. 25, when compared to FIG. 24, the range is narrowed to the year 2007 through the year 2012 for the sake of explanatory simplicity.

For example, in the user secret key of a user who can search and decrypt data of the year 2007 through 2009, a value "1" is set in the year 2007 flag, the year 2008 flag, and the year 2009 flag and different random numbers R are set in the remaining flags, as indicated by a term information coded sequence 1.

When encrypting data, a value "1" is set in the flag representing the year when the data was generated, and "*" is set in the remaining flags. For example, in data generated in the year 2009, a value "1" is set in the year 2009 flag and "*" are set in the remaining flags, as indicated by a term information coded sequence 2. In this case, when AND test is conducted with the term information coded sequence 1 that allows search and decryption of data of the year 2007 through the year 2009 described above, a coincidence is established in all elements. Thus, the result is true, and the user can search and decrypt the data.

In data generated in the year 2010, a value "1" is set in the year 2010 flag and "*" is set in the remaining flags, as indicated by a term information coded sequence 3. In this case, when AND test is conducted with the term information coded sequence 1 of the user secret key, the value of the year 2010 flag differs. Thus, the result is false, and the user cannot search nor decrypt the data.

According to the second setting, when generating a user secret key, a value "1" is set in a flag corresponding to the year when an accessible document was formed, and different random numbers "R" are set in flags corresponding to the years when non-accessible documents were formed. When generating encrypted data, a value "1" is set in a flag corresponding to the year when the encrypted data was generated, and different random numbers "R" are set in the remaining flags. The user secret key and the encrypted data are compared by OR test with which only one coincidence is sufficient. Only when the test result is true, the user can search and decrypt the encrypted data.

FIG. 26 is an illustration showing setting examples of the term information coded sequence 508 according to the second setting of the structure example 1. In FIG. 26, the range is narrowed to the year 2007 through the year 2012 for the sake of explanatory simplicity, in the same manner as in FIG. 25.

The setting of the term information coded sequence used for generating a user secret key is the same as in the first setting, and its description will accordingly be omitted.

When encrypting data, a value "1" is set in the flag representing the year when the data was generated, and different random numbers R are set in the remaining flags. For example, in data generated in the year 2009, a value "1" is set in the year 2009 flag and different random numbers R are set in the remaining flags, as indicated by a term information coded sequence 4. In this case, when OR test is conducted with the term information coded sequence 1 that allows search and decryption of data of the year 2007 through the year 2009 described above, a coincidence is established in the value of the year 2009 flag. Thus, the result is true, and the user can search and decrypt the data.

In data generated in the year 2010, a value "1" is set in the year 2010 flag and different random numbers R are set in the remaining flags, as indicated by a term information coded sequence 5. In this case, when OR test is conducted with the term information coded sequence 1 of the user secret key, the values of all flags differ. Thus, the result becomes false, and the user cannot search nor decrypt the data.

Figure 27:
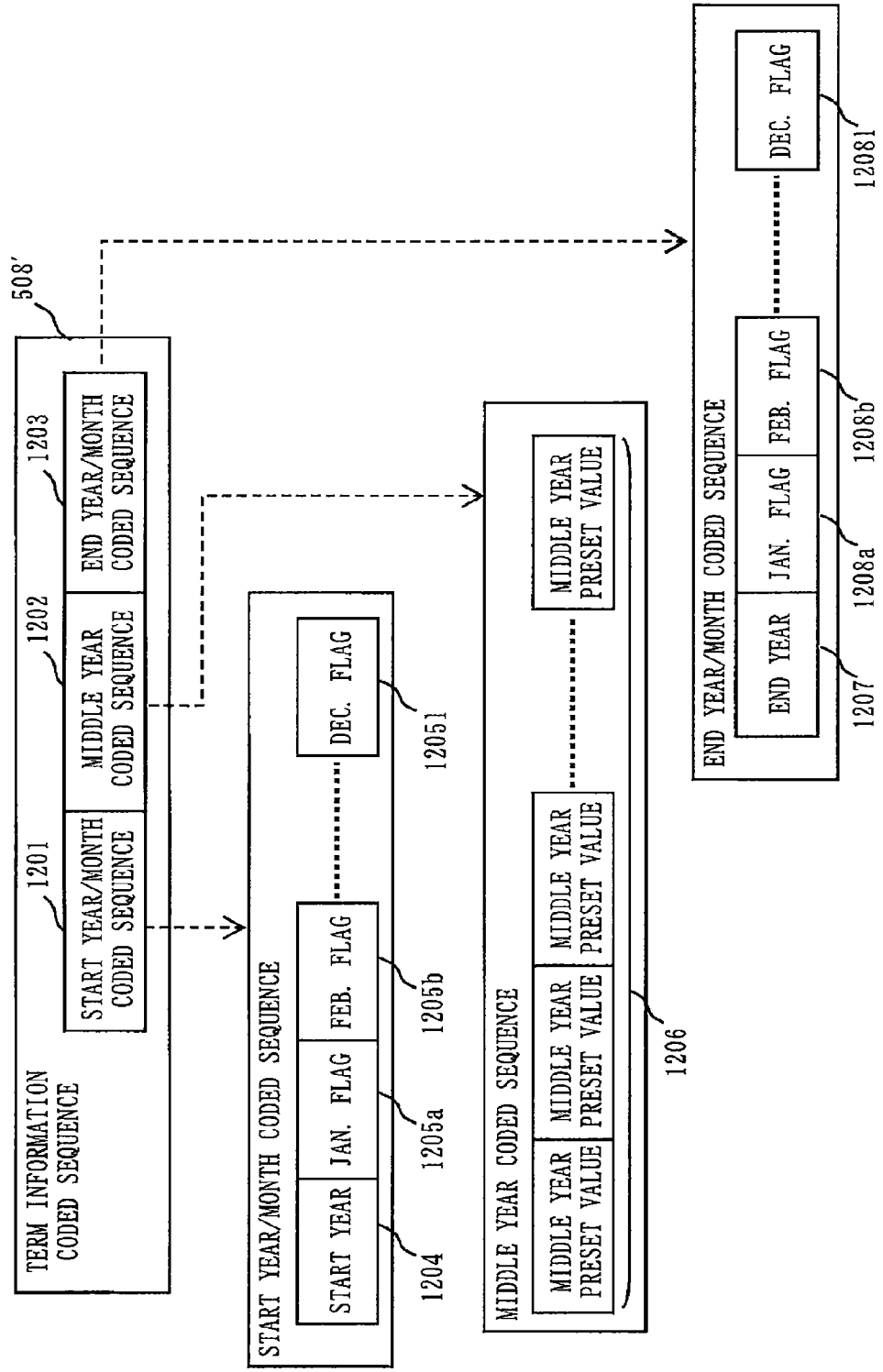
FIG. 27 is an illustration showing a structure example 2 of the term information coded sequence 508.

FIG. 27 is an illustration showing a structure example 2 of the term information coded sequence 508.

According to the second structure example 2, accessibility can be controlled more finely with a smaller number of flags than in the structure example 1. This coded sequence is constituted by a start year/month coded sequence 1201, an end year/month coded sequence 1203, and a middle year coded sequence 1202. The start year/month coded sequence 1201 includes information on a start year 1204 of the accessible term. The end year/month coded sequence 1203 includes information on the end year of the term. The middle year coded sequence 1202 includes information on middle years.

The start year/month coded sequence 1201 is constituted by a start year (start year coded sequence) indicating the year, and a January flag 1205*a* through a December flag 1205*l* (start month coded sequence) each indicating whether or not data generated in the corresponding month is accessible. The end year/month coded sequence 1203 has the same structure as the start year/month coded sequence 1201 and is constituted by an end year coded sequence and an end month coded sequence. The middle year coded sequence 1202 is a coded sequence that lists a middle year preset value 1206 which is information on the years between the start year and the end year.

When generating a user secret key, information on the start year is set in the start year/month coded sequence 1201, information on the end year is set in the end year/month coded sequence 1203, and information on the middle years is set in the middle year coded sequence 1202, based on information on the accessible term. When generating encrypted data, the generation year/month information of the encrypted data is set in the start year/month coded sequence 1201, the middle year coded sequence 1202, and the end year/month coded sequence 1203.

When the user secret key and the encrypted data are to be compared with respect to the term information coded sequence 508, they are compared for the start year/month coded sequence 1201, the middle year coded sequence 1202, and the end year/month coded sequence 1203 separately. When any one comparison result is true, that is, when the result of OR test is true, it is regarded that the condition is satisfied. When comparison is to be performed on the start year/month coded sequence 1201, if the start year is the same, AND test or OR test may be conducted from the January flag through the December flag with the method indicated in the structure example 1. Comparison on the end year/month coded sequence 1203 is conducted in the same manner as the comparison on the start year/month coded sequence 1201. Regarding the middle year coded sequence 1202, OR test or inclusion relation test may be performed to determine that a coincidence is established in any element.

FIGS. 28 to 30 are illustrations showing setting examples of the term information coded sequence 508 of the structure example 2.

A term information coded sequence 6 shown in FIG. 28 is a setting example of the term information coded sequence 508 which is set in the user secret key of a user who can search and decrypt data generated between April 2003 and December 2009. In this case, the respective month flags included in the start year/month coded sequence 1201 are compared with those included in the end year/month coded sequence 1203 by OR search.

As shown in FIG. 28, information on the accessibility for the year 2003 is set in a start year/month coded sequence 6. More specifically, the year 2003 is set as the start year. Different random numbers R are set in the flags corresponding to January through March which are non-accessible months, and a value "1" is set in the flags of April through December which are accessible months. Years 2004 through 2008 which are accessible years are set in a row in a middle year coded sequence 6, and different random numbers R are set in empty portions. The year 2009 which is the last year of the accessible term is set in an end year/month coded sequence 6, and a value "1" is set in the flags of January through December which are accessible months.

A term information coded sequence 7 shown in FIG. 29 shows setting examples of the term information coded sequence 508 which are to be set in a user secret key. The term information coded sequence 7 is different from the term information coded sequence 6 in that the accessible term ends in March 2010.

Accordingly, a start year/month coded sequence 7 is the same as the start year/month coded sequence 6. Information of the year 2009 is additionally set in the start year/month coded sequence 7, as compared to the start year/month coded sequence 6. In an end year/month coded sequence 7, information on the year 2010 which is the end year is set in accordance with the same rule as that for the end year/month coded sequence 6.

A term information coded sequence 8 shown in FIG. 30 shows setting examples of the term information coded sequence 508 of encrypted data generated in April 2009. In a start year/month coded sequence 1201, the year 2009 is set as the start year. As the month flag, a value "1" is set only in a flag corresponding to April which is the month when the data is generated, and different random numbers R are set in the remaining month flags. An end year/month coded sequence 1203 is set in the same manner. In a middle year coded sequence 1202, the year 2009 is set in all middle years.

For example, assume that the term information coded sequence 6 of the user secret key shown in FIG. 28 and the term information coded sequence 8 of the encrypted data shown in FIG. 30 are to be compared. Comparison is performed between the start year/month coded sequence 6 and the start year/month coded sequence 8, between the middle year/month coded sequence 6 and the middle year/month coded sequence 8, and between the end year/month coded sequence 6 and the end year/month coded sequence 8. In this case, when the end year/month coded sequence 6 and the end year/month coded sequence 8 are compared, since they are the same in the end year, the result is true, and since their month flags are the same in the April flag, the result is true, so that the comparison result on the end year/month coded sequence also is true. As a result, the encrypted data formed with the term information coded sequence 8 can be searched with the user secret key formed with the term information coded sequence 6.

Likewise, assume that the term information coded sequence 7 of the user secret key shown in FIG. 29 and the term information coded sequence 8 of the encrypted data shown in FIG. 30 are to be compared. A coincidence is established in the middle years of the middle year coded sequence 7 and the middle years of the middle year coded sequence 8, so the result of the OR test conducted with the listed middle years is true, and the comparison result of the middle year coded sequences is true. As a result, the encrypted data formed with the term information coded sequence 8 can be searched with the user secret key formed with the term information coded sequence 7.

Figure 31:
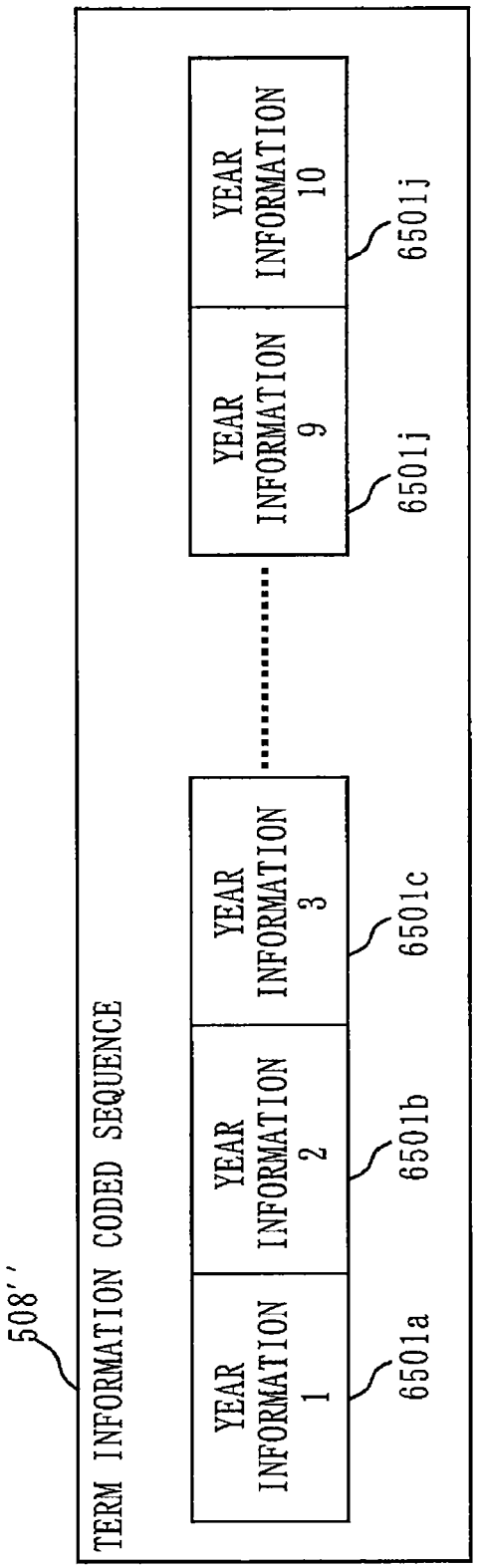
FIG. 31 is an illustration showing a structure example 3 of the term information coded sequence 508.

FIG. 31 is an illustration showing a structure example 3 of the term information coded sequence 508.

In the structure example 3, the flag utilization efficiency is higher than in the structure example 1. This coded sequence is constituted by year information 1 through year information 10 where years are set. A user secret key and encrypted data are compared by inclusion relation test to check whether or not values in a term information coded sequence 508 included in the encrypted data appear as values in a term information coded sequence 508 set in the user secret key.

When generating the user secret key, the year is set in the year information 1 through year information 10 based on information on an accessible term. When generating the encrypted data, the generation year is set in the year information 1.

FIG. 32 is an illustration showing setting examples of the structure example 3 of the term information coded sequence 508.

When, for example, data between the year 2007 and the year 2009 is accessible, a term information coded sequence in which the years 2007, 2008, and 2009 are specified, as indicated by a term information coded sequence 9, is set in the user secret key. A term information coded sequence in which the year 2009 is set in the year information 1, as indicated by a term information coded sequence 10, is set in encrypted data generated in the year 2009. When the term information coded sequence 9 and the term information coded sequence 10 are compared by inclusion relation test, the value of the year 2009 which is set in the encrypted data appears in the term information coded sequence 9 set in the secret key. Thus, the data can be decrypted and searched.

In this case, the structure example 3 includes only year information. Alternatively, a similar structure may be possible in which the start year and end year include month information. Namely, in the example shown in FIG. 32, the year 2007 which is the start year and the year 2009 which is the end year may include month information. More specifically, month information consisting of month information 1 to month information 12 may be assigned to each of the start year and the end year. When generating a user secret key, the month may be set based on the information on the accessible term. When generating the encrypted data, the generation month may be set in the month information.

In this case, the term information of each month can be set more easily than in the structure example 2.

The delegatee information coded sequence 509 will be explained.

FIG. 33 is an illustration showing a structure example of the delegatee information coded sequence 509.

A user in a post such as an executive or director sometimes authorizes a secretary to do his or her task. The delegatee information coded sequence 509 is a flag used to limit documents that the secretary can access.

The delegatee information coded sequence 509 is constituted by a secretary-to-executive flag 1301, an acting director flag 1302, an acting manager flag 1303, an acting chief flag 1304, and a colleague flag 1305. The secretary-to-executive flag 1301 indicates that the executive delegates the task to the secretary. The acting director flag 1302 indicates that the director delegates the task to a secretary or acting director who can execute the task of the director. When generating a delegation user secret key, a value "1" is set in a corresponding flag in accordance with the attribute of the delegation user. When generating encrypted data, a value "1" is set if access is to be allowed.

The user secret key and the encrypted data are compared regarding the delegatee information coded sequence 509 by AND test.

FIG. 34 is an illustration showing setting examples of the delegatee information coded sequence 509.

In the user secret key possessed by the user himself or herself, "*" is set in all flags, as indicated by a delegatee information coded sequence 1. When an executive is to delegate the data access right to his or her secretary, a delegation user secret key is generated by setting a value "1" in the secretary-to-executive flag 1301 and "*" in the remaining flags, as indicated by a delegatee information coded sequence 2, and the delegation user secret key is transmitted to the secretary. When the director is to delegate the data access right to his or her secretary who is an acting director, a delegation user secret key is generated by setting a value "1" in the acting director flag 1302 and "*" in the remaining flags, as indicated by a delegatee information coded sequence 3, and the delegation user secret key is transmitted to the secretary.

When generating data, if data access is to be allowed only to the identified person and not to an alternate person, then different random numbers R are set in all flags, as indicated by a delegatee information coded sequence 4. In this case, since the result of AND test is true only with the identified person who possesses the user secret key indicated by the delegatee information coded sequence 1, only the identified person can access the data. With a user who possesses a delegation user secret key as indicated by the delegatee information coded sequence 2 or delegatee information coded sequence 3, since the value "1" is set in a different flag, the result of the AND test is false, and this user cannot search nor decrypt the data.

When decryption is to be allowed not only to the identified person but also to the secretary to the executive, a value "1" is set in the secretary-to-executive flag 1301 and different random numbers R are set in the remaining flags, as indicated by a delegatee information coded sequence 5. In this case, the result of AND test is true only with a user secret key having the delegatee information coded sequence 1 and a delegation user secret key having the delegatee information coded sequence 2, so the user can search and decrypt the data. With, however, a delegation user secret key as indicated by the delegatee information coded sequence 3, the result of AND test is false, and the user cannot search or decrypt the data.

Figure 35:
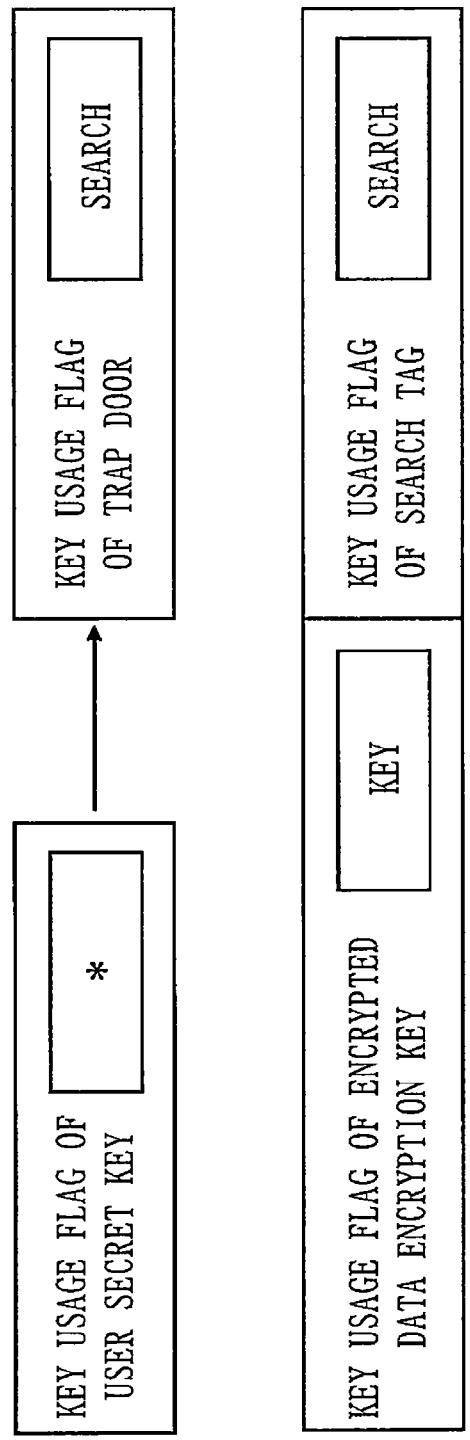
FIG. 35 is an illustration showing setting examples of a key usage flag 510.

FIG. 35 is an illustration showing setting examples of the key usage flag 510.

When generating the user secret key, "*" indicating that this key can be used both for data decryption and trap door generation is set in the key usage flag 510. When generating a trap door from the user secret key, a value representing "search" is set in the key usage flag 510. In generation of decrypted data, when generating a tag to be used for search, a value representing "search" is set in the key usage flag 510. When encrypting a data encryption key, a value representing "key" is set in the key usage flag 510.

The user secret key and the encrypted data are compared by AND test.

For example, in the trap door, a value representing "search" is set as a flag. Namely, as the value representing "search", which is the same as in the flag of the tag of the encrypted data, is set, search can be performed. When, however, the trap door is compared with the encrypted data encryption key, the flag values always differ. Therefore, decryption cannot be performed. In the user secret key, "*" is stored as the flag. When the flag of the user secret key is compared with the flag of the encrypted data encryption key by AND test, the result is always true, so decryption can be performed.

Concerning the key usage flag 510, the above explanation refers to a case where a tag for search and an encrypted data encryption key which is generated by encrypting the data encryption key are encrypted differently and added to the key usage flag 510 (the encrypted data A is shown in FIG. 5).

However, with the inner-product predicate encryption described in Non-Patent Literature 2, the tag and the encrypted data encryption key can be made as one item, which is tag-cum-data encryption key. Namely, the structure of the encrypted data 13 shown in FIG. 7 can be employed. In this case, the key usage flag 510 need not be included in the coded sequence.

The search query coded sequence 511 will be described.

The search query coded sequence 511 is a field which is set when data is to be searched. The search query coded sequence 511 must have an appropriate structure to match the structure of the data managed by the enterprise. For example, when data is structured and managed like a database, the search query coded sequence must also be structured accordingly to verify whether keywords coincide in corresponding sequences. On the other hand, assuming a general document, as the data is not structured, the coded sequences must be made such that they will not influence the order of the keywords.

FIG. 36 is an illustration showing a setting example 1 of the search query coded sequence 511. The setting example of FIG. 36 is directed to a case where AND search of a keyword is to be conducted for a database that manages the record of purchase and disposal of goods.

When decrypting data, data of respective elements stored in the database are set in the search query coded sequence 511. For example, assume that data on the purchase of three PC units for 100,000 yen per unit on Oct. 5, 2009 is kept in the first row of the database. In the search query coded sequence 511, the respective elements of the coded sequence are set to correspond to the respective columns of the database, as indicated by the search query coded sequence 1. Likewise, assume that data on the purchase of two PC units for 80,000 yen per unit on Nov. 10, 2009 is kept in the second row of the database. The search query coded sequence 511 is set as indicated by a search query coded sequence 2. Also, assume that data on the disposal of one PC unit on Jan. 15, 2010 is kept in the third row of the database. The search query coded sequence 511 is set as indicated by a search query coded sequence 3. If an element of the database is empty (not set), this is represented by "–" as in a column 7 of the search query coded sequence 3.

When generating a user secret key, in the search query coded sequence 511, generally, all elements corresponding to the respective columns are set to "*", as indicated by a search query coded sequence 4, so that any column can be searched.

When generating a trap door, assume that the user wishes to search the record of the purchase of PCs in the year 2009, and specifies this as the keyword. In this case, the search query coded sequence 511 is formed as indicated by a search query coded sequence 5. This generation of the search query coded sequence 5 is carried out when generating the trap door from the user secret key. When the search query coded sequence 5 is AND-tested with each of the search query coded sequence 1 and search query coded sequence 2 in the respective elements, a coincidence is established in all elements. Thus, the test result is true, enabling search. This signifies that when the encrypted data is searched with the trap door, the encrypted data hits the search. When the search query coded sequence 5 and the search query coded sequence 3 are AND-tested in respective elements, they differ in the element of a column 8. Thus, the test result is false. This signifies that when the encrypted data is searched with the trap door, the encrypted data does not hit the search. Namely, the record of PC disposal is not searched.

FIG. 37 is an illustration showing a setting example 2 of the search query coded sequence 511. The setting example of FIG. 37 is used in a case of general documents. FIG. 37 particularly shows a case where whether search keywords appear in the data is to be checked by inclusion relation test without regard to the keyword appearing order.

When encrypting data, among keywords included in the document, those which will be used for search afterwards are set in the search query coded sequence 511 in an arbitrary order. For example, suppose a report on a business travel of November, 2009 to A company in Tokyo with the result of an order entered. In this case, the search query coded sequence 511 is formed as indicated by a search query coded sequence 6. Also assume a case where, being an exhibitor in a trade fair in the year 2009, the company accepted some 50 visitors, and among them Mr./Ms Tanaka with B company phoned afterwards for a business meeting. In this case, the search query coded sequence 511 is formed as indicated by a search query coded sequence 7.

When generating a user secret key, in the search query coded sequence 511, all elements are set empty ("–"), as indicated by a search query coded sequence 8, so that search can be conducted with any keyword, in the same manner as in the example shown in FIG. 36.

When generating a trap door, assume that the user wishes to search documents formed in the year 2009. In this case, a search query coded sequence 9 that specifies the year 2009 is generated. This search query coded sequence is compared with the search query coded sequence of encrypted data by inclusion relation test to check whether or not the search query coded sequence of the trap door is included in the search query coded sequence of the encrypted data. In this case, the result of inclusion relation test is true with encrypted data including the keyword "year 2009" specified in an element 1 of the search query coded sequence 9, namely, both the search query coded sequences 6 and 7 in this example. Namely, both the search query coded sequences 6 and 7 hit the search.

When the keyword that the user wishes to search is trade fair, a search query coded sequence as indicated by a search query coded sequence 10 is generated. When the search query coded sequences are compared, since it is the search query coded sequence 7 that includes "trade fair" indicated by an element 1 of the search query coded sequence 10, the result of inclusion relation test of the search query coded sequences 10 and 7 is true. On the other hand, since a search query coded sequence 6 does not include the keyword "trade fair", the result of inclusion relation test of the search query coded sequences 10 and 6 is false. Namely, while the search query coded sequence 7 hits the search, the search query coded sequence 6 does not.

As described above, examples of the attribute information coded sequence 501 include various types of coded sequences.

For example, in one coded sequence, attribute items where the attribute of the user is to be set are assigned to its respective entries, as in the belonging-office information coded sequence 503. In the belonging-office information coded sequence 503, attribute items such as the company ID 601 and business place ID 602 are assigned to the respective entries of the coded sequence. For example, if the attribute item is company ID 601, attribute information representing a company is set.

For example, in another coded sequence, the attributes of the user are assigned to its respective entries, as in the post information coded sequence 504. In the post information coded sequence 504, the user attributes such as the executive class flag 701 representing an executive and the director class flag 702 representing a director are assigned to the respective entries of the coded sequence. A value "1" representing that the user is in a certain post is set in a corresponding user post flag.

For example, in still another coded sequence, the attributes of data to be encrypted are assigned to its respective entries, as in the secret level coded sequence 506. In the secret level coded sequence 506, the data attributes such as the top-secret flag 901 representing top-secret data are assigned. A value "1" representing a certain secret level is set in a corresponding data secret level flag.

Still another coded sequence, such as the term information coded sequence 508, has a particular structure different from any other coded sequence.

The coded information generation part 206 of the key management server 201 and the coded information generation part 306 of the access terminal 301 assign the codes differently depending on the type of the coded sequence of the attribute information coded sequence 501.

In the case of a coded sequence having entries to which attribute items are assigned, the coded information generation part 206 of the key management server 201 sets attribute information which represents the attribute of the user who uses the decryption key and which corresponds to the attribute item assigned to its entry. The coded information generation part 206 generates coded information by setting "*" in an entry of the coded sequence where no attribute information is to be set.

In this case, the coded information generation part 306 of the access terminal 301 sets, in each entry of the coded sequence, attribute information which limits the user who can decrypt the encrypted data and which corresponds to the attribute item assigned to this entry. The coded information generation part 306 sets "*" in an entry of the coded sequence where no attribute information is to be set.

The user secret key and the encrypted data are then compared by AND test.

In the case of a coded sequence having entries to which the user attributes are assigned, the coded information generation part 206 of the key management server 201 sets a relevance value "1" in an entry to which an attribute corresponding to the attribute of the user who uses a decryption key is assigned. When the user secret key and the encrypted data are to be compared by AND test, the coded information generation part 206 sets "*" in an entry of the coded sequence where a relevance value "1" is not to be set. When the user secret key and the encrypted data are to be compared by OR test, the coded information generation part 206 sets a random number R in an entry of the coded sequence where a relevance value "1" is not to be set.

In this case, the coded information generation part 306 of the access terminal 301 sets a relevance value "1" in each entry of the coded sequence where an attribute corresponding to a user who can decrypt the decrypted data is assigned. The coded information generation part 306 sets a random number R in an entry of the coded sequence where a relevance value "1" is not to be set.

In the case of a coded sequence having entries to which the attributes of the data to be encrypted are assigned, the coded information generation part 206 of the key management server 201 sets a relevance value "1" in an entry to which an attribute corresponding to the attribute (authority) of the user who uses the decryption key is assigned. The coded information generation part 206 sets a random number R in an entry of the coded sequence where a relevance value "1" is not to be set.

In this case, the coded information generation part 306 of the access terminal 301 sets a relevance value "1" in an entry to which an attribute corresponding to the attribute of the data is assigned. When the user secret key and the encrypted data are to be compared by AND test, the coded information generation part 306 sets "*" in an entry of the coded sequence where a relevance value "1" is not to be set. When the user secret key and the encrypted data are to be compared by OR test, the coded information generation part 306 sets a random number R in an entry of the coded sequence where a relevance value "1" is not to be set.

Although not included in the attribute information coded sequence 501, one coded sequence has entries to which attribute items where the attribute of the data to be encrypted is set are assigned. This is directed to a case where, for example, a secret level ID is set for each secret level in the coded sequence, different from the secret level coded sequence 506 in which a flag is set to each secret level.

In this case, the coded information generation part 206 of the key management server 201 sets, in an entry of the coded sequence, attribute information which represents the attribute (authority) of the user who uses the decryption key and which corresponds to the attribute item assigned to this entry. The coded information generation part 206 generates coded information by setting "*" in an entry of the coded sequence where no attribute information is to be set.

In this case, the coded information generation part 306 of the access terminal 301 sets, in each entry of the coded sequence, attribute information which represents the attribute of the data and which corresponds to the attribute item assigned to this entry. The coded information generation part 306 sets "* in an entry of the coded sequence where no attribute information is to be set.

Then, the user secret key and the encrypted data are compared by AND test.

A vectorization method of transforming coded information generated using the attribute information coded sequence 501 described above into a predicate vector in a user secret key and an attribute vector in encrypted data will be described. More specifically, a method with which the vector generation part 207 of the key management server 201 generates a predicate vector from the coded information, and a method with which the vector generation part 307 of the access terminal 301 generates an attribute vector or predicate vector from the coded information, will be described.

The vectorization method will be explained separately for each of AND test, OR test, and inclusion relation test. With the actual attribute information coded sequence 501, in practice, AND test, OR test, or inclusion relation test is selected arbitrarily for each coded sequence. Therefore, generated coded information may include a portion to be compared by AND test, a portion to be compared by OR test, and a portion to be compared by inclusion relation test. Namely, the test method may differ depending on the coded sequences of the attribute information coded sequence 501. For example, the belonging-office information coded sequence 503 may be compared by AND test, and the post information coded sequence 504 may be compared by OR test. In this case, the attribute vector and predicate vector may be generated in the following manner. Of the coded information, the portion to be compared by AND test may employ a vectorization method suitable for comparison by AND test. The portion to be compared by OR test may employ a vectorization method suitable for comparison by OR test. The portion to be compared by inclusion relation test may employ a vectorization method suitable for comparison by inclusion relation test.

FIG. 38 is an illustration explaining a vectorization method in a case where comparison of a coded sequence in the attribute information coded sequence 501 is to be performed by AND test.

The fundamental idea will be explained based on the following polynomial 1.

$$r_1(b_1-a_1)+r_2(b_2-a_2)+r_3(b_3-a_3) \qquad \text{(Polynomial 1)}$$

Polynomial 1 consists of random numbers $r_1$, $r_2$, and $r_3$, and values $a_1$, $a_2$, $a_3$, $b_1$, $b_2$, and $b_3$. The value of this polynomial is always 0 independently of the random numbers $r_1$, $r_2$, and $r_3$ when all of $b_1=a_1$, $b_2=a_2$, and $b_3=a_3$ are established. In other words, the value of this polynomial is always 0 independently of the random numbers $r_1$, $r_2$, and $r_3$ when $b_1=a_1$ AND $b_2=a_2$ AND $b_3=a_3$ is established.

Let the values $a_1$, $a_2$, and $a_3$ be elements of a coded sequence needed for generating encrypted data, and the values $b_1$, $b_2$, and $b_3$ be elements of a coded sequence to be included in a secret key. In this case, if whether or not the evaluation result of polynomial 1 is 0 can be checked by using an inner product, then whether or not $b_1=a_1$ AND $b_2=a_2$ AND $b_3=a_3$ is established can be checked by using an inner product.

In view of this, an attribute vector is generated using the values $a_1$, $a_2$, and $a_3$ which are elements of the coded sequence, and a predicate vector is generated using the values $b_1$, $b_2$, and $b_3$ which are elements of the coded sequence.

When generating the attribute vector, to obtain an i-th element, two components, that is, a value "1" and a value "$-a_i$", are generated, and elements each including two components thus generated are sequentially lined up to correspond to every elements of the coded sequence, thus forming an attribute vector x. That is, the attribute vector x is as shown in FIG. 38. If the element $a_i$ of the coded sequence is a numerical value, this numerical value is employed directly. If the element $a_i$ of the coded sequence is a character string, a value obtained by numeralizing the character string is employed. In a special case, if the element $a_i$ of the coded sequence is "*", two elements, that is, 0 and 0, are set as the elements of an attribute vector corresponding to the element $a_i$ of the coded sequence.

When generating the predicate vector, to obtain an i-th element, two components, that is, a value "$b_i$" and a value "1", are generated, and elements each including two components thus generated are sequentially lined up to correspond to every elements of the coded sequence, thus forming a predicate vector v. That is, the predicate vector v is as shown in FIG. 38. If the element $b_i$ of the coded sequence is a numerical value, this numerical value is employed directly. If the element $b_i$ of the coded sequence is a character string, a value obtained by numeralizing the character string is employed. In a special case, if the element $b_i$ of the coded sequence is "*", two elements, that is, 0 and 0, are set the as elements of a predicate vector corresponding to the element $b_i$ of the coded sequence.

In fine, an attribute vector $\vec{x}=(1, -a_1, 1, -a_2, 1, -a_3)$. Also, a predicate vector $\vec{v}=(b_1, 1, b_2, 1, b_3, 1)$.

The minus sign of the element $a_i$ of the attribute vector x and the minus sign of the element $b_i$ of the predicate vector may be inversed, and an attribute vector $\vec{x}=(1, a_1, 1, a_2, 1, a_3)$ and a predicate vector $\vec{v}=(-b_1, 1, -b_2, 1, -b_3, 1)$ may be obtained.

In polynomial 1, the respective terms are the products with the corresponding random numbers $r_1$, $r_2$, and $r_3$. In the above vectorization, the respective terms are not the products with the corresponding random numbers. This is due to the following reason. Encryption using the inner-product predicate encryption described in the Non-Patent Literature 2 includes multiplication with random numbers. Hence, no random numbers are needed in vectorization. In a case where encryption using an inner-product predicate encryption to be employed does not include multiplication with random numbers, the elements may be multiplied by random numbers, respectively, when conducting vectorization.

With AND test, the elements $a_1$, $a_2$, and $a_3$, and the elements $b_1$, $b_2$, and $b_3$ can be vectorized as independent elements. Therefore, the attribute ID to be described later is given to each element in the AND test coded sequence.

FIG. 39 is an illustration explaining a vectorization method in a case where comparison of a coded sequence in the attribute information coded sequence 501 is to be performed by OR test. In the vectorization example of FIG. 39, three elements are compared, and it suffices if only one coincidence is established. This prevents the example from becoming complicated. Vectorization with the same procedure can be conducted for any general n pieces of elements.

The fundamental idea will be explained based on the following polynomial 2.

$$(b_1-a_1)(b_2-a_2)(b_3-a_3) = b_1b_2b_3 - a_3b_1b_2 - a_2b_1b_3 - a_1b_2b_3 + a_2a_3b_1 + a_1a_3b_2 + a_1a_2b_3 - a_1a_2a_3 \qquad \text{(Polynomial 2)}$$

Polynomial 2 includes three variables. The value of this polynomial is 0 when at least one of $b_1=a_1$, $b_2=a_2$, and $b_3=a_3$ is established. In other words, the value of this polynomial is 0 when $b_1=a_1$ OR $b_2=a_2$ OR $b_3=a_3$ is established.

Let the values $a_1$, $a_2$, and $a_3$ be elements of a coded sequence needed for generating encrypted data, and the values $b_1$, $b_2$, and $b_3$ be elements of a coded sequence to be included in a secret key. In this case, if whether or not the evaluation result of polynomial 2 is 0 can be checked by using an inner product, then whether or not $b_1=a_1$ OR $b_2=a_2$ OR $b_3=a_3$ is established can be checked by using an inner product.

In view of this, an attribute vector is generated using the values $a_1$, $a_2$, and $a_3$ which are elements of the coded sequence, and a predicate vector is generated using the values $b_1$, $b_2$, and $b_3$ which are elements of the coded sequence.

When generating the attribute vector, concerning the respective terms of polynomial 1, only the terms related to the values $a_1$, $a_2$, and $a_3$ which are elements of the coded sequence needed for generating encrypted data are extracted and vectorized. For example, the first term is $b_1b_2b_3$, and no information related to the elements $a_1$, $a_2$, and $a_3$ is available, so the first element of the vector is determined as 1. The second term is $-a_3b_1b_2$. As information related to the elements $a_1$, $a_2$, and $a_3$, $-a_3$ is extracted and determined as the second element of the vector. This operation is repeated for all the terms in the same manner, so that the attribute vector x shown in FIG. 39 is obtained. When any one element in the coded sequence is "*", the result of OR test is always true. Hence, assume that when any one element of the coded sequence is "*", the attribute vector corresponding to this coded sequence is a 0 vector in which all elements are 0.

The predicate vector can be formed with the same procedure, except that the values $b_1$, $b_2$, and $b_3$ are to be considered instead of the values $a_1$, $a_2$, and $a_3$. For example, the first term is $b_1b_2b_3$. As information related to the element $b_1b_2b_3$, $b_1b_2b_3$ is extracted and determined as the first element of the vector. The second term is $-a_3b_1b_2$. As information related to the element $b_1b_2b_3$, $b_1b_2$ is extracted and determined as the second element of the vector. If a negative number is set in generating the attribute vector, a positive number is set in the predicate vector. This operation is repeated for all the terms in the same manner, so that the predicate vector x shown in FIG. 39 can be obtained. If a negative number is set in generation of the attribute vector, a positive number is set in the predicate vector. When any one element in the coded sequence is "*", the result of OR test is always true. Hence, when any one element of the coded sequence is "*", the predicate vector corresponding to this coded sequence is a 0 vector in which all elements are 0.

In OR test, since the elements $a_1$, $a_2$, and $a_3$ and the elements $b_1$, $b_2$, and $b_3$ are vectorized by being closely related to each other, as the attribute ID to be described later, one attribute ID is added to an OR test coded sequence which is to be subjected to OR test.

FIG. 40 is an illustration explaining a vectorization method in a case where comparison of the coded sequence in the attribute information coded sequence 501 is to be performed by inclusion relation test. The inclusion relation test to be described hereinafter is to check whether or not all elements appearing in an inclusion relation coded sequence 2 appear as the elements indicated by an inclusion relation coded sequence 1. In the vectorization example of FIG. 40, three elements are compared, and it suffices if only one coincidence is established. This prevents the example from becoming complicated. Vectorization can be conducted with the same procedure for any general n pieces of elements.

The fundamental idea will be explained based on the following polynomial 3.

$$(b-a_1)(b-a_2)(b-a_3)=b^3-(a_1+a_2+a_3)b^2+(a_1a_2+a_1a_3+a_2a_3)b-a_1a_2a_3 \quad \text{(Polynomial 3)}$$

The value of this polynomial is 0 when at least one of $b=a_1$, $b=a_2$, and $b=a_3$ is established. In other words, the value of this polynomial is 0 when b is included in at least one of $a_1$, $a_2$, and $a_3$.

Let the values $a_1$, $a_2$, and $a_3$ be elements of a coded sequence needed for generating encrypted data, and the value b be an element of a coded sequence to be included in a secret key. In this case, if whether or not the evaluation result of polynomial 3 is 0 can be checked by using an inner product, then whether or not b is included in at least one of $a_1$, $a_2$, and $a_3$ can be checked by using an inner product.

In view of this, an attribute vector is generated using the values $a_1$, $a_2$, and $a_3$ which are elements of the coded sequence, and a predicate vector is generated using the value b which is an element of the coded sequence.

When generating the attribute vector, concerning the respective terms of polynomial 3, only the terms related to the values $a_1$, $a_2$, and $a_3$ which are elements of the coded sequence needed for generating encrypted data are extracted and vectorized. For example, the first term is $b^3$, and no information related to the elements $a_1$, $a_2$, and $a_3$ is available, so the first element of the vector is determined as 1. The second term is $-(a_1+a_2+a_3)b^2$. As information related to the elements $a_1$, $a_2$, and $a_3$, $-(a_1+a_2+a_3)$ is extracted and determined as the second element of the vector. This operation is repeated for all the terms in the same manner, so that the attribute vector x shown in FIG. 40 is obtained.

The predicate vector can be formed with the same procedure, except that the value b is to be considered instead of the values $a_1$, $a_2$, and $a_3$. For example, the first term is $b^3$. As information related to the element b, $b^3$ is extracted and determined as the first element of the vector. The second term is $-(a_1+a_2+a_3)b^2$. As information related to the element b, $b^2$ is extracted and determined as the second element of the vector.

If a negative number is set in generating the attribute vector, a positive number is set in the predicate vector. This operation is repeated for all the terms in the same manner, so that the predicate vector can be obtained.

Likewise, polynomial 4 is 0 when at least one of $b_1=a_1$, $b_1=a_2$, and $b_1=a_3$ is established and at least one of $b_2=a_1$, $b_2=a_2$, and $b_2=a_3$ is established simultaneously.

$$(b_1-a_1)(b_1-a_2)(b_1-a_3)+(b_2-a_1)(b_2-a_2)(b_2-a_3)=(b_1^3+b_2^3)-(a_1+a_2+a_3)(b_1^2+b_2^2)+(a_1a_2+a_1a_3+a_2a_3)(b_1+b_2)-a_1a_2a_3 \quad \text{(Polynomial 4)}$$

Let the values $a_1$, $a_2$, and $a_3$ be elements of a coded sequence needed for generating encrypted data, and the values $b_1$ and $b_2$ be element of a coded sequence to be included in a secret key. In this case, if whether or not the evaluation result of polynomial 4 is 0 can be checked by using an inner product, then whether or not $b_1$ is included in at least one of $a_1$, $a_2$, and $a_3$ and $b_2$ is included in at least one of $a_1$, $a_2$, and $a_3$ simultaneously can be checked by using an inner product.

The attribute vector is the same as that with polynomial 3, and its explanation will accordingly be omitted.

When generating the predicate vector, concerning the respective terms of polynomial 4, only the terms related to the values $b_1$ and $b_2$ which are elements of the coded sequence are extracted and vectorized. For example, the first term is $(b_1^3+b_2^3)=\Sigma b_i^3$. As information related to the elements $b_1$ and $b_2$, $\Sigma b_i^3$ is extracted and determined as the first element of the vector. The second term is $-(a_1+a_2 a_3)(b_1^2+b_2^2)$. As information related to the elements $b_1$ and $b_2$, $(b_1^2+b_2^2)=\Sigma b_i^2$ is extracted and determined as the second element of the vector. This operation is repeated for all the terms in the same manner, so that the predicate vector can be obtained as shown in FIG. 40.

If the value is a symbol "−" representing non-designation, it indicates that this value is not utilized in vectorization. For example, assuming a case where the element $b_2$ specified as the predicate is not designated, this case may be excluded from calculation of $\Sigma b_i^3$ for i=2. If the element $a_3$ specified as the attribute is not designated, $a_3$ may be regarded as 0 or a random number, or $(b_i-a_3)$ need not be multiplied at all when calculating a polynomial.

In the case of inclusion relation test, the respective elements $a_1$, $a_2$, and $a_3$, and $b_1$, $b_2$, and $b_3$ are vectorized as they are closely related to each other. Hence, as the attributes ID to be described later, one attribute ID will be added to the inclusion relation test coded sequence.

In the above explanation, different methods are presented for AND test, OR test, and inclusion relation test, respectively. When AND test and OR test are to be combined, the combination can be realized by generating an attribute vector or predicate vector by combining the above methods. For example, assume that AND test is to be performed for the belonging-office information coded sequence 503 and that OR test is to be performed for the post information coded sequence 504. In this case, regarding the belonging-office information coded sequence 503, an attribute vector and a predicate vector may be generated by the method of AND test described above, and regarding the post information coded sequence 504, an attribute vector and a predicate vector may be generated by the method of OR test described above.

<4. Operation of Confidential Search System 100>

The operation of the confidential search system 100 will be explained.

The following explanation refers to a case where the inner-product predicate encryption described in Non-Patent Literature 2 is used as the inner-product predicate encryption.

Accordingly, the encrypted data has the structure of the encrypted data B shown in FIG. 7, and the data flows as shown in FIG. 8.

The operation of the confidential search system 100 is separated into six parts, namely, (1) system initialization, (2) interim secret key generation, (3) user secret key generation, (4) encrypted data generation, (5) keyword search, and (6) delegation user secret key generation.

(1) System initialization is a process in which the key management server 201 generates a public parameter and a master key. (2) Interim secret key generation is a process in which the key management server 201 generates a new interim secret key from a master key or interim secret key. (3) User secret key generation is a process in which the key management server 201 generates a user secret key from a master key or interim secret key. (4) Encrypted data generation is a process in which mainly the user encrypts data by using the access terminal 301 and keeps the encrypted data in the data center 401. (5) Keyword search is a process in which mainly the user searches, with the access terminal 301, encrypted data kept in the data center 401 by using a search keyword, thus obtaining data. (6) Delegation user secret key generation is a process in which mainly the user generates, with the access terminal 301, a delegation user secret key from a user secret key.

The respective operation will be explained based on the flowcharts.

Figure 41:
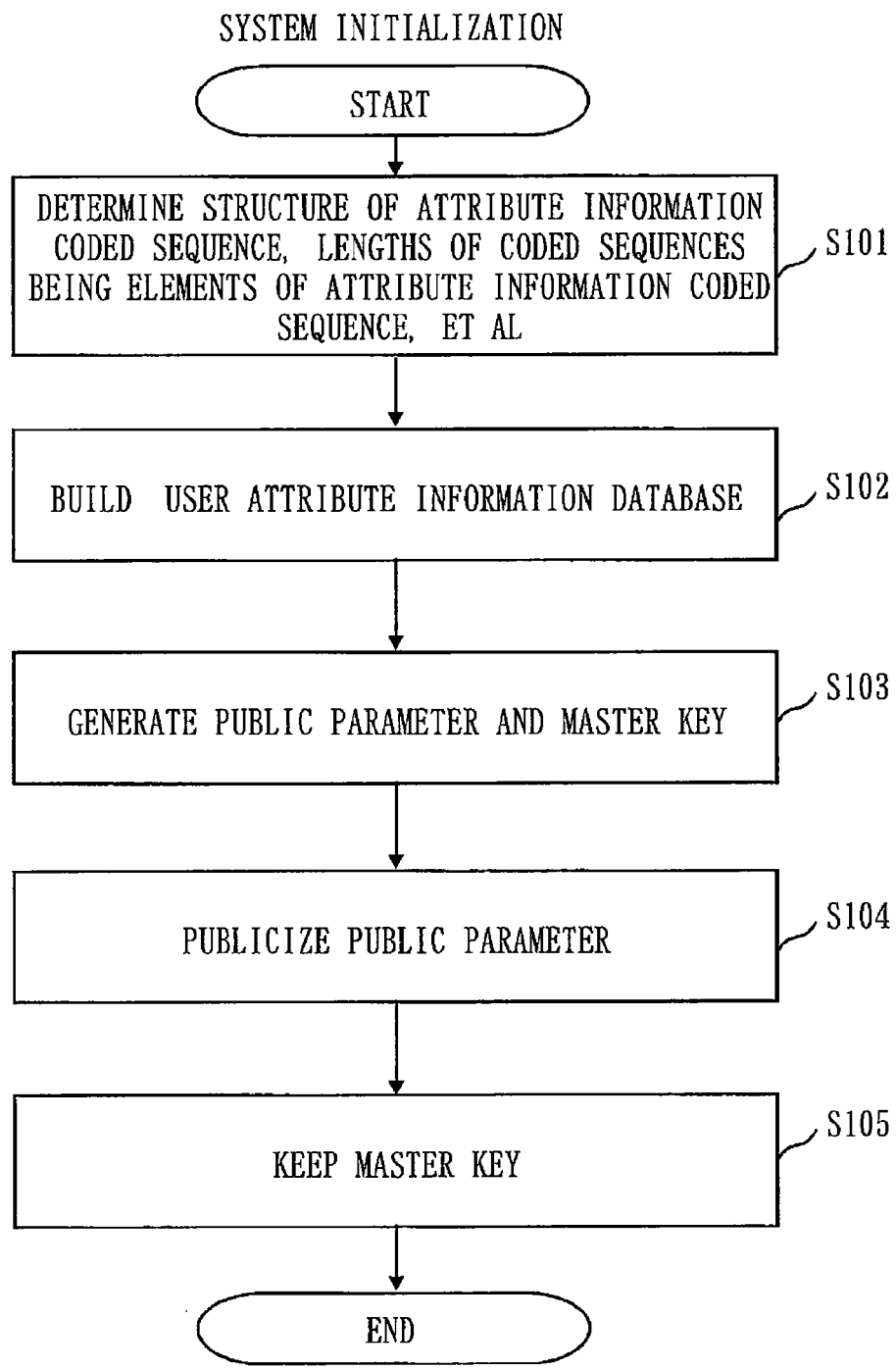
FIG. 41 is a flowchart showing the flow of the process of (1) system initialization.

FIG. 41 is a flowchart showing the flow of the process of (1) system initialization.

Figure 42:
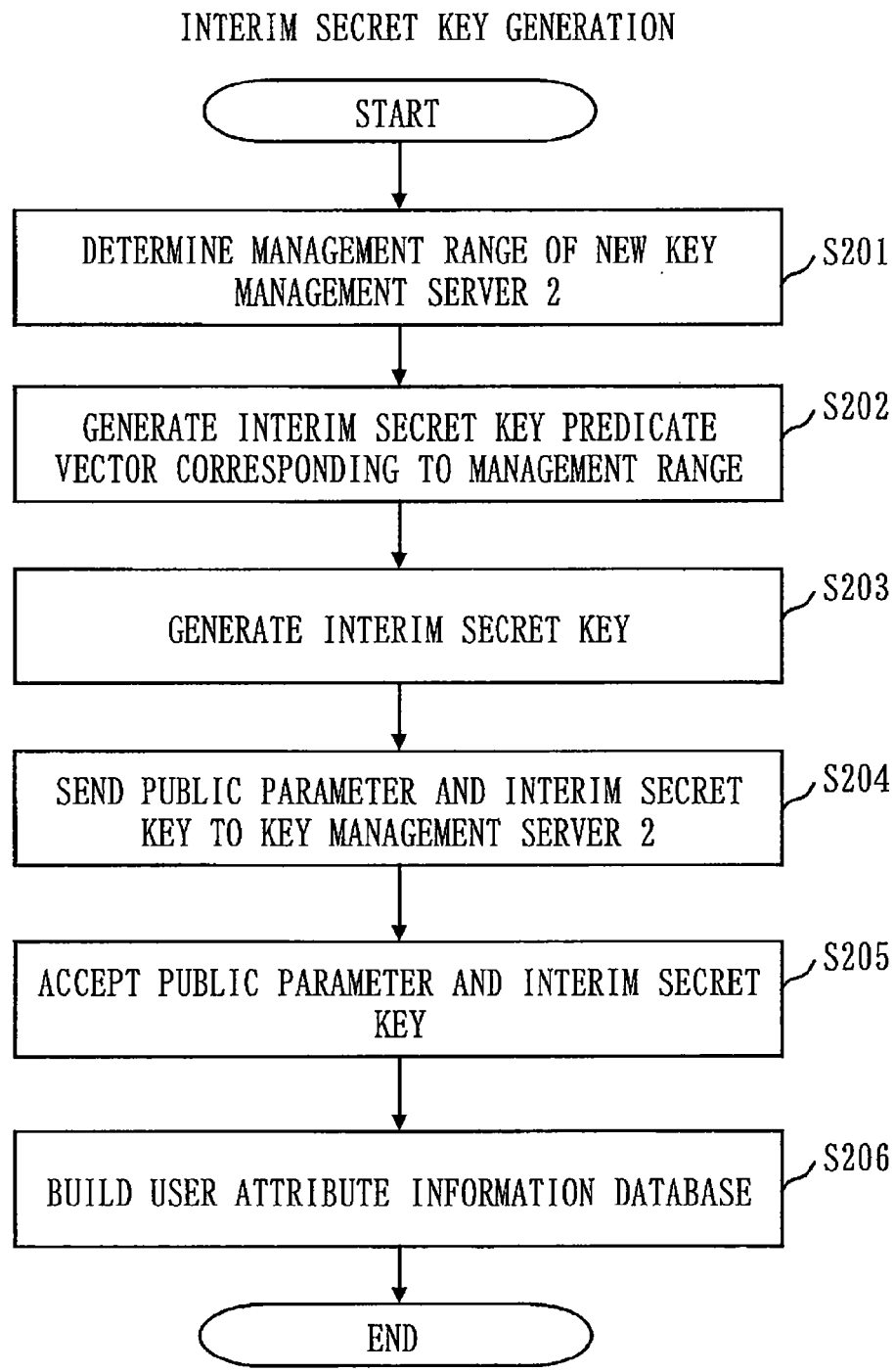
FIG. 42 is a flowchart showing the flow of the process of (2) interim secret key generation.

FIG. 42 is a flowchart showing the flow of the process of (2) interim secret key generation.

FIG. 43 is a flowchart showing the flow of the process of (3) user secret key generation.

FIG. 44 is a flowchart showing the flow of the process of (4) encrypted data generation.

FIG. 45 is a flowchart showing the flow of the process of (5) keyword search.

FIG. 46 is a flowchart showing the flow of the process of (6) delegation user secret key generation.

Referring to FIG. 41, the process of (1) system initialization will be described.

(1) System initialization is a process executed by the key management server 201, and is particularly a process executed by the key management server 201 which is installed the first.

(S101)

The coded information generation part 206 determines the structure of the attribute information coded sequence 501 to be utilized by the system, the lengths of the coded sequences which are the elements of the attribute information coded sequence 501, the rules of the values to be stored, the comparison method, and a method of mapping to an attribute vector and a predicate vector. For example, the coded information generation part 206 determines these items by guiding the administrator or the like who sets the key management server 201, to enter these items via an input device.

The structure examples of the attribute information coded sequence 501 are as described above. Depending on the usage, control with only organization information may suffice, and control with the post, data type, or the like may be unnecessary. Hence, the coded information generation part 206 guides the administrator or the like to select only necessary items from, for example, the attribute information coded sequence 501 shown in FIG. 9, or to add or change items in the attribute information coded sequence 501, thus determining the attribute information coded sequence 501 to be used by the confidential search system 100.

In this example, assume that the structure of the attribute information coded sequence 501 is determined as in a system common attribute information coded sequence shown in FIG. 47.

Also assume that all of the individual ID, the belonging-office information coded sequence, the post information coded sequence, the category coded sequence, the secret level coded sequence, the employment type coded sequence, the term information coded sequence, the delegatee information coded sequence, and the search query coded sequence will be subjected to comparison by AND test.

Also, AID is assigned as an attribute ID to the element which is the minimum unit of mapping to the attribute vector or predicate vector, and BI is assigned as an index number to each element of a corresponding attribute vector or predicate vector.

The attribute ID is assigned differently for AND test, OR test, and inclusion relation test. The attribute ID is assigned in each test method in the manner described in explanation of vectorization for each of the test methods described with reference to FIGS. 38 to 40. The maximum value of the index number BI is n. With the inner-product predicate encryption described in Non-Patent Literature 2, however, since the tag and the encrypted data encryption key can be made as one item, the key usage flag need be treated in a special manner. Hence, AID and BI will not be assigned, and will be dealt with in, for example, the process of (4) data encryption.

Figure 48:
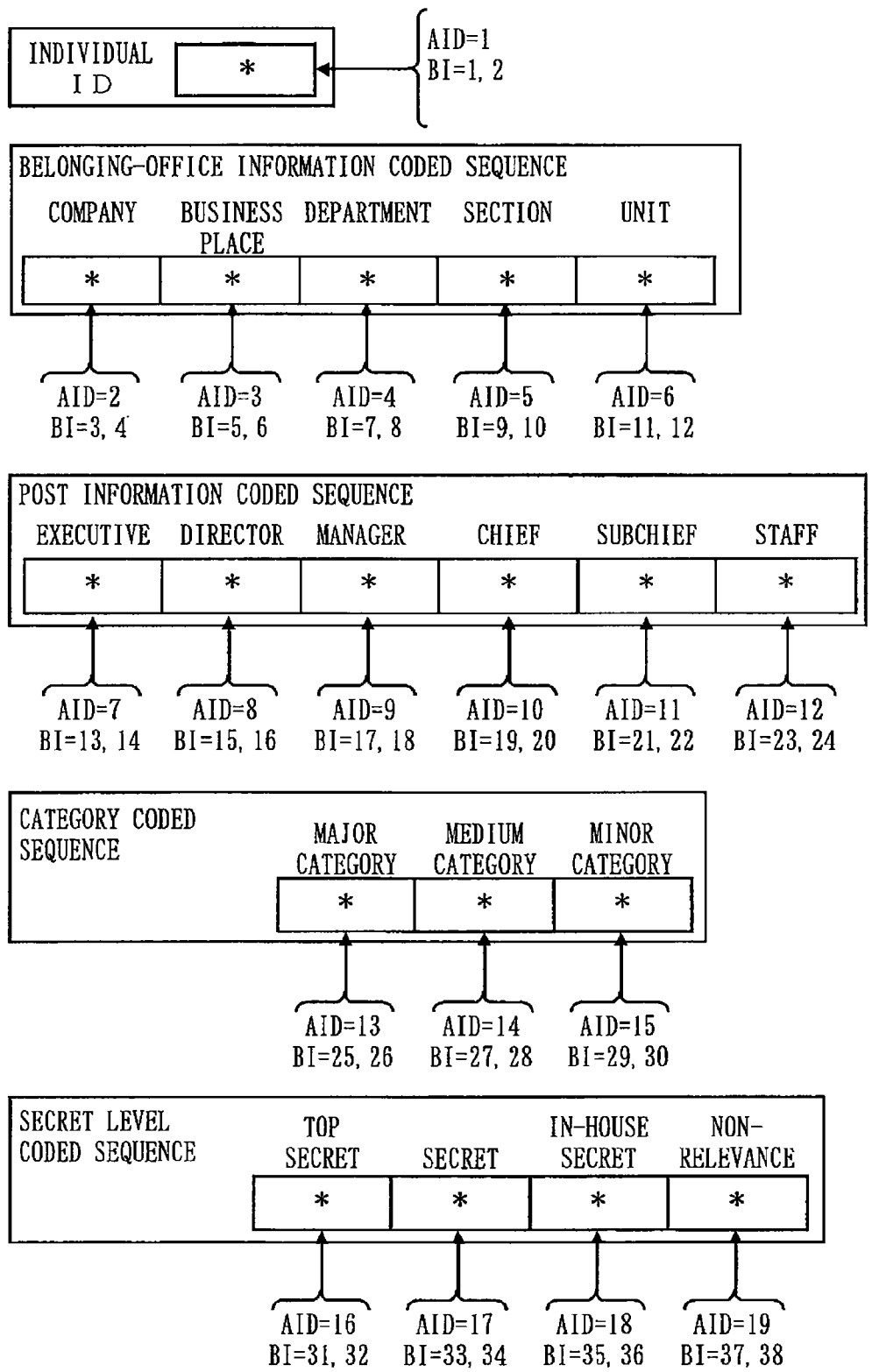
FIG. 48 is an illustration showing an assignment example of AID which is an attribute ID and an assignment example of an index number BI in AND test.
Figure 50:
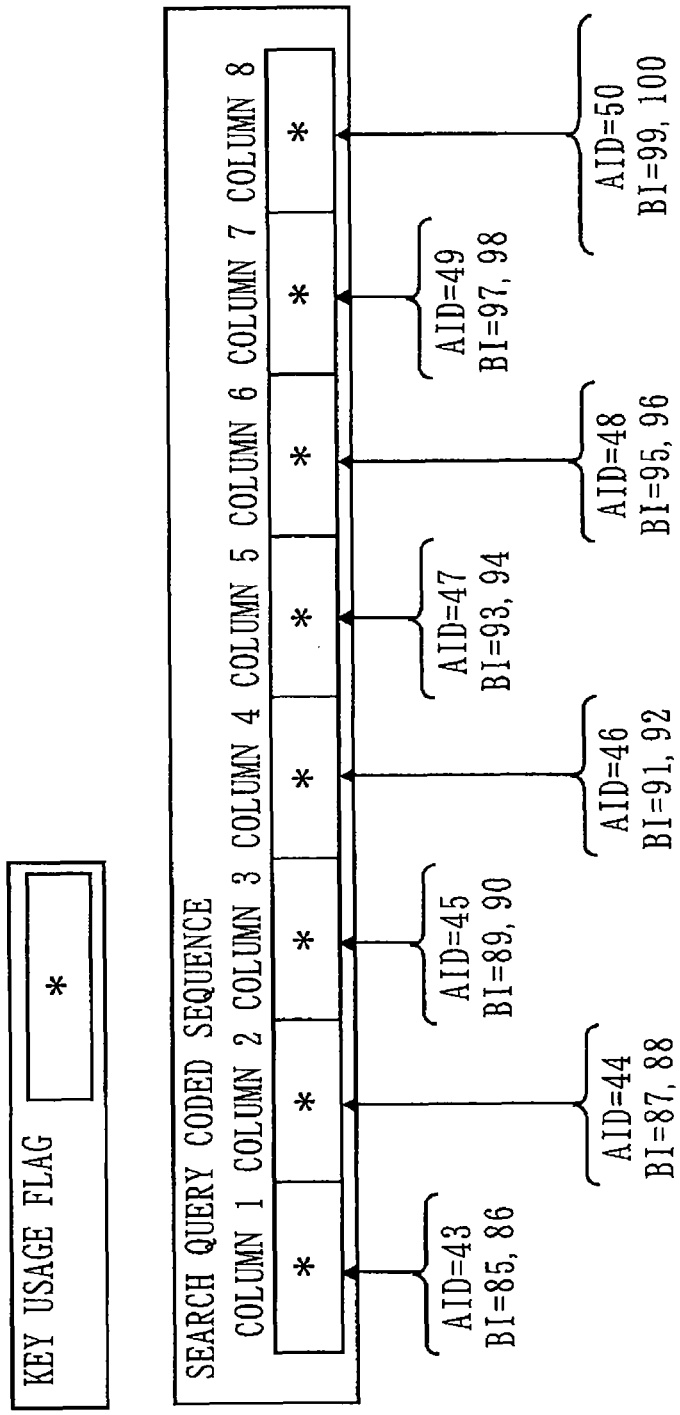
FIG. 50 is an illustration showing an assignment example of AID which is the attribute ID and an assignment example of the index number BI in AND test.

FIGS. 48 to 50 are illustrations showing assignment examples of AID which is an attribute ID and assignment examples of an index number BI. AND test is conducted for all elements, as described above. Accordingly, values are assigned to two vector elements of each element of the coded sequence, as shown in FIG. 38. For example, with the individual ID, the attribute ID is 1, and values are mapped to the first element (BI=1) and the second element (BI=2) of the attribute vector and predicate vector. In the major category of the category coded sequence, the attribute ID is 13, and values are mapped to the 25th element (BI=25) and the 26th element (BI=26) of the attribute vector and predicate vector.

Figure 51:
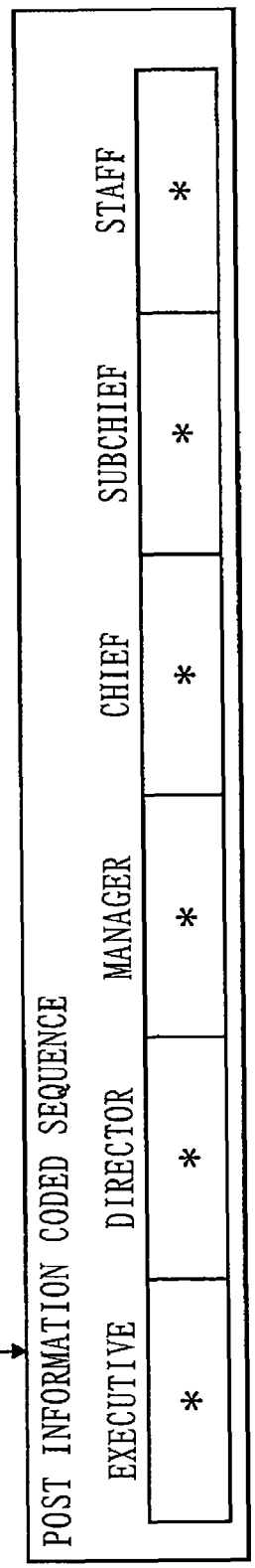
FIG. 51 is an illustration showing an assignment example of AID and an assignment example of the index number BI in OR test.

When elements are to be subjected to OR test, a plurality of elements need be mapped at once to an attribute vector or predicate vector, as indicated by the transformation method of FIG. 39. For example, when subjecting the post information coded sequence to OR test, all post information need be vectorized at once. Hence, one AID is assigned to the post information coded sequence, and index number BI is assigned to each element of the attribute vector and predicate vector, as shown in FIG. 51.

(S102)

The user attribute information management part 205 builds a user attribute information database that keeps the attribute information of the user.

The user attribute information database keeps information necessary for generating the attribute information coded sequence 501. For example, as shown in FIG. 52, the user attribute information database stores the name which is the individual ID, the belonging-office information, the post information, the data category of the accessible data, the secret level of the accessible data, the employment type, the term during which a person in question belongs to the prescribed office or is appointed to the prescribed post, and the like. The user attribute information database may store not only the latest status but also all the past records.

(S103)

The master key generation part 202 generates the parameter of the inner-product predicate encryption to be utilized by the system. In this parameter generation, the group, basis, and the like to be employed by the inner-product predicate encryption described in Non-Patent Literature 2 are generated. More specifically, first, a group order q, groups G and $G_T$, and a generator g∈G are determined, and a dimension N of the vector space is determined as N=n+2. The vector space is determined as V=G×G×G, and a canonical basis A=($a_1$, $a_2$, ..., $a_N$) is determined. Then, an N-row, N-column regular matrix X=($x_{i,j}$) is selected randomly, and a random basis B=($b_1$, $b_2$, ..., $b_N$) and a basis B*=($b^*_1$, $b^*_2$, ..., $b^*_N$) are calculated.

In other words, the master key generation part 202 calculates the random basis B=($b_1$, $b_2$, ..., $b_N$) and the random basis B*=($b^*_1$, $b^*_2$, ..., $b^*_N$) by executing the setup algorithm described in Non-Patent Literature 2 with the processing device.

(S104)

The PKG-side data transmission/reception part 209 publicizes the structure of the attribute information coded sequence 501, the rules of the values to be stored, the method of mapping to the attribute vector or predicate vector, which are determined in (S101), and the group order q, the groups G and $G_T$, the generator g∈G, the vector space G×G×G, and the random basis B=($b_1$, $b_2$, ..., $b_N$), which are generated in (S103), as public parameters via a network. Naturally, the public parameters may be publicized by other methods.

The various-key keeping part 208 stores the public parameters in the storage device.

(S105)

The various-key keeping part 208 stores the random basis B*=($b^*_1$, $b^*_2$, ..., $b^*_N$) generated in (S103), in the storage device as the master key.

The content of the user attribute information database generated in (S102) is updated in system operation each time a user is transferred, joins the company, or leaves the company.

With reference to FIG. 42, the process of (2) interim secret key generation will be described.

(2) Interim secret key generation is a process for installing a new key management server 201, and is a process in which the existing key management server 201 generates an interim secret key necessary to issue a user secret key to the newly installed key management server 201.

In the description on FIG. 42, the existing key management server 201 is called a key management server 1, and the newly installed key management server 201 is called a key management server 2.

(S201)

The interim secret key generation part 203 of the key management server 1 sets the management range as to in what attribute range the newly installed key management server 2 is to perform management. For example, the interim secret key generation part 203 sets the management range by guiding the administrator to enter "Generate user secret key management for a headquarters' staff" via the input device.

(S202)

First, the coded information generation part 206 of the key management server 1 generates the interim secret key attribute information coded sequence (coded information) corresponding to the management range set in (S201) by the processing device in accordance with the attribute information coded sequence 501 or the like included in the public parameters.

FIG. 53 is an illustration showing an example of the interim secret key attribute information coded sequence. As shown in FIG. 53, if the key management server 2 is to be in charge of user secret key generation for the headquarters' staff of A company, the coded information generation part 206 generates an interim secret key attribute information coded sequence in which A company and the headquarters are set for the company ID and the business place ID, respectively, of the belonging-office information coded sequence.

Then, the vector generation part 207 of the key management server 1 generates an interim secret key predicate vector $\vec{v}_{SPKG}=(v_1, v_2, \ldots, v_n)$ corresponding to the interim secret key attribute information coded sequence generated by the coded information generation part 206. The interim secret key predicate vector is generated from the coded sequence in accordance with the method described with reference to FIGS. 38 to 40.

At this time, the vector generation part 207 selects, among portions where "*" are set and portions where no values are set (indicated as "–" in the drawing) in the interim secret key attribute information coded sequence, attributes for which the key management server 2 can set values later, and defines these attributes as a delegation attribute set DAID. The index number of a predicate vector corresponding to this delegation attribute set is defined as DBI. For example, in FIG. 53, an individual ID, a department ID/section ID/unit ID in the belonging-office information coded sequence, and portions where "*" are set in the post information coded sequence, are determined as a delegation attribute set DAID.

(S203)

Using the interim secret key predicate vector generated in (S202), the interim secret key generation part 203 of the key management server 1 generates a corresponding interim secret key, with the processing device. Two methods are available for interim secret key generation: a method of generating an interim secret key from a master key and a method of generating an interim secret key from interim secret key.

First, a case of generating an interim secret key $k^*_1$ from a master key will be described.

The interim secret key generation part 203 generates the interim secret key $k^*_1$ from the master key by calculating Formula 109 with the processing device.

In the following description, a letter L in an interim secret key $k^*_L$ or user secret key $k^*_L$ indicates that the corresponding key is an Lth level key. Namely, if the key is an interim secret key $k^*_1$, it is a 1st level secret key; if the key is an interim secret key $k^*_{L+1}$, it is an (L+1)th level secret key of a level lower than the Lth level by one level.

$$\sigma_j, \sigma_{h,j} \xleftarrow{U} F_q \qquad \text{[Formula 109]}$$

$$k^*_{1,0} = \sum_{j \in AID1} \sigma_j \left( \sum_{i \in BIj} v_i b^*_i \right)$$

$$k^*_{1,h} = \sum_{j \in AID1} \sigma_{h,j} \left( \sum_{i \in BIj} v_i b^*_i \right) + b^*_h$$

for $h = n + 1$ or $\forall h \in DBI1$ $$k^*_1 = (k^*_{1,0}, \{k^*_{1,h}\})$$

An attribute set AID1 is a set of attributes ID of attributes whose values have been determined in this interim secret key generation.

An index set BIj is a set of index numbers of a predicate vector corresponding to elements in the attribute set AID1, with which AID=j.

A delegation index set DBI1 is a set of index numbers corresponding to the delegation attribute set DAID determined to be capable of being set later by the key management server 2. The delegation index set DBI1 does not include an index number set BIS1 corresponding to the attribute set AID1 which has already been set.

More specifically, the interim secret key generation part 203 generates a key vector $k^*_{1,0}$ by setting an element $v_i$ of the predicate vector, as a coefficient for a basis vector $b^*_i$ indicated by an index number i included in the index set BIj. The coefficients of the respective basis vectors for which the elements of the predicate vector are set are randomized by a random number $\sigma_j$.

The interim secret key generation part 203 generates a key generating vector $k^*_{1,h}$ in which the element $v_i$ of the predicate vector is set as the coefficient for the basis vector $b^*_i$ indicated by the index number i included in the index set BIj, and in which a value "1" is set as a coefficient for a basis vector $b^*_h$, for index numbers h and h=n+1 included in the delegation index set DBI1. The coefficients of the respective basis vectors for which the elements of the predicate vector are set are randomized by a random number $\sigma_{h,j}$.

The interim secret key generation part 203 forms an interim secret key $k^*_1$ using the key vector $k^*_{1,0}$ and the key generating vector $k^*_{1,h}$.

A case of generating the new interim secret key $k^*_{L+1}$ from another interim secret key $k^*_L$ will be described.

The interim secret key generation part 203 generates the new interim secret key $k^*_{L+1}$ from another interim secret key $k^*_L$ by calculating Formula 110 with the processing device.

$$\sigma_{h,j} \xleftarrow{U} F_q \qquad \text{[Formula 0110]}$$

$$k^*_{L+1,h} = k^*_{L,h} + \sum_{j \in AIDL+1} \sigma_{h,j}\left(\sum_{i \in BIj} v_i k^*_{L,i}\right)$$

$$\text{for } h = 0, n+1 \text{ or } \forall h \in DBIL$$

$$k^*_{L+1} = (k^*_{L+1,0}, \{k^*_{L+1,h}\})$$

An attribute set AIDL+1 is a set of attributes ID of attributes whose values have been determined in this interim secret key generation.

An index set BIj is a set of index numbers of a predicate vector corresponding to elements in the attribute set AIDL+1, with which AID=j.

A delegation index set DBIL is a set of index numbers corresponding to the delegation attribute set DAID determined to be capable of being set later by the key management server 2. The delegation index set DBIL does not include index number sets BIS1 to BISL corresponding to the attribute sets AID1 to AIDL that have already been set.

More specifically, the interim secret key generation part 203 generates a key vector $k^*_{L+1,0}$ by adding a vector, generated by multiplying the key generating vector $k^*_{L,i}$ indicated by the index number i included in the index set BIj by times corresponding in number to the element $v_i$ of the predicate vector, to a key vector $k^*_{L,0}$ included in the interim secret key $k^*_L$. In the vector generated by multiplying the key generating vector $k^*_{L,i}$ by times corresponding in number to the element $v_i$ of the predicate vector, the element $v_i$ of the predicate vector is set as a coefficient for the basis vector $b^*_i$. The coefficients of the respective basis vectors for which the elements of the predicate vector are newly set are randomized by a random number $\sigma_{0,j}$.

The interim secret key generation part 203 also generates a key vector $k^*_{L+1,h}$ by adding a vector, generated by multiplying the key generating vector $k^*_{L,i}$ indicated by the index number i included in the index set BIj by times corresponding in number to the element $v_i$ of the predicate vector, to the key generating vector $k^*_{L,h}$ included in the interim secret key $k^*_L$, for index numbers h and h=n+1 included in the delegation index set DBIL. In the vector generated by multiplying the key generating vector $k^*_{L,i}$ by times corresponding in number to the element $v_i$ of the predicate vector, the element $v_i$ of the predicate vector is set as a coefficient for the basis vector $b^*_i$. The coefficients of the respective basis vectors for which the elements of the predicate vector are newly set are randomized by a random number $\sigma_{h,j}$.

The interim secret key generation part 203 forms the new interim secret key $k^*_{L+1}$ using the key vector $k^*_{L+1,0}$ and the key generating vector $k^*_{L+1,h}$.

(S204)

The PKG-side data transmission/reception part 209 of the key management server 1 sends the generated interim secret key to the key management server 2 together with the public parameters. At this time, the interim secret key is sent using a dedicated H/W such as an IC (Integrated Circuit) card or a tamper-resistant encryption device, or by a secure means such as VPN or SSL communication protocol.

(S205)

The PKG-side data transmission/reception part 209 of the key management server 2 accepts the interim secret key and the public parameters sent in (S204). The various-key keeping part 208 stores the accepted interim secret key and public parameters, in the storage device.

(S206)

The user attribute information management part 205 of the key management server 2 builds the user attribute information database and, if necessary, synchronizes the data with that of the key management server 1. After this, the content of the user attribute information database is updated each time a user is transferred, joins the company, or leaves the company.

With reference to FIG. 43, the process of (3) user secret key generation will be described.

(3) User secret key generation is a process in which the key management server 201 generates a new user secret key (key vector) when, for example, a new user is added or a user is transferred.

(S301)

First, the coded information generation part 206 reads the attribute of the user from the user attribute information database in accordance with the attribute information coded sequence 501 and the like included in the public parameters, and generates a user secret key attribute information coded sequence (coded information) to be set in the user secret key, with the processing device.

FIG. 54 is an illustration showing an example of the user secret key attribute information coded sequence in a case where a user secret key is to be issued to Mr/Ms. Tanaka belonging to the headquarters/general affair department/general affair section/welfare unit of A company. In this case, for example, the name and belonging office are set in the individual ID and the belonging-office information coded sequence, respectively. Also, the user secret key attribute information coded sequence is set to indicate that the post of Mr/Ms. Tanaka is staff, the secret level of accessible data is secret/in-house secret/non-relevance, and Mr/Ms. Tanaka is employed as a major career employee and can access data generated between the year 2007 and the year 2010.

The vector generation part 207 generates a user secret key predicate vector $\vec{V}_{USER} = (v_1, v_2, \ldots, v_n)$ from the user attribute information database generated by the coded information generation part 206, with the processing device. The user secret key predicate vector is generated from the coded sequence in accordance with the same method described with reference to FIGS. 38 to 40.

When the key management server 201 is to generate the user secret key by using the interim secret key, the value of the predicate vector $\vec{v}_{SPKG} = (v_1, v_2, \ldots, v_n)$ that has already been set in the interim secret key cannot be changed. Values that can be set are only the delegation attribute set DAID which has been set in generation of the interim secret key in (S202), and portions of the predicate vector, corresponding to the delegation attribute set, whose index numbers are indicated by DBI.

The vector generation part 207 selects, among portions where "*" are set and portions where no values are set (indicated as "−" in the drawing) in the user secret key attribute information coded sequence, attributes for which the user can set values later, and defines these attributes as a delegation attribute set DAID. The index numbers of a predicate vector corresponding to this delegation attribute set are determined as DBI. For example, in FIG. 54, the belonging-office information coded sequence and the post information coded sequence, the values of which are set, are not included in the delegation attribute set in order that the values will not be changed by the user. The category coded sequence, delegatee information coded sequence, key usage flag, search query coded sequence, and the like are set in the delegation attribute set DAID. Similarly, the corresponding delegation index set DBI is also determined.

(S302)

Using the user secret key predicate vector generated in (S301), the user secret key generation part 204 generates a corresponding user secret key, with the processing device. Two methods are available for user secret key generation: a method of generating a user secret key from a master key directly and a method of generating a user secret key from an interim secret key.

First, a case of generating a user secret key $k^*_1$ from a master key will be described.

The user secret key generation part 204 generates the user secret key $k^*_1$ from the master key by calculating Formula 110 with the processing device.

$$\sigma_j, \sigma_{h,j} \xleftarrow{U} F_q \qquad \text{[Formula 111]}$$

$$k^*_{1,0} = \sum_{j \in AID1} \sigma_j \left( \sum_{i \in BIj} v_i b^*_i \right)$$

$$k^*_{1,h} = \sum_{j \in AID1} \sigma_{h,j} \left( \sum_{i \in BIj} v_i b^*_i \right) + b^*_h$$

for $h = n + 1$ or $\forall h \in DBI1$ $$k^*_1 = (k^*_{1,0}, \{k^*_{1,h}\})$$

An attribute set AID1 is a set of attributes ID of attributes whose values have been determined in this user secret key generation.

An index set BIj is a set of index numbers of a predicate vector corresponding to elements in the attribute set AID1, with which AID=j.

A delegation index set DBI1 is a set of index numbers corresponding to the delegation attribute set DAM determined to be capable of being set later by the user who uses the generated user secret key. The delegation index set DBI1 does not include an index number set BIS1 corresponding to the attribute set AID1 that has already been set.

More specifically, the user secret key generation part 204 generates a key vector $k^*_{1,0}$ by setting an element $v_i$ of the predicate vector, as a coefficient for a basis vector $b^*_i$ indicated by an index number i included in the index set BIj. The coefficients of the respective basis vectors for which the elements of the predicate vector are set are randomized by a random number $\sigma_j$.

The user secret key generation part 204 generates a key generating vector $k^*_{1,h}$ in which the element $v_i$ of the predicate vector is set as the coefficient for the basis vector $b^*_i$ indicated by the index number i included in the index set BIj, and in which a value "1" is set as a coefficient for a basis vector $b^*_h$, for index numbers h and h=n+1 included in the delegation index set DBI1. The coefficients of the respective basis vectors for which the elements of the predicate vector are set are randomized by a random number $\sigma_{h,j}$.

The user secret key generation part 204 forms a user secret key $k^*_i$ using the key vector $k^*_{1,0}$ and the key generating vector $k^*_{1,h}$.

A case of generating the user secret key $k^*_{L+1}$ from the interim secret key $k^*_L$ will be described.

The user secret key generation part 204 generates the user secret key $k^*_{L+1}$ from the interim secret key $k^*_L$ by calculating Formula 112 with the processing device.

$$\sigma_{h,j} \xleftarrow{U} F_q \qquad \text{[Formula 112]}$$

$$k^*_{L+1,h} = k^*_{L,h} + \sum_{j \in AIDL+1} \sigma_{h,j} \left( \sum_{i \in BIj} v_i k^*_{L,i} \right)$$

for $h = 0, n+1$ or $\forall h \in DBIL$ $$k^*_{L+1} = (k^*_{L+1,0}, \{k^*_{L+1,h}\})$$

An attribute set AIDL+1 is a set of attributes ID of attributes whose values have been determined in this user secret key generation.

An index set BIj is a set of index numbers of a predicate vector corresponding to elements in the attribute set AIDL+1, with which AID=j.

A delegation index set DBIL is a set of index numbers corresponding to the delegation attribute set DAID determined to be capable of being set later by the user. The delegation index set DBIL does not include index number sets BIS1 to BISL corresponding to the attribute sets AID1 to AIDL that have already been set.

More specifically, the user secret key generation part 204 generates a key generating vector $k^*_{L+1,0}$ by adding a vector, generated by multiplying the key generating vector $k^*_{L,i}$ indicated by the index number i included in the index set BIj, by times corresponding in number to the element $v_i$ of the predicate vector, to the key vector $k^*_{L,0}$ included in the interim secret key $k^*_L$. In the vector generated by multiplying the key generating vector $k^*_{L,i}$ by times corresponding in number to the element $v_i$ of the predicate vector, the element $v_i$ of the predicate vector is set as a coefficient for the basis vector $b^*_i$. The coefficients of the respective basis vectors for which the elements of the predicate vector are newly set are randomized by a random number $\sigma_{0,j}$.

The user secret key generation part 204 also generates a key generating vector $k^*_{L+1,h}$ by adding a vector, generated by multiplying the key generating vector $k^*_{L,i}$ indicated by the index number i included in the index set BIj by times corresponding in number to the element $v_i$ of the predicate vector, to the key generating vector $k^*_{L,h}$ included in the interim secret key $k^*_L$, for index numbers h and h=n+1 included in the delegation index set DBIL. In the vector generated by multiplying the key generating vector $k^*_{L,i}$ by times corresponding in number to the element $v_i$ of the predicate vector, the element $v_i$ of the predicate vector is set as a coefficient for the basis vector $b^*_i$. The coefficients of the respective basis vectors for which the elements of the predicate vector are newly set are randomized by a random number $\sigma_{h,j}$.

The user secret key generation part 204 forms the user secret key $k^*_{L+1}$ using the key vector $k^{*\rightarrow}_{L+1,0}$ and the key generating vector $k^*_{L+1,h}$.

Formulae 111 and 112 are the same as Formulae 109 and 110, respectively, which are employed when generating the interim secret key described in the process of interim secret key generation. The largest difference between Formulae 111 and 109 and between Formulae 112 and 110 is whether the attribute information coded sequence to be generated is more or less limited by the management range of the key management server, or is mostly specified depending on the attribute of the user. The difference also exists in terms of delegation attribute set. For example, in interim secret key generation, most portions are delegated for the purpose of issuing the user secret key, whereas in user secret key generation, portions to be delegated are limited to major portions necessary for search.

(S303)

The PKG-side data transmission/reception part 209 sends the user secret key and the public parameters to the access terminal. The PKG-side data transmission/reception part 209 conducts the delivery using a secure means as in the case of sending the interim secret key.

(S304)

The terminal-side data transmission/reception part 311 of the access terminal 301 employed by the user accepts the user secret key and public parameters sent in (S303). The user secret key storage part 302 stores the accepted user secret key and public parameters, in the storage device.

With reference to FIG. 44, the process of (4) data encryption will be described (4) Data encryption is a process in which the access terminal 301 encrypts the data for the user of an organization or an individual registered in the system, and registers the encrypted data, in the data center 401.

(S401)

First, the coded information generation part 306 of the access terminal 301 determines the user or group who is capable of decrypting the generated data. For example, the coded information generation part 306 determines the decryptable user or group by guiding the user who uses the access terminal 301 to enter the decryptable user or group via the input device.

The coded information generation part 306 generates, with the processing device, an encrypted data attribute information coded sequence (coded sequence) that can uniquely specify the determined user or group, in accordance with the attribute information coded sequence 501 and the like included in the public parameters. If the determined user or group cannot be uniquely specified by a single encrypted data attribute information coded sequence, a plurality of encrypted data attribute information coded sequences may be generated.

FIG. 55 is an illustration showing an example of the encrypted data attribute information coded sequence.

In the example shown in FIG. 55, the data is related to the budget planning of the cost of goods of the fiscal year 2009, as indicated by the category coded sequence. The information is in-house secret, as indicated by the secret level coded sequence. A user who belongs to A company/headquarters/general affair department/general affair section, as indicated by the belonging-office information coded sequence, and who is either a major career employee or a general career employee, as indicated by the belonging-office coded sequence, can read the data. Also, only the identified user can decrypt the data, and a secretary or alternate person cannot read the data, as indicated by the delegatee information coded sequence. As the data was generated in the year 2009, flags are set as indicated by the term information coded sequence. Furthermore, as shown in the search query coded sequence, the data is the fifth data and is information on the purchase of three PC units on Oct. 5, 2009 for 100,000 yen.

A random number $\rho$ serving as the generator in generation of an encryption data key is set in the key usage flag. This random number may be generated randomly when generating the encrypted data. A different random number is used for different data. If a plurality of encrypted data attribute information coded sequences need be formed for one piece of data, the same random number $\rho$ must be set for all of encrypted data attribute information coded sequences.

Then, the vector generation part 307 generates, with the processing device, an attribute vector $\vec{x}=(x_1, x_2, \ldots, x_n)$ corresponding to all the generated encrypted data attribute information coded sequences. The attribute vector is generated from the coded sequence in accordance with the method described with reference to FIGS. 38 to 40.

(S402)

The tag/encrypted data encryption key generation part 308 generates, with the processing device, a tag-cum-encrypted data encryption key "tag" (encryption vector c1) for all the attribute vectors generated in (S402). The tag-cum-encrypted data encryption key "tag" is generated by calculating Formula 113 by using the public parameters kept in the user secret key storage part 302.

$$\sigma_j, \delta_{n+2} \xleftarrow{U} F_q \quad \text{[Formula 113]}$$

$$tag = \sum_{j \in AID} \sigma_j \left( \sum_{i \in BIj} x_i b_i \right) + \rho b_{n+1} + \delta_{n+2} b_{n+2}$$

An attribute set AID is a set of all attributes ID.

An index set BIj is a set of index numbers of an attribute vector corresponding to elements in the attribute set AID, with which AID=j.

More specifically, the tag/encrypted data encryption key generation part 308 sets the element $v_i$ of the attribute vector as a coefficient for a basis vector $b_i$ indicated by an index number i included in the index set BIj. The coefficients of the respective basis vectors are randomized by a random number $\sigma_j$. The tag/encrypted data encryption key generation part 308 also sets a random number $\rho$ as a coefficient for a basis vector $b_{n+1}$. The tag/encrypted data encryption key generation part 308 also sets a random number $\delta_{n+2}$ as a coefficient for a basis vector $b_{n+2}$. The tag/encrypted data encryption key generation part 308 generates the tag-cum-encrypted data encryption key "tag".

(S403)

Using the random number $\rho$ generated in (S401), the tag/encrypted data encryption key generation part 308 generates a data encryption key $K=e(g, g)^\rho$.

The data encryption part 309 generates an encrypted data main body (ciphertext c2) with the processing device by encrypting the data main body (plaintext information m) by means of a common key encryption such as AES or Camellia (registered trademark), using the data encryption key K (common key). The data encryption part 309 then generates, with the processing device, encrypted data including the generated encrypted data main body and the tag-cum-encrypted data encryption key "tag". In other words, the encrypted data has the structure of the encrypted data B shown in FIG. 7.

(S404)

The terminal-side data transmission/reception part 311 sends the generated encrypted data to the data center 401 and requests the data center 401 to keep the encrypted data.

(S405)

The center-side data transmission/reception part 402 of the data center 401 receives the encrypted data that requests to be kept. The data management part 403 stores the received data, in the storage device.

With reference to FIG. 45, (5) keyword search process will be described.

(5) Keyword search process is the process in which the access terminal 301 searches, by specifying a keyword, the encrypted data kept in the data center 401.

(S501)

First, the coded information generation part 306 of the access terminal 301 accepts the search keyword entered by the user and generates a search attribute information coded sequence (coded information) with the processing device. The search attribute information coded sequence is obtained by setting a search keyword in the user secret key attribute information coded sequence.

FIG. 56 is an illustration showing an example of search attribute information coded sequence.

In the example shown in FIG. 56, a user who possesses a user secret key corresponding to the user secret key attribute information coded sequence shown in FIG. 54 specifies "year 2009" and "purchase" as the search keyword. Hence, values are set in columns 2 and 8 of the corresponding search query coded sequence. When a trap door is to be generated, 0 is set in the key usage flag.

Then, the vector generation part 307 generates a search predicate vector $V^{\rightarrow}SERCH=(v_1, v_2, \ldots, v_n)$ corresponding to the generated search attribute information coded sequence, with the processing device. The search predicate vector is generated from the coded sequence in accordance with the method described with reference to FIGS. 38 to 40.

(S502)

Using the search predicate vector generated in (S501), the trap door generation part 303 generates a trap door with the processing device. A trap door "trapdoor" is generated by calculating, using the user secret key $k^*_L$, Formula 114.

$$\sigma_{L+1,j} \overset{U}{\leftarrow} F_q \qquad \text{[Formula 114]}$$

$$k^*_{L+1,0} = k^*_{L,0} + \sum_{j \in AIDL+1} \sigma_{L+1,j} \left( \sum_{i \in BIj} v_i k^*_{L,i} \right)$$

$$\text{trapdoor} = (k^*_{L+1,0})$$

The attribute set AIDL+1 is a set of the attributes ID of attributes whose values have been determined in generation of the search attribute information coded sequence. The attribute set AIDL+1 is usually an AID of a key usage flag and a search query coded sequence.

An index set BIj is a set of index numbers of a predicate vector corresponding to elements in the attribute set AIDL+1, with which AID=j.

More specifically, the trap door generation part 303 generates the trap door "trapdoor" by adding a vector (search condition vector SC), generated by multiplying the key generating vector $k^*_{L,i}$ indicated by the index number i included in the index set BIL+1 by times corresponding in number to the element $v_i$ of the predicate vector, to the user secret key $k^*_{L,0}$. In the vector generated by multiplying the key generating vector $k^*_{L,i}$ by times corresponding in number to the element $v_i$ of the predicate vector, the element $v_i$ of the predicate vector is set as a coefficient for the basis vector $b^*_i$. The coefficients of the respective basis vectors for which the elements of the predicate vector are newly set are randomized by a random number $\sigma_{L+1,i}$.

(S503)

The terminal-side data transmission/reception part 311 sends the trap door generated in (S502) to the data center 401 and requests search of the encrypted data. The search request reception part 404 of the data center 401 receives the trap door and accepts the search request for the encrypted data.

(S504)

The search execution part 405 of the data center 401 compares, by the processing device, the trap door received in (S503) with each of the tag-cum-encrypted data encryption keys added to all encrypted data kept in the data management part 403. Hence, the search execution part 405 checks whether or not encrypted data including the keyword exists in the encrypted data it keeps. If a plurality of tag-cum-encrypted data encryption keys are added to the encrypted data, the search execution part 405 compares the received trap door with each of the tag-cum-encrypted data encryption keys.

If it is determined that at least one tag-cum-encrypted data encryption key of certain encrypted data includes a keyword, the search execution part 405 regards this encrypted data as having hit the search.

One tag-cum-encrypted data encryption key and the trap door are compared by calculating V=e(tag, trapdoor). If the calculation result is V=1, the tag-cum-encrypted data encryption key includes a keyword. If the calculation result is V≠1, either the tag-cum-encrypted data encryption key includes no keyword, or the user does not have the search authority.

(S505)

The search result transmission part 406 extracts all encrypted data which are determined in (S504) to have hit the search, and sends them back to the access terminal 301 which is the source of the trap door. The terminal-side data transmission/reception part 311 of the access terminal 301 receives the encrypted data. If there is no encrypted data to be sent back as the search result, the search result transmission part 406 sends information representing this fact to the access terminal 301.

(S506)

The data encryption key decryption part 305 of the access terminal 301 generates a decrypting user secret key dec-key (decryption key vector, decryption key) from the user secret key $k^*_L$, with the processing device. The decrypting user secret key dec-key is generated by calculating dec-key= $k^*_{L,0}+k^*_{L,n+1}$. This calculation signifies adding an element $b^*_{n+1}$ to the first component $k^*_{L,0}$ of the original user secret key $k^*_{L,n+1}$ because the first component $k^*_{L,0}$ does not include the element $b^*_{n+1}$ of the random basis.

(S507)

The data encryption key decryption part 305 acquires the data encryption key $K=e(g, g)^\rho$ by decrypting, with the processing device, the tag-cum-encrypted data encryption key of the received encrypted data by using the decrypting user secret key dec-key. In other words, the data encryption key decryption part 305 acquires the data encryption key $K=e(g, g)^\rho$ by calculating $e(g, g)^\rho=e(\text{tag, dec-key})$.

A plurality of tag-cum-encrypted data encryption keys may be added to the encrypted data. In this case, a tag-cum-encrypted data encryption key with which V=1 is obtained is specified by comparing the trap door with each tag-cumencrypted data encryption key, using the trap door generated in (S502). As a result, the tag-cum-encrypted data encryption key to be decrypted can be specified.

(S508)

Using the data encryption key K acquired in (S507), the data decryption part 310 decrypts the encrypted data main body included in the encrypted data by means of AES or Camellia (registered trademark). The algorithm to be used for decryption must be the same as the algorithm used for encryption. Therefore, the algorithm to be used in the system need be specified in advance. Alternatively, for example, information indicating the algorithm used for encryption must be included in the encrypted data, so that the algorithm can be specified.

With reference to FIG. 46, the process of (6) delegation user secret key generation will be described.

The process of (6) delegation user secret key generation is a process in which the user who possesses the user secret key requests, for example, a secretary or the like who is to operate in place of the user, to do the task for the user by issuing a delegation user secret key to the secretary. In other words, the process of (6) delegation user secret key generation is a process in which the access terminal 301 issues the delegation user secret key to another access terminal 301.

In the explanation on FIG. 46, the access terminal 301 which generates the delegation user secret key will be called an access terminal 1, and the access terminal 301 which accepts the generated delegation user secret key will be called an access terminal 2.

(S601)

First, the coded information generation part 306 of the access terminal 1 determines what search and what decryption authority are to be delegated to the delegatee user. For example, the coded information generation part 306 guides the user of the access terminal 1 to enter the search and decryption authority to be delegated, thereby determining what search and what decryption authorities are to be delegated.

The coded information generation part 306 generates a delegation user secret key attribute information coded sequence (coded information) corresponding to the determined search and decryption authority, with the processing device.

FIG. 57 is an illustration showing an example of the delegation user secret key attribute information coded sequence.

In the example shown in FIG. 57, a user who possesses a user secret key corresponding to the user secret key attribute information coded sequence shown in FIG. 54 designates, in his or her user attribute information coded sequence, a colleague as the delegatee, and limits the search query to those including "year 2009".

The vector generation part 307 generates a delegation user secret key predicate vector $\vec{v}_{Delegate}=(v_1, v_2, \ldots, v_n)$ corresponding to the generated delegation user secret key attribute information coded sequence, with the processing device. The delegation user secret key predicate vector is generated from the coded sequence in accordance with the method described with reference to FIGS. 38 to 40.

When the user is to issue a delegation user secret key, the value of the predicate vector $\vec{v}_{USER}=(v_1, v_2, \ldots, v_n)$ which has already been set in the user secret key cannot be changed. Values that can be set are only the delegation attribute set DAID which has been set in generation of the user secret key in (S301), and portions of the predicate vector, corresponding to the delegation attribute set, whose index numbers are indicated by DBI.

Among portions where "*" are set and portions where no value are set (indicated as "−" in the drawing) in the user secret key attribute information coded sequence, attributes for which the delegatee user can set values later, are selected, and the selected attributes are determined as a delegation attribute set DAID likewise. The index numbers of a predicate vector corresponding to this delegation attribute set are determined as DBI. For example, in FIG. 57, the category coded sequence in which no values are set, the columns 1 and 3 to 8 of the search query coded sequence, and the like are set in the delegation attribute set DAID. Similarly, the corresponding delegation index set DBI is determined.

(S602)

Based on the delegation user secret key predicate vector generated in (S601), the delegation user secret key generation part 304 of the access terminal 1 generates a delegation user secret key $k^*_{L+1}$ from the user secret key $k^*_L$, with the processing device. The delegation user secret key $k^*_{L+1}$ is generated by calculating Formula 115.

$$\sigma_{h,j} \xleftarrow{U} F_q \qquad \text{[Formula 115]}$$

$$k^*_{L+1,h} = k^*_{L,h} + \sum_{j \in AIDL+1} \sigma_{h,j}\left(\sum_{i \in BIj} v_i k^*_{L,i}\right)$$

for $h = 0, n+1$ or $\forall h \in DBIL$ $$k^*_{L+1} = (k^*_{L+1,0}, \{k^*_{L+1,h}\})$$

An attribute set AIDL+1 is a set of attributes ID of attributes whose values have been determined in this delegation user secret key generation.

An index set BIj is a set of index numbers of a predicate vector corresponding to elements in the attribute set AIDL+1, with which AID=j.

A delegation index set DBIL is a set of index numbers corresponding to the delegation attribute set DAID determined to be capable of being set later by the delegatee user. The delegation index set DBIL does not include index number sets BIS1 to BISL corresponding to the attribute sets AID1 to AIDL that have already been set.

More specifically, the delegation user secret key generation part 304 generates a key vector $k^*_{L+1,0}$ by adding a vector, generated by multiplying the key generating vector $k^*_{L,i}$ indicated by the index number i included in the index set BIj by times corresponding in number to the element $v_i$ of the predicate vector, to the key vector $k^*_{L,0}$ included in the user secret key $k^*_L$. In the vector generated by multiplying the key generating vector $k^*_{L,i}$ by times corresponding in number to the element $v_i$ of the predicate vector, the element $v_i$ of the predicate vector is set as a coefficient for the basis vector $b^*_i$. The coefficients of the respective basis vectors for which the elements of the predicate vector are newly set are randomized by a random number $\sigma_{0,j}$.

The delegation user secret key generation part 304 also generates a key vector $k^*_{L+1,h}$ by adding a vector, generated by multiplying the key generating vector $k^*_{L,i}$ indicated by the index number i included in the index set BIj by times corresponding in number to the element $v_i$ of the predicate vector, to the key generating vector $k^*_{L,h}$ included in the interim secret key $k^*_L$, for index numbers h and h=n+1 included in the delegation index set DBIL. In the vector generated by multiplying the key generating vector $k^*_{L,i}$ by times corresponding in number to the element $v_i$ of the predicate vector, the element $v_i$ of the predicate vector is set as a coefficient for the basis vector $b^*_i$. The coefficients of the respective basis vectors for which the elements of the predicate vector are newly set are randomized by a random number $\sigma_{h,j}$.

The delegation user secret key generation part 304 forms the delegation user secret key $k^*_{L+1}$ using the key vector $k^*_{L+1,0}$ and the key generating vector $k^*_{L+1,h}$.

(S603)

The terminal-side data transmission/reception part 311 of the access terminal 1 sends the delegation user secret key generated in (S602) and the public parameters to the access terminal 2.

(S604)

The terminal-side data transmission/reception part 311 of the access terminal 2 accepts the delegation user secret key and the public parameters. Then, the user secret key storage part 302 stores the accepted delegation user secret key and public parameters, in the storage device.

The delegation user secret key thus generated is a kind of user secret key. Therefore, with this delegation user secret key, a trap door can be generated, encrypted data can be searched, and the acquired encrypted data can be decrypted, in accordance with the process of (5) keyword search shown in FIG. 45.

As described above, in the confidential search system 100, coded information is generated by determining and conducting: the structure of the attribute information coded sequence 501 constituted by information including the individual ID such as the name and staff number that identify an individual, the organization information of the enterprise, the post of the staff, the category of the document, and the secret level of the document, and keywords included in the data; the comparison method; and the value assignment method, in the above manner. The attribute vector and predicate vector are generated by performing mapping from the generated coded information to the attribute vector and predicate vector as described above. Thus, the confidential search system 100 can determine accessibility to the data only by calculating the inner product of the attribute vector representing the access-allowed user and the predicate vector representing the attribute of the user.

The confidential search system 100 uses the inner-product predicate encryption such that the encrypted data is generated using the attribute vector and that the user secret key is generated by using the predicate vector. Hence, with the confidential search system 100, not only can the secret of the data kept in the data center 401 be protected, but also only the access-allowed user can decrypt the encrypted data.

For example, with the confidential search system 100, if a department and a section are designated in the attribute vector, encrypted data can be generated such that only a user belonging the department or section can decrypt the data.

In the confidential search system 100, a keyword included in data is set in an attribute information coded sequence which is generated when encrypting the data, and a trap door is generated by additionally setting a search keyword from the user secret key. Thus, in the confidential search system 100, only a user allowed to access the data can search the data without the fear of leaking the search keyword to the data center 401.

In particular, consistency/inconsistency of all searchable data can be checked by only sending one trap door to the data center 401.

For example, with the confidential search system 100, if a department and a section are designated in the attribute vector, encrypted data can be generated such that only a user belonging the department or section can search the data.

In the confidential search system 100, for example, some values such as the name of the company or business place in the belonging-office information of the attribute information coded sequence 501 can be determined, and an interim secret key corresponding to the attribute information coded sequence 501 can be issued. Then, the confidential search system 100 can perform system operation in which not only a main key management server 201 is installed, but also key management servers 201 are installed at the respective business places, so user management and user secret key generation can be performed at each business place.

The confidential search system 100 may be built such that a trap door and a decrypting secret key are generated from a user secret key, and a tag and an encrypted data encryption key are made as one item. Thus, in the confidential search system 100, the amount of data to be attached to the encrypted data can be reduced. As a result, in the confidential search system 100, the use amount of the storage area of the data center 401 can be reduced. In the confidential search system 100, the use amount of communication network needed when sending encrypted data from the data center 401 to the access terminal 301 can also be reduced.

In the confidential search system 100, when generating the delegation user secret key from the user secret key, information concerning who is the delegatee is included in the delegation user secret key attribute information coded sequence. With the confidential search system 100, it can be specified in the encrypted data attribute information coded sequence used when generating encrypted data, that a delegatee user cannot decrypt the data. Thus, the confidential search system 100 can control such that only the identified user who possesses the user secret key can search and decrypt the encrypted data.

In the confidential search system 100, when the coded sequence is used for AND test, OR test, and inclusion relation test, mapping from the coded sequence to an attribute vector or predicate vector is performed as described above. Then, in the confidential search system 100, encrypted data having the data main body structured like that of a slip or database and encrypted data having the data main body not structured like an ordinary document formed by a word processor, can be searched in the encrypted state.

The above explanation mainly shows an in-house system as an example. The above categorizations for the organization structure, post structure, and the like are merely examples. For example, a country ID may be placed before the business place ID, or a project ID may be employed in place of the unit ID. A sub-director-class flag may be set between the director-class flag and the manager-class flag. These coded sequences are merely examples, and various elements may be added or deleted depending on the situation of the organization.

In the belonging-office information coded sequence shown in FIG. 12, for example, when a user secret key is to be generated for a user who belongs to the D section but to no unit, "*" is designated as the unit ID, as in the belonging-office information coded sequence 2. In this case, with this user secret key, the user can read all documents of the D section. In order that the user can read only documents addressed to the D section and cannot read any document addressed to any unit of the D section, a random number R may be set as the unit ID instead of "*".

This control may be realized by combination with another coded sequence such as a post information coded sequence. More specifically, a chief generally does not belong to a unit, while a staff generally belongs to a unit. By utilizing this feature, control that enables only a user belonging to a unit to read the document, or only a user not belonging to any unit to read the document, may be carried out by using a post information coded sequence.

The above explanation treats, as the access control target, data managed by employees in the company in-house system. However, the access control target need not be limited to data in the company in-house system. The system can also be utilized by a medical information system which manages a patient's electronic clinical record or statement of medical charge. In this case, an organization hierarchical information, post information, and the like tailored for the in-house system are modified for the medical information system. For example, medical institution hierarchical information which can specify a hospital, doctor, and the like may be included in place of the organization hierarchical information. A title such as a doctor, nurse, or pharmacist may be used in place of the post information.

In the above explanation, the system administrator is a company, and it is the user who utilizes the access terminal. This setting can be flexibly changed depending on the employed system. For example, if a system is designed such that a user functions as the key management server and issues a user secret key to another user, the system can be built with more flexible access authority delegation than in the above system.

In the above explanation, the user secret key is kept by the access terminal 301, so the access terminal 301 generates a trap door and decrypts encrypted data encryption key as well. However, to enhance the security, the user secret key may be managed not by the access terminal 301 but by using a device such as an IC card. In this case, since an IC card is used, user authentication may be performed with a password, so that the security is enhanced.

When the key management server 201 is to deliver a user secret key to the access terminal 300, the user secret key may be stored in an IC card, and the IC card may be securely delivered to the user.

The above explanation shows a case where the attribute information coded sequences 501 are compared mainly by AND test. Alternatively, the attribute information coded sequences 501 can be compared by OR test, or by inclusion relation test.

In the above explanation, the structure of the attribute information coded sequence 501, including the search query coded sequence which keeps the search keyword, is determined at the time of system setup. This is for the sake of easy-to-understand explanation. However, in an environment where structured data such as a slip and non-structured data such as a word processor document coexist, it is often difficult to determine the structure of the search query coded sequence in advance. In view of this, instead of fixing the structure of the search query coded sequence at the time of system setup, attributes that can be flexibly used may be prepared. Then, the structure of the search query coded sequence can be fixed for each document type or each document content.

In the above explanation, the structure of the attribute information coded sequence 501 is determined in advance. When the company involves diversified businesses, it may be difficult to determine the structures of all coded sequences in advance. In that case, attributes that can be flexibly used for each business place or business type may be prepared in some coded sequences, and the user may flexibly set the attributes when using the coded sequence.

In the above explanation, the individual ID or company ID is indicated using a character string "Tanaka" or "A company". This is for the sake of easy-to-understand explanation. In practice, not only a character string but also a number may be utilized as an ID. Similarly, although a specific value such as a value "1" is set in each of the various types of flags, the value need not be "1", but can be determined flexibly.

The above explanation shows an example that employs symmetric pairing. Alternatively, the system may be implemented based on asymmetric pairing. In this case, more flexible parameter setting is possible, and the speed may be optimized.

In the above explanation, the various-key keeping part of the key management server can keep the user secret key as well. As the user secret key can be re-issued, it need not be kept unless necessary.

In the above explanation, the term information coded sequence which keeps the time when the data was generated is set in the attribute information coded sequence 501 shown in FIG. 9. In addition, the date on which the data may be decrypted may be stored as a decryptable-term information coded sequence. Then, a time-capsule encryption which cannot be decrypted at the time of encryption but will become decryptable in the future can be realized. In this case, the time when the data is decryptable may be kept in the decryptable-term information which is to be set in the encrypted data, and the current time may be set in the decryptable term information of the user secret key.

In the above explanation, different flags are prepared for different years in the term information coded sequence shown in FIG. 24. However, the flags need not represent the respective years only, but may be prepared to represent the respective months or weeks. Note that fine term division will lead to a longer computation time. Hence, it is necessary to determine how finely the term is to be divided by considering the balance between the unit of term to be controlled and the processing time.

In the above explanation, the decrypting user secret key is generated from the user secret key in (S506). However, decrypting user secret key generation need not be performed every time. A decrypting user secret key may be generated first, and after that the user secret key storage part 302 may store the generated decrypting user secret key in the storage device. Decrypting user secret key generation may be performed when (S506) is to be performed for the first time, or when the user secret key is accepted from the key management server.

Although the attribute information of the user is managed by the key management server 201 in the above explanation, it may be managed by another server. For example, in a case where an LDAP (Lightweight Directory Access Protocol) server which manages the personnel information of the employees already exists, the key management server need not manage the attribute information of the employees, but the LDAP server may be utilized for this purpose.

The above explanation mainly describes a case where AND test or OR test is used for comparing the respective elements of the attribute information coded sequences. Alternatively, this comparison may be practiced using inclusion relation test.

For example, the belonging-office information coded sequences 503 may be modified so that when they are to be AND-tested, whether or not a set of belonging-office information set in the user secret key (predicate) includes belonging-office information set in the encrypted data (attribute), can be checked by inclusion relation test.

Also, the post information coded sequence 504 may be modified by setting a set of post IDs in the encrypted data (attribute) in place of the post flags, so whether or not the user secret key (predicate) includes the post ID of the user set in the encrypted data, may be checked by inclusion relation test.

Likewise, concerning other coded sequences such as the term information coded sequences, they can be easily modified so that they can be compared using inclusion relation.

Embodiment 2

In Embodiment 1, the user secret key is generated from the predicate vector generated based on the user attribute information. In this case, if the user attribute information changes, a new user secret key need be reissued. When the user is transferred, a new user secret key need be reissued. If the user secret key contains term information, a new secret key need be reissued periodically. However, as the user secret key can be utilized for data decryption, it is highly confidential information. Therefore, the user secret key need be delivered by, for example, storing it in an IC card. This takes additional delivery cost.

Embodiment 2 will describe a method in which the cost of user secret key delivery is reduced by first delivering only portions of the user secret key that do not change by user transfer or the like securely, and then delivering separately attribute information on, for example the belonging office that may change, as a group certificate. The group certificate to be delivered separately may include, in addition to the belonging-office information coded sequence in which the belonging-office information is set, the term during which the user belonged to this office, in the form of a term information coded sequence. This enables strict access control so the user is able to decrypt the data only for a limited term.

Explanation will be made below based on the inner-product predicate encryption described in Non-Patent Literature 2. Non-Patent Literature 2 has no description on a specific method of delivering the user secret key securely. Hence, how to deliver the user secret key securely is another significant aspect of Embodiment 2.

In principle, Embodiment 2 will describe only portions that are different from Embodiment 1.

The configuration of a confidential search system 100 according to Embodiment 2 is the same as that of the confidential search system 100 according to Embodiment 1, and its explanation will accordingly be omitted.

Figure 58:
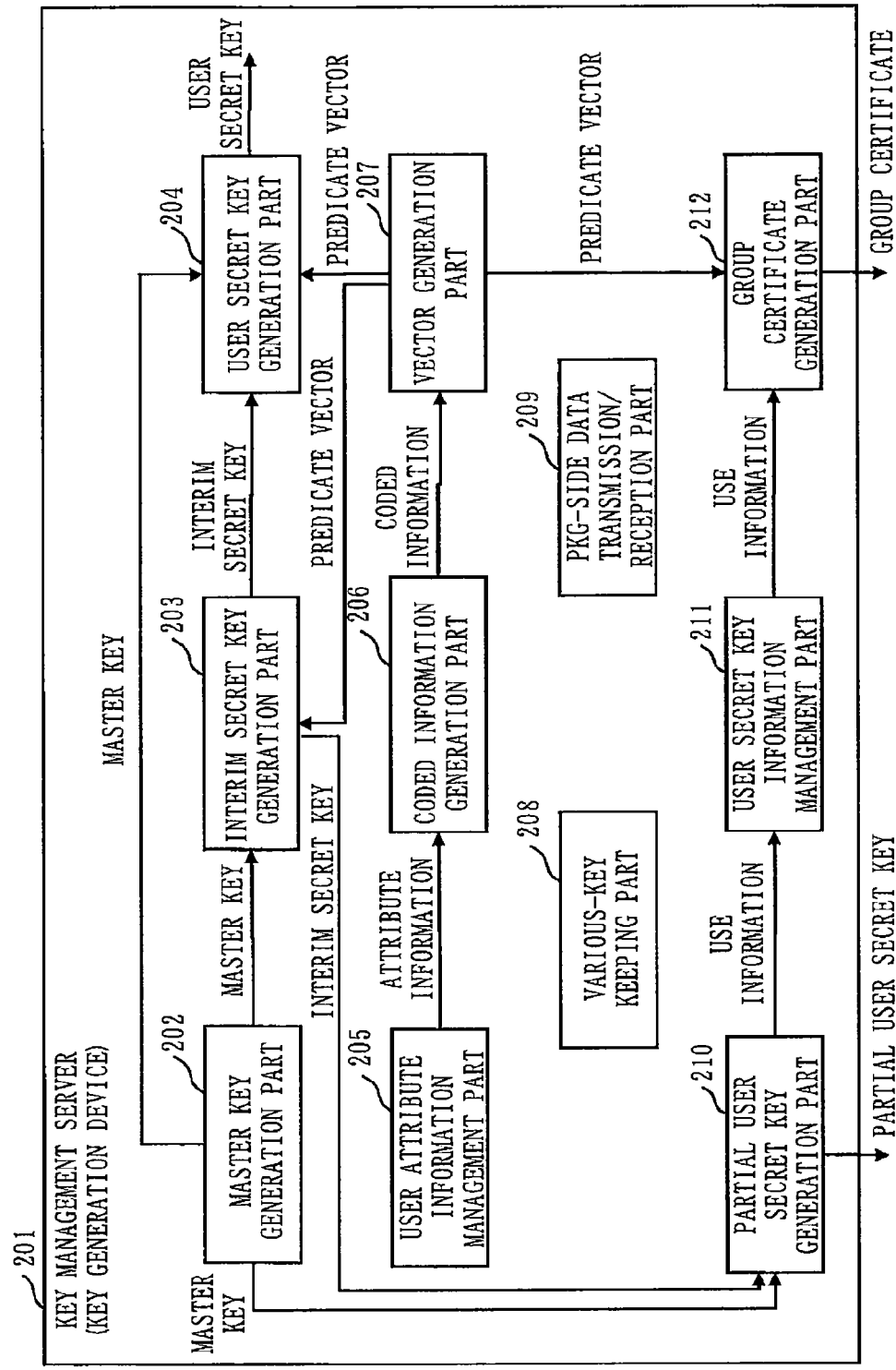
FIG. 58 is a function block diagram showing the function of a key management server 201 according to Embodiment 2.

FIG. 58 is a function block diagram showing the function of a key management server 201 according to Embodiment 2.

A master key generation part 202, an interim secret key generation part 203, a user secret key generation part 204, a user attribute information management part 205, a coded information generation part 206, a vector generation part 207, a various-key keeping part 208, and a PKG-side data transmission/reception part 209 have the same functions as those described in Embodiment 1, and their description will accordingly be omitted.

The key management server 201 has, in addition to the above functions, a partial user secret key generation part 210, a user secret key information management part 211, and a group certificate generation part 212.

Using a master key or an interim secret key, the partial user secret key generation part 210 generates a partial user secret key, with a processing device, based on an attribute information coded sequence indicating the belonging office, the post, and the like of the user. Particularly, the partial user secret key generation part 210 generates the partial user secret key by using, of a predicate vector generated from the attribute information coded sequence, only those information on fixed values that do not change depending on the belonging office or post.

The user secret key information management part 211 stores the information used by the partial user secret key generation part 210 for generating the partial user secret key, in a storage device. The information used for generating the user secret key is, for example, a random number value used when generating the partial user secret key.

Based on the information stored in the user secret key information management part 211 and the predicate vector, the group certificate generation part 212 generates, with a processing device, a group certificate necessary for forming a user secret key from the partial user secret key.

Figure 59:
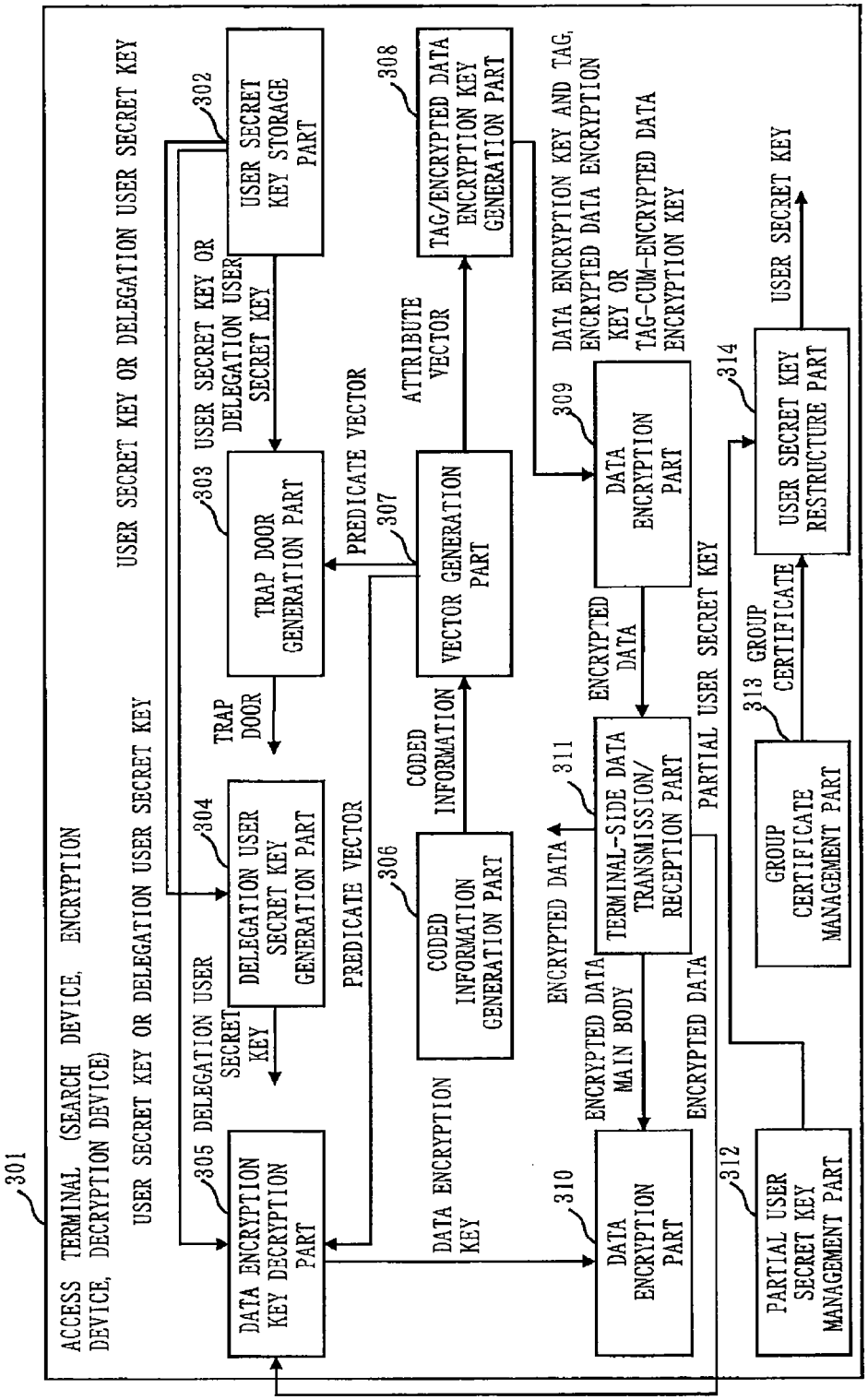
FIG. 59 is a function block diagram showing the function of an access terminal 301 according to Embodiment 2.

FIG. 59 is a function block diagram showing the function of an access terminal 301 according to Embodiment 2.

A user secret key storage part 302, a trap door generation part 303, a delegation user secret key generation part 304, a data encryption key decryption part 305, a coded information generation part 306, a vector generation part 307, a tag/encrypted data encryption key generation part 308, a data encryption part 309, a data decryption part 310, and a terminal-side data transmission/reception part 311 have the same functions as those described in Embodiment 1, and their description will accordingly be omitted.

The access terminal 301 has, in addition to the above functions, a partial user secret key management part 312, a user secret key restructure part 314, and a group certificate management part 313.

The partial user secret key management part 312 stores the partial user secret key accepted from the key management server 201, in a storage device.

The group certificate management part 313 stores the group certificate accepted from the key management server 201, in the storage device.

Based on the partial user secret key stored in the partial user secret key management part 312 and the group certificate stored in the group certificate management part 313, the user secret key restructure part 314 generates a user secret key, with the processing device.

The function and configuration of a data center 401 according to Embodiment 2 are the same as those of the data center 401 according to Embodiment 1, and their description will accordingly be omitted.

The structure of an attribute information coded sequence 501 and the structure of decrypted data are the same as those shown in Embodiment 1, and their description will accordingly be omitted. Also, a method of mapping from the attribute information coded sequence 501 to an attribute vector and from the attribute information coded sequence 501 to a predicate vector is also the same as that described in Embodiment 1, and its description will accordingly be omitted.

A method of generating the partial user secret key and the group certificate will be described.

When generating the partial user secret key and the group certificate, first, a fixed predicate vector and a variable predicate vector are generated from the predicate vector. Then, the partial user secret key is generated from the fixed predicate vector, and the group certificate is generated from the variable predicate vector.

A method of generating the fixed predicate vector and the variable predicate vector will now be described. A method of generating the partial user secret key from the fixed predicate vector and a method of generating the group certificate from the variable predicate vector will be described in the description of the process flow.

Figure 60:
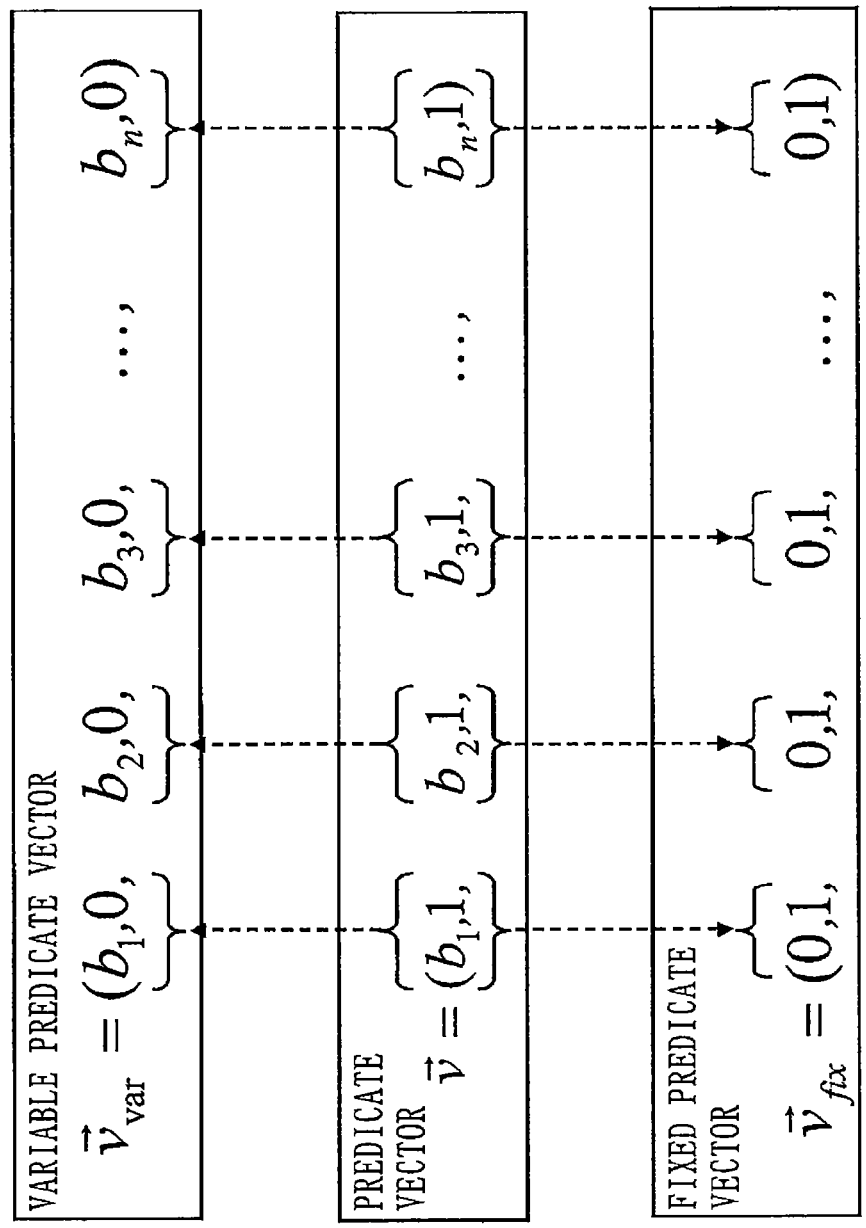
FIG. 60 is an illustration showing a scheme of generating a fixed predicate vector and a variable predicate vector from a predicate vector.

FIG. 60 is an illustration showing a scheme of generating the fixed predicate vector and the variable predicate vector from the predicate vector.

As described in Embodiment 1, there are a case where a value "1" is stored in the element of the predicate vector and a case where the sum or product of elements $b_i$ of the attribute information coded sequence is stored in the element of the predicate vector.

The fixed predicate vector is a vector in which, among the elements of the predicate vector, only those (fixed elements) where a value "1" is set are extracted and a value "0" is set in the remaining elements. The variable predicate vector is a vector in which, among the elements of the predicate vector, only those (change elements) where the sum or product of the elements $b_i$ of the attribute information coded sequence is set are extracted and a value "0" is set in the remaining elements. Namely, when the sum of the fixed predicate vector and variable predicate vector is calculated, a predicate vector is obtained.

The operation of the confidential search system 100 will be described.

The processes of (1) system initialization, (2) interim secret key generation, (3) user secret key generation, (4) encrypted data generation, (5) keyword search, and (6) delegation user secret key generation are the same as the processes indicated in Embodiment 1. In Embodiment 2, the processes of (7) partial user secret key generation and (8) group certificate generation are added to these processes. The additional processes will be explained.

The respective operation will be described with reference to the corresponding flowcharts.

Figure 61:
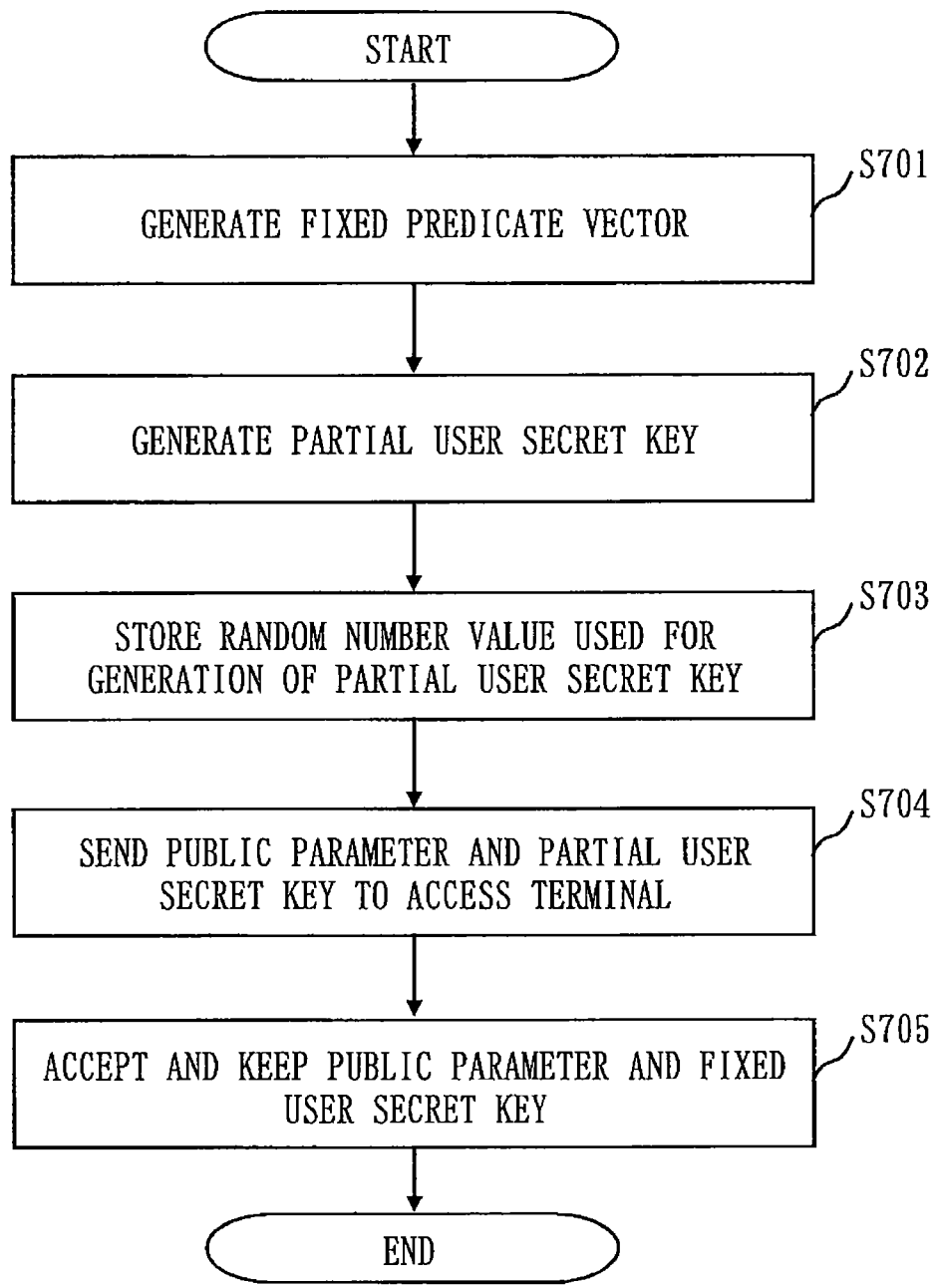
FIG. 61 is a flowchart showing the flow of the process of (7) partial user key generation.

FIG. 61 is a flowchart showing the flow of the process of (7) partial user secret key generation.

Figure 62:
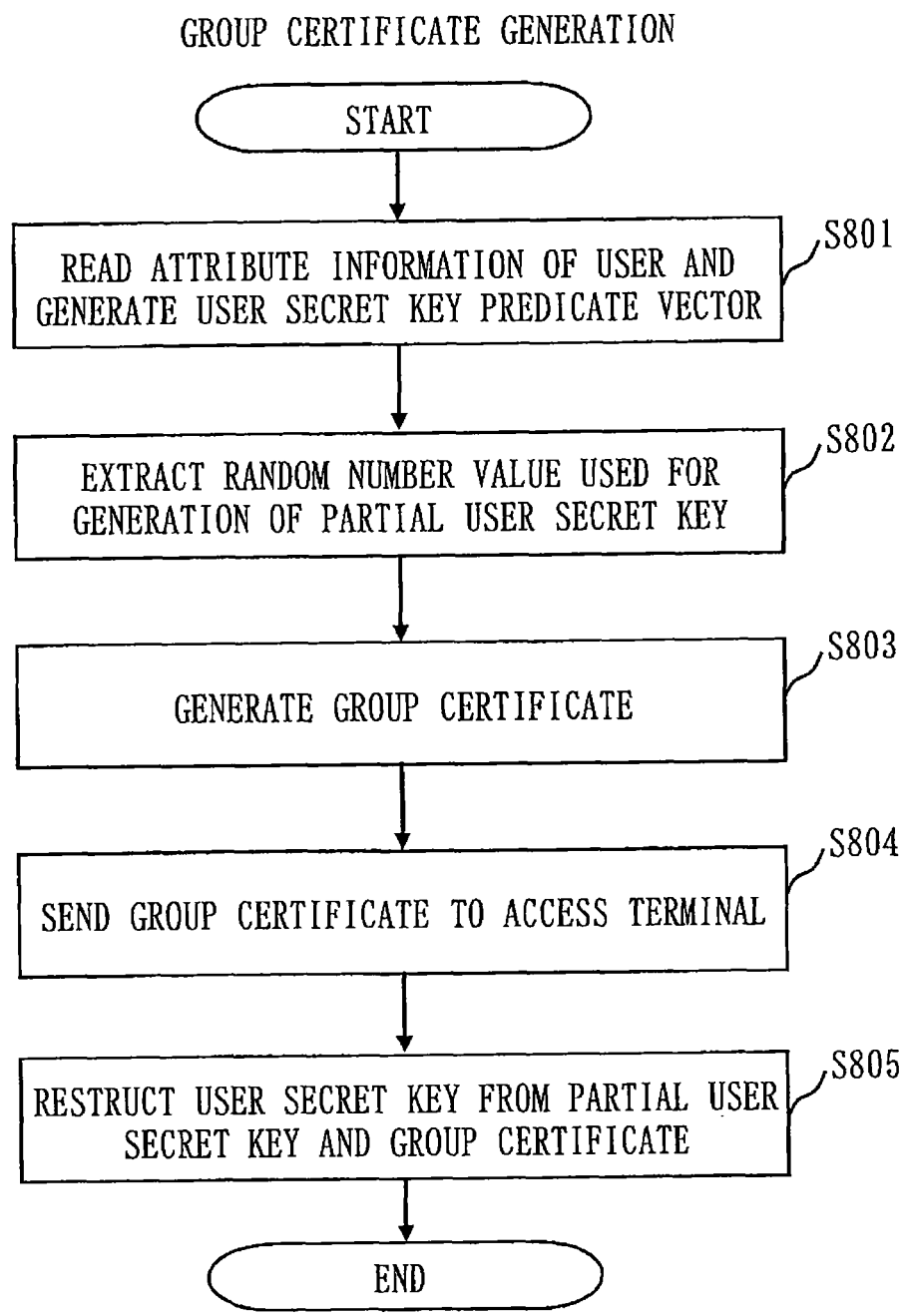
FIG. 62 is a flowchart showing the flow of the process of (8) group certificate generation.

FIG. 62 is a flowchart showing the flow of the process of (8) group certificate generation.

With reference to FIG. 61, the process of (7) partial user secret key generation will be described.

(7) Partial user secret key generation is a process in which the key management server 201 generates the partial user secret key (partial key vector).

(S701)

The partial user secret key generation part 210 of the key management server 201 extracts an element of the predicate vector where a value "1" is always set independently of the value of the attribute information coded sequence 501, from the structure of the attribute information coded sequence 501 included in the public parameters, with the processing device. The partial user secret key generation part 210 then generates an all-element-fixed predicate vector in which a value "1" is set in an element of the predicate vector where a value "1" is determined to be always set and a value "0" is set in the other elements.

For example, the partial user secret key generation part 210 generates a predicate vector by setting an appropriate value (arbitrary) in all elements of an attribute information coded sequence. Of the generated predicate vector, an element where "1" is set as a coefficient is extracted, so that an element of the predicate vector where a value "1" is always set independently of the value of the attribute information coded sequence 501 can be extracted.

Assume that the index number of the element of the all-element-fixed predicate where the value "1" is set is defined as BIfix.

(S702)

Based on the all-element-fixed predicate vector generated in (S701), the partial user secret key generation part 210 generates the partial user secret key with the processing device. Two methods are available for partial user secret key generation: a method of generating the partial user secret key directly from a master key and a method of generating the partial user secret key from an interim secret key.

First, a case of generating a partial user secret key $pk^*_1$ from the master key will be described.

The partial user secret key generation part 210 generates the partial user secret key $pk^*_1$ from the master key by calculating Formula 116 with the processing device.

In the following description, a letter L in each of the partial user secret key $pk^*_L$ and a group certificate $cert^*_L$ indicates that the corresponding key is an Lth level key. Namely, if the key is the partial user secret key $pk^*_1$, it is a 1st level secret key; if the key is a partial user secret key $pk^*_{L+1}$, it is an (L+1)th level key of a level lower than the Lth level by one level.

$$\sigma_j, \sigma_{h,j} \xleftarrow{U} F_q \qquad \text{[Formula 116]}$$

$$pk^*_{1,0} = \sum_{j \in AID} \sigma_j \left( \sum_{i \in BIj \cap BIfix} b^*_i \right)$$

$$pk^*_{1,h} = \sum_{j \in AID} \sigma_{h,j} \left( \sum_{i \in BIj \cap BIfix} b^*_i \right) + b^*_h$$

for $h = n+1$ or $\forall h \in BIS$ $$pk^*_1 = (pk^*_{1,0}, \{pk^*_{1,h}\})$$

An attribute set AID is a set of all attributes ID.

An index set BIj is a set of index numbers of a predicate vector corresponding to elements in the attribute set AID1, with which AID=j. A fixed index set BIfix is a set of index numbers of elements, among the elements of all-element-fixed predicate vectors, in which a value "1" is set. BIj∩BIfix is a product set of the index set BIj and the fixed index set BIfix, and is a set of index numbers having constant values regardless of the attribute.

An index set BIS is a set of all index numbers.

More specifically, the partial user secret key generation part 210 generates a partial key vector $pk^*_{1,0}$ by setting a value "1" as a coefficient for a basis vector $b^*_i$ indicated by an index number i included in BIj∩BIfix. The coefficients of the respective basis vectors for which the elements of the predicate vector are set are randomized by a random number $\sigma_j$.

The partial user secret key generation part 210 generates a partial key generating vector $pk^*_{1,h}$ in which a value "1" is set as the coefficient for the basis vector $b^*_i$ indicated by the index number i included in the index set BIj, and in which a value "1" is set as a coefficient for a basis vector $b^*_h$, for index numbers h and h=n+1 included in the index set BIS. The coefficients of the respective basis vectors for which the elements of the predicate vector are set are randomized by a random number $\sigma_{h,j}$.

The partial user secret key generation part 210 forms a partial user secret key $pk^*_1$ using the partial key vector $pk^*_{1,0}$ and the partial key generating vector $pk^*_{1,h}$.

A case of generating the partial user secret key $pk^*_{L+1}$ from the interim secret key $k^*_L$ will be described.

The user secret key generation part 204 generates the partial user secret key $pk^*_{L+1}$ from the master key by calculating Formula 117 with the processing device.

$$\sigma_{h,j} \xleftarrow{U} F_q \qquad \text{[Formula 117]}$$

$$pk^*_{L+1,h} = k^*_{L,h} + \sum_{j \in AID \setminus AID1,L} \sigma_{h,j} \left( \sum_{i \in BIj \cap BIfix} k^*_{L,i} \right)$$

for $h = 0, n+1$ or $\forall h \in BIS \setminus BIS1, L$ $$pk^*_{L+1} = (pk^*_{L+1,0}, \{pk^*_{L+1,h}\})$$

An attribute set AID\AID1,L is an attribute ID set obtained by excluding, from the attribute set AID of all attributes, attribute sets AID1 to AIDL of the attributes which have already been determined by the interim secret key.

An index set BIj is a set of index numbers of a predicate vector corresponding to elements in the attribute set AID\AID1,L, with which AID=j. A fixed index set BIfix is a set of index numbers of elements, among the elements of all-element-fixed predicate vectors, in which a value "1" is set. BIj∩BIfix is a product set of the index set BIj and the fixed index set BIfix, and is a set of index numbers having constant values regardless of the attribute.

An index set BIS\BIS1,L is a set of index numbers corresponding to the attribute included in the attribute set AID\AID1,L.

More specifically, the partial user secret key generation part 210 generates a partial key vector $pk^*_{L+1,0}$ by adding the key generating vector $k^*_{L,i}$ indicated by the index number i included in BIj∩BIfix, to the key vector $k^*_{L,0}$ included in the interim secret key $k^*_L$. In the key generating vector $k^*_{L,i}$, a value "1" is set as the coefficient for the basis vector $b^*_i$. The coefficients of the respective basis vectors for which the elements of the predicate vector are newly set are randomized by a random number $\sigma_{0,j}$.

The partial user secret key generation part 210 also generates a partial key generating vector $pk^*_{L+1,h}$ by adding a key generating vector $k^*_{L,i}$ indicated by the index number i included in the index set BIj∩BIfix, to the key generating vector $k^*_{L,h}$ included in the interim secret key $k^*_L$, for index numbers h and h=n+1 included in the index set BIS\BIS1,L. In the key generating vector $k^*_{L,i}$, a value "1" is set as the coefficient for the basis vector $b^*_i$. The coefficients of the respective basis vectors for which the elements of the predicate vector are newly set are randomized by a random number $\sigma_{h,j}$.

The partial user secret key generation part 210 forms the partial user secret key $pk^*_{L+1}$ using the key vector $pk^*_{L+1,0}$ and the partial key generating vector $pk^*_{L+1,h}$.

(S703)

The user secret key information management part 211 stores the random number values $\sigma_j$ and $\sigma_{h,j}$ generated in (S720), in the storage device.

(S704)

The PKG-side data transmission/reception part 209 sends the partial user secret key generated in (S702) and the public parameters to the access terminal 301.

(S705)

The terminal-side data transmission/reception part 311 of the access terminal 301 accepts the public parameters and the partial user secret key. Then, the partial user secret key management part 312 stores the accepted public parameters and partial user secret key, in the storage device.

With reference to FIG. 62, the process of (8) group certificate generation will be described.

(8) Group certificate generation is a process in which the key management server 201 generates a group certificate.

(S801)

The coded information generation part 206 and the vector generation part 207 read the user attribute from the user attribute information database, and generate a corresponding user secret key predicate vector, with the processing device. In this case, the delegation attribute set DAID is also determined. This process is the same as the process shown in (S301) of Embodiment 1.

(S802)

The group certificate generation part 212 extracts the random number values $\sigma_i$ and $\sigma_{h,j}$ generated in partial user secret key generation, from the storage device.

(S803)

Based on the user secret key predicate vector generated in (S801), the group certificate generation part 212 generates a group certificate with the processing device.

Two methods are available for group certificate generation: a method of generating the group certificate directly from the master key; and a method of generating the group certificate from the interim secret key.

First, a case of generating a group certificate $cert^*_1$ from the master key will be described.

The group certificate generation part 212 generates the group certificate $cert^*_1$ from the master key by calculating Formula 118 with the processing device.

$$cert^*_{1,0} = \sum_{j \in AID1} \sigma_j \sigma'_j \left( \sum_{i \in BIj \cap (\overline{BIfix})} v_i b^*_i \right) +$$

$$\sum_{j \in AID1} (\sigma_j \sigma'_j - \sigma_j) \left( \sum_{\substack{i \in BIj \cap BIfix \\ v_i = 1}} b^*_i \right) -$$

$$\sum_{j \in AID1} \sigma_j \left( \sum_{\substack{i \in BIj \cap BIfix \\ v_i = 0}} b^*_i \right) - \sum_{j \in AID \backslash AID1} \sigma_j \left( \sum_{i \in BIj \cap BIfix} b^*_i \right)$$

$$cert^*_{1,h} = \sum_{j \in AID1} \sigma_{h,j} \sigma'_{h,j} \left( \sum_{i \in BIj \cap (\overline{BIfix})} v_i b^*_i \right) +$$

$$\sum_{j \in AID1} (\sigma_{h,j} \sigma'_{h,j} - \sigma_{h,j}) \left( \sum_{\substack{i \in BIj \cap BIfix \\ v_i = 1}} b^*_i \right) -$$

$$\sum_{j \in AID1} \sigma_j \left( \sum_{\substack{i \in BIj \cap BIfix \\ v_i = 0}} b^*_i \right) -$$

$$\sum_{j \in AID \backslash AID1} \sigma_{h,j} \left( \sum_{i \in BIj \cap BIfix} b^*_i \right)$$

[Formula 118]

for $h = n + 1$ or $\forall h \in DBI$ $cert^*_1 = (cert^*_{1,0}, \{cert^*_{1,h}\})$ where $\overline{BIfix}$ is a complementary set of BIfix and will also be represented by BIfix^ in the following description.

The attribute set AID is a set of all attributes ID. The attribute set AID1 is a set of attributes ID of attributes to be set in the user secret key. The attribute set AID\AID1 is an attribute ID set obtained by excluding attributes ID to be set in the user secret key, from the all attributes ID.

The index set BIj is a set of index numbers of predicate vectors corresponding to elements in the attribute set AID1 or attribute set AID\AID1, with which AID=j. The fixed index set BIfix is a set of index numbers of elements, among the elements of all-element-fixed predicate vectors, in which a value "1" is set. BIj∩BIfix is a product set of the index set BIj and fixed index set BIfix, and is a set of index numbers having constant values regardless of the attribute. BIj∩BIfix^ (a complementary set of the fixed index set BIfix) is a product set of the index set BIj and complementary set BIfix^, and is a set of index numbers having values that change depending on the attribute.

The delegation index set DBI is a set of index numbers corresponding to the delegation attribute set DAID determined to be able to be set later by the user. The delegation index set DBI does not include an index number set corresponding to the attribute set AID1 which has already been set.

More specifically, as indicated by Formula 119, the group certificate generation part 212 generates a vector $cert^*_{1,0,1}$ (first vector) in which the element $v_i$ of the predicate vector is set, as a coefficient for the basis vector $b^*_i$ indicated by the index number i included in BIj∩BIfix^. The coefficients of the respective basis vectors for which the elements of the predicate vector are set are randomized by a product ($\sigma_j\sigma_j'$) of the random numbers $\sigma_j$ and $\sigma_j'$.

The group certificate generation part 212 generates a vector cert*$_{1,0,2}$ (second vector) in which a value "1" is set, as a coefficient for a predetermined basis vector b*$_i$. The coefficients of the respective basis vectors for which the elements of the predicate vector are set are randomized by random numbers $\sigma_j$ and $\sigma_j'$.

The group certificate generation part 212 determines the sum of the vectors cert*$_{1,0,1}$ and cert*$_{1,0,2}$ as a key vector cert*$_{1,0}$.

[Formula 119]
$$cert^*_{1,0,1} = \sum_{j \in AID1} \sigma_j \sigma'_j \left( \sum_{i \in BIj \cap (BIfix)} v_i b^*_i \right)$$

$$cert^*_{1,0,2} = \sum_{j \in AID1} (\sigma_j \sigma'_j - \sigma_j) \left( \sum_{\substack{i \in BIj \cap BIfix \\ v_i=1}} b^*_i \right) -$$

$$\sum_{j \in AID1} \sigma_j \left( \sum_{\substack{i \in BIj \cap BIfix \\ v_i=0}} b^*_i \right) - \sum_{j \in AID \setminus AID1} \sigma_j \left( \sum_{i \in BIj \cap BIfix} b^*_i \right)$$

$$cert^*_{1,0} = cert^*_{1,0,1} + cert^*_{1,0,2}$$

As indicated by Formula 120, the group certificate generation part 212 generates a vector cert*$_{1,h,1}$ (first vector) in which the element $v_i$ of the predicate vector is set, as a coefficient for the basis vector b*$_i$ indicated by the index number i included in BIj∩BIfix^. The coefficients of the basis vectors for which the elements of the predicate vector are set are randomized by a product ($\sigma_{h,j}\sigma_{h,j}'$) of the random numbers $\sigma_{h,j}$ and $\sigma_{h,j}'$.

The group certificate generation part 212 generates a vector cert*$_{1,h,2}$ (second vector) in which a value "1" is set, as a coefficient for a predetermined basis vector b*$_i$. The coefficients of the respective basis vectors for which the elements of the predicate vector are set are randomized by random numbers $\sigma_j$ and $\sigma_j'$.

The group certificate generation part 212 determines the sum of the vectors cert*$_{1,h,1}$ and cert*$_{1,h,2}$ as a key vector cert*$_{1,h}$.

[Formula 120]
$$cert^*_{1,h,1} = \sum_{j \in AID1} \sigma_{h,j} \sigma'_{h,j} \left( \sum_{i \in BIj \cap (BIfix)} v_i b^*_i \right)$$

$$cert^*_{1,h,2} = \sum_{j \in AID1} (\sigma_{h,j} \sigma'_{h,j} - \sigma_{h,j}) \left( \sum_{\substack{i \in BIj \cap BIfix \\ v_i=1}} b^*_i \right) -$$

$$\sum_{j \in AID1} \sigma_j \left( \sum_{\substack{i \in BIj \cap BIfix \\ v_i=0}} b^*_i \right) -$$

$$\sum_{j \in AID \setminus AID1} \sigma_{h,j} \left( \sum_{i \in BIj \cap BIfix} b^*_i \right)$$

$$cert^*_{1,h} = cert^*_{1,h,1} + cert^*_{1,h,2}$$

for $h = n + 1$ or $\forall h \in DBI$

A case of generating a group certificate cert*$_{L+1}$ from the interim secret key k*$_L$ will be described.

The group certificate generation part 212 generates the group certificate cert*$_{L+1}$ from the interim secret key k*$_L$ by calculating Formula 121 with the processing device.

[Formula 121]
$$\sigma'_{h,j} \xleftarrow{U} F_q$$

$$cert^*_{L+1,h} = \sum_{j \in AIDL+1} \sigma'_{h,j} \sigma_{h,j} \left( \sum_{i \in BIj \cap (BIfix)} v_i k^*_{L,i} \right) +$$

$$\sum_{j \in AIDL+1} (\sigma'_{h,j} \sigma_{h,j} - \sigma_{h,j}) \left( \sum_{\substack{i \in BIj \cap BIfix \\ v_i=1}} k^*_{L,i} \right) -$$

$$\sum_{j \in AIDL+1} \sigma_{h,j} \left( \sum_{\substack{i \in BIj \cap BIfix \\ v_i=0}} k^*_{L,i} \right) -$$

$$\sum_{j \in AID \setminus AID1, L+1} \sigma_{h,j} \left( \sum_{i \in BIj \cap BIfix} k^*_{L,i} \right)$$

for $h = 0, n + 1$ or $\forall h \in DBIL + 1$ $$cert^*_{L+1} = (\{cert^*_{L+1,h}\})$$

The attribute set AID is a set of all attributes ID, and the attribute set AIDL+1 is a set of attributes ID of attributes whose values have been determined in this group certificate generation. The attribute set AID1,L+1 is a set of attributes ID of attributes which are determined in generation of the interim secret key used for generating the group certificate, and in this group certificate generation. The attribute set AID\AID1,L+1 is an attribute ID set obtained by excluding attributes ID indicated by the attribute set AID1,L+1 from all the attributes ID.

The index set BIj is a set of index numbers of predicate vectors corresponding to elements in the attribute set AIDL+1 or attribute set AID\AID1, L+1, with which AID=j. The fixed index set BIfix is a set of index numbers of elements, among the elements of all-element-fixed predicate vectors, in which a value "1" is set. BIj∩BIfix is a product set of the index set BIj and fixed index set BIfix. BIj∩BIfix^ is a product set of the index set BIj and complementary set BIfix^.

The delegation index set DBIL+1 is a set of index numbers corresponding to the delegation attribute set DAID determined to be able to be set later by the user. The delegation index set DBIL+1 does not include an index number set corresponding to the attribute set AID1,L+1 having values already set.

More specifically, as indicated by Formula 122, the group certificate generation part 212 generates a vector cert*$_{L+1,h,1}$ (first vector) in which the element $v_i$ of the predicate vector is set, as a coefficient for the basis vector b*$_i$ indicated by the index number i included in BIj∩BIfix^. The coefficients of the respective basis vectors for which the elements of the predicate vector are set are randomized by a product ($\sigma_{h,j}\sigma_{h,j}'$) of the random numbers $\sigma_{h,j}$ and $\sigma_{h,j}'$.

The group certificate generation part 212 generates a vector cert*$_{L+1,h,2}$ (second vector) in which a value "1" is set, as a coefficient for a predetermined basis vector b*$_i$. The coefficients of the respective basis vectors for which the elements of the predicate vector are set are randomized by random numbers $\sigma_j$ and $\sigma_j'$.

The group certificate generation part 212 determines the sum of the vectors $cert^*_{L+1,h,1}$ and $cert^*_{L+1,h,2}$ as a key vector $cert^*_{L+1,h}$.

$$cert^*_{L+1,h,1} = \sum_{j \in AIDL+1} \sigma_{h,j} \sigma'_{h,j} \left( \sum_{i \in Blj \cap (Blfix)} v_i b^*_i \right)$$ [Formula 122]

$$cert^*_{L+1,h,2} = \sum_{j \in AIDL+1} (\sigma_{h,j} \sigma'_{h,j} - \sigma_{h,j}) \left( \sum_{\substack{i \in Blj \cap Blfix \\ v_i=1}} b^*_i \right) -$$

$$\sum_{j \in AIDL+1} \sigma_j \left( \sum_{\substack{i \in Blj \cap Blfix \\ v_i=0}} b^*_i \right) -$$

$$\sum_{j \in AID \setminus AID1, L+1} \sigma_{h,j} \left( \sum_{i \in Blj \cap Blfix} b^*_i \right)$$

$$cert^*_{L+1,h} = cert^*_{L+1,h,1} + cert^*_{L+1,h,2}$$

for $h = n+1$ or $\forall h \in DBIL+1$ (S804)
The PKG-side data transmission/reception part 209 sends the group certificate generated in (S803) to the access terminal 301.

(S805)
The terminal-side data transmission/reception part 311 of the access terminal 301 accepts the group certificate.
The user secret key restructure part 314 generates a user secret key $k^*_{L+1}$ by calculating Formula 123 with the processing device using the group certificate $cert^*_{L+1}$ and the partial user secret key $pk^*_L$ which is stored in the storage device by the partial user secret key management part 312. The user secret key storage part 302 stores the generated user secret key $k^*_{L+1}$ in the storage device.

$k^*_{L+1,0} = pk^*_{L+1,0} = cert^*_{L+1,0}$ $k^*_{L+1,h} = pk^*_{L+1,h} + cert^*_{L+1,h}$ for $h=n+1$ or $\forall h \in DBIL+1$ $k^*_{L+1} = (k^*_{L+1,0}, \{k^*_{L+1,h}\})$ [Formula 123]

More specifically, the user secret key restructure part 314 generates a user secret key $k^*_{L+1}(k^*_1)$ by adding a group certificate $cert^*_{L+1}(cert^*_1)$ to the partial user secret key $pk^*_{L+1}$ (or $pk^*_1$).
Of the group certificate $cert^*_{L+1}(cert^*_1)$, a vector $cert^*_{L+1,h,1}(cert^*_{1,h,1})$ is a vector in which a change element, which lacks in the partial user secret key $pk^*_{L+1}$ (or $pk^*_1$), of the predicate vector, is set. Hence, the lacking portion is complemented by adding the vector $cert^*_{L+1,h,1}(cert^*_{1,h,1})$ to the partial user secret key $pk^*_{L+1}$ (or $pk^*_1$).
Of the group certificate $cert^*_{L+1}(cert^*_1)$, a vector $cert^*_{L+1,h,2}(cert^*_{1,h,2})$ is a vector intended to remove the fixed element, which is excessively added to the partial user secret key $pk^*_{L+1}$ (or $pk^*_1$), of the predicate vector, and to set a necessary fixed element. By adding the vector $cert^*_{L+1,h,2}$ ($cert^*_{1,h,2}$) to the partial user secret key $pk^*_{L+1}$ (or $pk^*_1$), the excessively added fixed element of the predicate vector is removed, and the necessary fixed element is set.
As the group certificate includes the random number values $\sigma_j$ and $\sigma_{h,j}$ used when issuing the partial user secret key, only a combination of the group certificate and a partial user secret key including consistent random numbers enables generation of the user secret key. Namely, only an access terminal 301 having a partial user secret key including consistent random numbers can generate the user secret key from the group certificate.

The above explanation is described in a versatile manner and does not particularly limit the method of forming the attribute information coded sequence 501. However, the confidential search system 100 shown in Embodiment 2 is particularly effective when the attribute changes often as in a case where the belonging office of the user changes every year or every six month. In view of this, in the following explanation, a case will be described where the attribute changes often, by referring to practical examples.

Suppose the following situation. Mr/Ms. Tanaka belonged to the welfare unit, general affair section from the year 2007 to the year 2009 so, he or she can access all data generated in this period. Mr/Ms. Tanaka continuously belonged to the welfare unit at the beginning of the year 2010, so he or she can still access data generated in the year 2010 as well. During the year 2010, Mr/Ms. Tanaka was promoted to the subchief; so he or she can access the data generated in the year 2010 with the authority as the subchief. In the year 2011, Mr/Ms. Tanaka was transferred to the recruitment unit, personnel section.

Under this circumstance, with the confidential search system 100 according to Embodiment 1, the user secret key of Mr/Ms. Tanaka need be delivered: when he or she was posted in the year 2007; after that, at the beginning of each of the years 2008, 2009, and 2010 although he or she was not transferred during this period; then when he or she was promoted to subchief; and when he or she was transferred in the year 2011.

As described above, the user secret key is highly confidential information, and is usually delivered after it is stored in an IC card or the like. When the user secret key is to be delivered by storing it in the IC card, the IC card of Mr/Ms. Tanaka need be collected once, the user secret key need be written in the IC card, and then the IC card need be handed to Mr/Ms. Tanaka. This leads to a considerably cumbersome work The process of the confidential search system 100 according to Embodiment 2 under this circumstance will be described.

Figure 63:
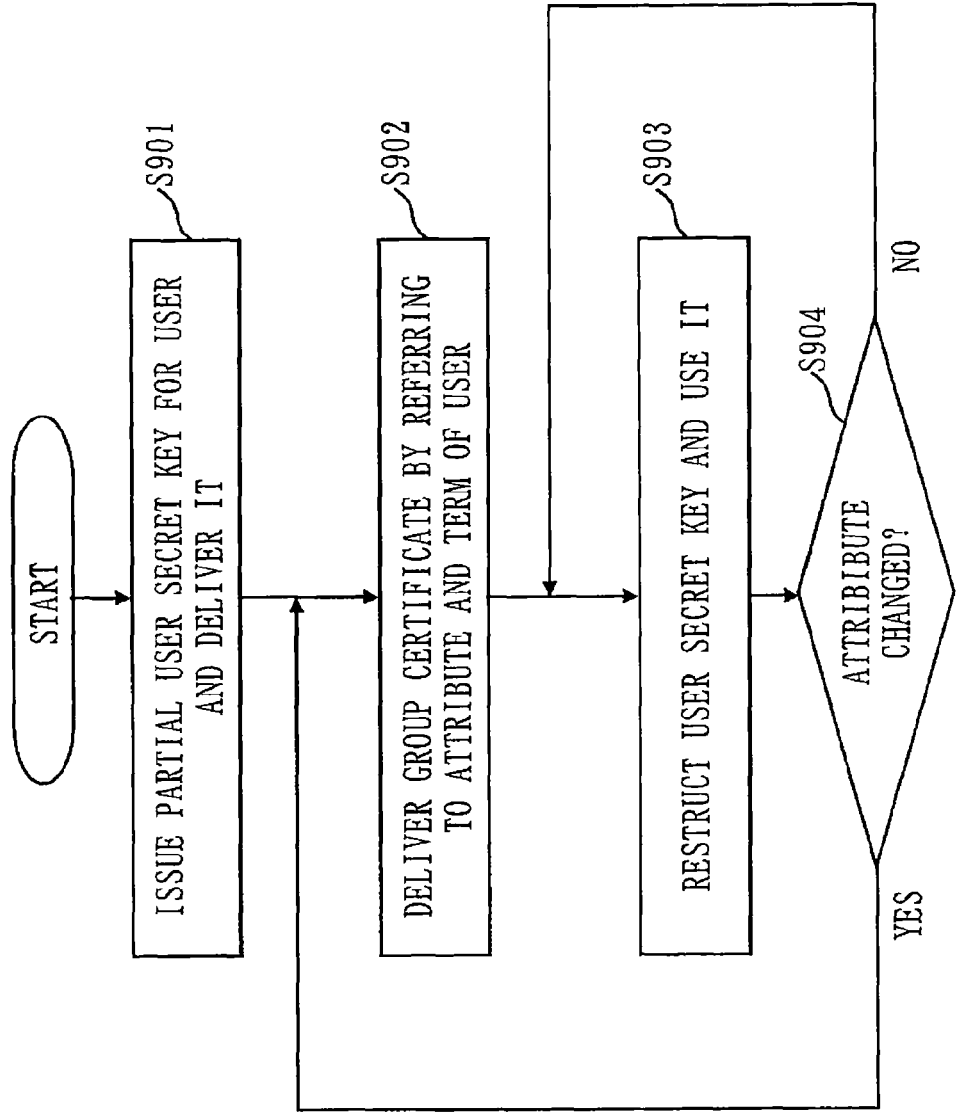
FIG. 63 is a flowchart showing the flow of the process of a confidential search system 100 according to Embodiment 2.

FIG. 63 is a flowchart showing the flow of the process of the confidential search system 100 according to Embodiment 2.
(S901)
The key management server 201 executes the process of (7) partial user secret key generation at a timing when a new user joins the company or is added to the management range of the key management server because of a transfer, etc, and the key management server 201 issues a partial user secret key to the user.
As the partial user secret key is confidential information, it needs to be sent to the user securely by utilizing an IC card or the like.
(S902)
The key management server 201 generates a group certificate based on the attributes and term of the user, and sends the group certificate to the access terminal 301.
As the group certificate includes random number values employed at the time of issuing the partial user secret key, only a combination of the group certificate and a partial user secret key including consistent random numbers enables generation of the user secret key. As far as the partial user secret key is protected securely, the group certificate need only be delivered via a communication line, resulting in a considerably low delivery cost.
(S903)
The access terminal 301 generates the user secret key using the partial user secret key delivered in (S901) and the group certificate delivered in (S902). Using the user secret key, the access terminal 301 searches or decrypts data.

FIG. 64 is an illustration showing an example of the attribute information coded sequence 501 concerning a group certificate. FIG. 64 shows an example of the attribute information coded sequence 501 concerning a group certificate which is issued when Mr/Ms. Tanaka joins the welfare unit in the year 2007.

In the example shown in FIG. 64, a flag indicating that Mr/Ms. Tanaka of the welfare unit, general affair section was a staff member in the year 2007 is set in the example shown in FIG. 64. Thus, a user secret key generated based on this group certificate and the partial user secret key corresponds to the attribute information coded sequence 501 shown in FIG. 64. Therefore, Mr/Ms. Tanaka can search and decrypt encrypted data within a range where the encrypted data that can be read by the attribute designated by the attribute information coded sequence 501.

(S904)

The key management server 201 monitors a change in attribute of the user. If the attribute does not change, no particular process is conducted, and the access terminal 301 utilizes the encrypted data by using the user secret key generated in (S903). If the attribute changes, the key management server 201, returning the process to (S902), generates a group certificate corresponding to the new attribute, and delivers it to the access terminal 301.

In (S903), the access terminal 301 generates a new user secret key based on the already delivered partial user secret key, and the new group certificate.

FIG. 65 shows an attribute information coded sequence 501 of a group certificate issued to user Mr/Ms. Tanaka at the beginning of the year 2010 several years after the time of the attribute shown in FIG. 64.

In the circumstance described above, time passes with no change occurring in the attribute, until the year 2010. Hence, in the attribute information coded sequence 501, only the attribute values corresponding to the year 2008 through the year 2010 are updated in the term information coded sequence. A new group certificate is generated based on the updated attribute information coded sequence 501. By generating a user secret key using the newly generated group certificate, Mr/Ms. Tanaka can utilize the encrypted data generated from the year 2007 to the year 2010, by the staff member authority of the welfare unit.

Although not mentioned, a group certificate in which only the term was extended was similarly delivered at the beginning of the year 2008 and the year 2009.

FIG. 66 shows an attribute information coded sequence 501 of a group certificate issued to user Mr/Ms. Tanaka when he or she is promoted to subchief in the year 2010.

In FIG. 66, the post information is updated to subchief, and only the year 2010 is set as the term information. Mr/Ms. Tanaka belongs to the welfare section since the year 2007, but is posted to subchief in the year 2010, so he or she may access, by the authority of subchief, only the encrypted data generated in the year 2010. The new group certificate is generated based on this attribute information coded sequence 501. By generating the user secret key using the generated new group certificate, Mr/Ms. Tanaka can access the encrypted data generated in the year 2010 by the authority of the subchief. By the authority of the subchief, Mr/Ms. Tanaka cannot access the encrypted data generated before the year 2009.

FIG. 67 is an illustration showing an attribute information coded sequence 501 of a group certificate issued to user Mr/Ms. Tanaka when he or she is transferred to the recruitment unit, personnel section at the beginning of the year 2011.

In FIG. 67, the belonging office information is updated to the recruitment unit, personnel department, and only the year 2011 is set as the term information. Based on the attribute information coded sequence 501, a new group certificate is generated. By generating a user secret key using the generated new group certificate, Mr/Ms. Tanaka can access the encrypted data generated in the year 2011 by the recruitment unit, personnel section. Regarding the encrypted data generated in the year 2011 by the welfare unit, general affair section, Mr/Ms. Tanaka cannot access it because a group certificate with this term information being set is not issued.

In order for Mr/Ms. Tanaka to be able to read the documents of the past one year of the recruitment unit, personnel section when he or she is transferred to the recruitment unit, personnel section, not only a year 2010 flag but also a year 2011 flag may be set in the term information coded sequence, as shown in FIG. 68. Then, Mr/Ms. Tanaka can access encrypted data generated in the year 2010 as well.

As described above, the confidential search system 100 enables formation of the user secret key only by combining the partial user secret key and the group certificate. Then, although at least the partial user secret key need be delivered securely, the group certificate need not be delivered securely. Therefore, for example, in the confidential search system 100, first, the partial user secret key can be delivered by an IC card or the like, and the group certificate can be delivered via the network. As a result, in the confidential search system 100, the delivery cost of the group certificate can be reduced. In a system where the attribute change occurs by, for example, personnel transfer, the operation cost of the system can be reduced.

With the confidential search system 100, when a group certificate is to be issued, in addition to the belonging-office information and the post information, the information on the term during which such information has been given to the user is precisely included in the group certificate. Accordingly, the confidential search system 100 can carry out limitation such that, for example, once the user is transferred to another department, he or she can no longer access the encrypted data which is newly generated in the department he or she previously belonged. Also, the confidential search system 100 can carryout limitation such that the user can access the encrypted data generated in the new department after he or she was transferred to it, while he or she cannot access the past encrypted data of the new department. The confidential search system 100 can also cope with a case where the user is to be allowed to access the encrypted data generated in the past one year.

In the above explanation, the term information is set in units of years, and accordingly updating of access authority as the result of personnel transfer of the user can only be controlled in units of years. If however, the unit of term information is shorter, access authority can be controlled more finely.

For example, if the term information is set in units of months, the access authority can be updated to reflect monthly personnel transfer. In this case as well, the group certificate can be delivered via the network. Thus, the updating of access authority can be realized without increasing the cumbersome operation or the cost.

The above explanation notes that although the attribute of the key management server 201 is fixed, the attribute of the user changes, and shows a method of delivering the user secret key by dividing the same into the partial user secret key and the group certificate. When the attribute of the key management server 201 is also to be updated, a partial interim secret key and a group certificate may be issued to the key management server 201 as well. A method of generating the partial interim secret key and the group certificate for the key management server 201 is basically the same as the method of generating the partial user secret key and the group certificate for the user.

In the above explanation, the all-element-fixed predicate vector is generated in (S701). The all-element-fixed predicate vector need be generated only once, but need not be generated every time. For example, if the all-element-fixed predicate vector is generated once at the time of system setup and delivered as a public parameter, it need not be generated for each of all users. This is advantageous.

In the above explanation, the fixed predicate vector is generated from the constant number portion of the predicate vector, and the variable predicate vector is generated from the variable portion (attribute portion) of the predicate vector. However, the predicate vector need not always be separated into the fixed predicate vector and the variable predicate vector to respectively correspond to the fixed portion and the variable portion. The separation suffices if the sum result of the fixed predicate vector and variable predicate vector forms the predicate vector. For example, a secret key (a partial user secret key or partial interim secret key) may be generated from a fixed predicate vector having elements which are determined randomly, a variable predicate vector may be obtained by subtracting the fixed predicate vector from the predicate vector, and a group certificate may be issued. Fixed information such as the name, although being an attribute, may be included in the fixed predicate vector.

In the above explanation, as the group certificate generated in Formula 118 utilizes $\sigma_j\sigma_j'$ as a random number to be used in the generation, if the group certificate is combined with the partial user secret key, the user secret key generated using the random number $\sigma_j\sigma_j'$ can be recovered. Alternatively, the group certificate may be generated by using a random number $\sigma_j+\sigma_j'$ in place of $\sigma_j\sigma_j'$, and may be combined with the partial user secret key, so that a user secret key generated using the random number $\sigma_j+\sigma_j'$ can also be recovered. The group certificate can be generated using other random numbers, in place of the random numbers $\sigma_j$ and $\sigma_j'$.

The hardware configuration of the confidential search system 100 (the key management server 201, the access terminal 301, and the data center 401) in the above embodiments will be described.

FIG. 69 is an illustration showing an example of the hardware configuration of the key management server 201, access terminal 301, and data center 401.

As shown in FIG. 69, each of the key management server 201, access terminal 301, and data center 401 includes a CPU 1911 (also referred to as a Central Processing Unit, central processing device, processing device, computation device, microprocessor, microcomputer, or processor) which executes programs. The CPU 1911 is connected to a ROM 1913, a RAM 1914, an LCD 1901 (Liquid Crystal Display), a keyboard 1902 (K/B), a communication board 1915, and a magnetic disk device 1920 via a bus 1912, and controls these hardware devices. In place of the magnetic disk device 1920 (fixed disk device), a storage device such as an optical disk device or memory card read/write device may be employed. The magnetic disk device 1920 is connected via a predetermined fixed disk interface.

The ROM 1913 and the magnetic disk device 1920 are examples of a nonvolatile memory. The RAM 1914 is an example of a volatile memory. The ROM 1913, RAM 1914, and magnetic disk device 1920 are examples of the storage device (memory). The keyboard 1902 and the communication board 1915 are examples of an input device. The communication board 1915 is an example of a communication device (network interface). Furthermore, the LCD 1901 is an example of a display device.

The magnetic disk device 1920, ROM 1913, or the like stores an operating system 1921 (OS), a window system 1922, programs 1923, and files 1924. The CPU 1911, the operating system 1921, and the window system 1922 execute each program of the programs 1923.

The programs 1923 include software and a program that execute the functions described as the "master key generation part 202", "interim secret key generation part 203", "user secret key generation part 204", "user attribute information management part 205", "coded information generation part 206", "vector generation part 207", "various-key keeping part 208", "PKG-side data transmission/reception part 209", "partial user secret key generation part 210", "user secret key information management part 211", "group certificate generation part 212", "user secret key storage part 302", "trap door generation part 303", "delegation user secret key generation part 304", "data encryption key decryption part 305", "coded information generation part 306", "vector generation part 307", "tag/encrypted data encryption key generation part 308", "data encryption part 309", "data decryption part 310", "terminal-side data transmission/reception part 311", "partial user secret key management part 312", "user secret key restructure part 314", "group certificate management part 313", "center-side data transmission/reception part 402", "data management part 403", "search request reception part 404", "search execution part 405", "search result transmission part 406", and the like in the above description, and other programs. The program is read and executed by the CPU 1911.

The files 1924 store information, data, signal values, variable values, and parameters of the "master key", "public parameters", "encrypted data", "interim secret key", "user secret key", "partial user secret key", "group certificate", "partial interim secret key", and the like of the above explanation, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 1911 through a read/write circuit, and are used for the operations of the CPU 1911 such as extraction, search, look-up, comparison, computation, calculation, process, output, print, and display. The information, data, signal values, variable values, and parameters are temporarily stored in the main memory, cache memory, buffer memory, or the like during the operations of the CPU 1911 including extraction, search, look-up, comparison, computation, calculation, process, output, print, and display.

The arrows of the flowcharts in the above explanation mainly indicate input/output of data and signals. The data and signal values are stored in the memory of the RAM 1914, the recording medium such as an optical disk, or in an IC chip. The data and signals are transmitted online via the bus 1912, signal lines, cables, or other transmission media, or electric waves.

The "part" in the above explanation may be a "circuit", "device", or "equipment", "means" or "function"; or a "step", "procedure", or "process". The "device" may be a "circuit", "equipment", "means", or "function"; or a "step", "procedure", or "process". The "process" may be a "step". Namely, the "part" may be realized as firmware stored in the ROM 1913. Alternatively, the "part" may be practiced by only software; by only hardware such as an element, a device, a substrate, or a wiring line; by a combination of software and hardware; or furthermore by a combination of software, hardware, and firmware. The firmware and software are stored, as programs, in the recording medium such as the ROM 1913. The program is read by the CPU 1911 and executed by the CPU 1911. In other words, the program causes the computer to function as a "part" described above. Alternatively, the program causes the computer or the like to execute the procedure and method of the "part" described above.

REFERENCE SIGNS LIST

100: confidential search system; 101: network; 102: in-house LAN; 201: key management server; 202: master key generation part; 203: interim secret key generation part; 204: user secret key generation part; 205: user attribute information management part; 206: coded information generation part; 207: vector generation part; 208: various-key keeping part; 209: PKG-side data transmission/reception part; 210: partial user secret key generation part; 211: user secret key information management part; 212: group certificate generation part; 301: access terminal; 302: user secret key storage part; 303: trap door generation part; 304: delegation user secret key generation part; 305: data encryption key decryption part; 306: coded information generation part; 307: vector generation part; 308: tag/encrypted data encryption key generation part; 309: data encryption part; 310: data decryption part; 311: terminal-side data transmission/reception part; 312: partial user secret key management part; 313: group certificate management part; 314: user secret key restructure part; 401: data center; 402: center-side data transmission/reception part; 403: data management part; 404: search request reception part; 405: search execution part; 406: search result transmission part; 501: attribute information coded sequence; 502: individual ID; 503: belonging-office information coded sequence; 504: post information coded sequence; 505: category coded sequence; 506: secret level coded sequence; 507: employment type coded sequence; 508: term information coded sequence; 509: delegatee information coded sequence; 510: key usage flag; 511: search query coded sequence; 601: company ID; 602: business place ID; 603: department ID; 604: section ID; 605: unit ID; 701: executive class flag; 702: director class flag; 703: manager class flag; 704: chief class flag; 705: subchief class flag; 706: staff class flag; 801: major category identification ID; 802: medium category identification ID; 803: minor category identification ID; 901: top-secret flag; 902: secret flag; 903: in-house secret flag; 904: non-relevance flag; 1001: major career flag; 1002: general career flag; 1003: visiting staff flag; 1004: affiliate staff flag; 1005: dispatched staff flag; 1006: other-type flag; 1201: start year/month coded sequence; 1202: middle year coded sequence; 1203: end year/month coded sequence; 1301: secretary-to-executive flag; 1302: acting director flag; 1303: acting manager flag; 1304: acting chief flag; 1305: colleague flag

The invention claimed is:

1. A confidential search system comprising an encrypted data accumulation device which accumulates encrypted data, and a search device which searches encrypted data that satisfies a predetermined search condition, from the encrypted data accumulated in the encrypted data accumulation device, wherein the encrypted data accumulation device includes
an encrypted data accumulation part which accumulates encrypted data including an encryption vector c1 in which respective elements of an attribute vector generated from first attribute information indicating a searchable range are set as a coefficient for one or more of basis vectors of basis vectors $b_i$ (i=1, ..., n) (n is an integer of 2 or more) that constitute a predetermined basis B, in a storage device, wherein the search device includes
a user secret key storage part which stores a key vector $k^*_{L,0}$ in which respective elements of a first predicate vector generated from second attribute information indicating an attribute of a user are set as the coefficient for one or more, but not all, of basis vectors of basis vectors $b_i$ (i=1, ..., n) that constitute a predetermined basis B*, in the storage device, a trap door generation part which generates a search condition vector SV in which respective elements of a second predicate vector generated from third attribute information indicating the predetermined search condition are set as the coefficient for a predetermined basis vector, where the elements of the first predicate vector are not set, in the key vector $k^*_{L,0}$ stored in the user secret key storage part, and which generates a vector obtained by adding the search condition vector SV generated, to the key vector $k^*_{L,0}$, as a trap door X with a processing device, and a data transmission part which transmits the trap door X generated by the trap door generation part to the encrypted data accumulation device via a communication device, and wherein the encrypted data accumulation device further includes
a search execution part which searches encrypted data that satisfies the search condition, among the encrypted data accumulated by the encrypted data accumulation part, by conducting a predetermined computation with the processing device using the encryption vector c1 included in the encrypted data accumulated by the encrypted data accumulation part and the trap door X transmitted by the data transmission part, and by checking whether or not the encrypted data satisfies the search condition based on a result obtained by the predetermined computation.

2. The confidential search system according to claim 1, wherein the encrypted data accumulation part accumulates encrypted data including the encryption vector c1 in which the respective elements of the attribute vector are set as a coefficient for one or more of basis vectors of the basis vectors $b_i$ (i=1, ..., n) among the basis vectors $b_i$ (i=1, ..., n, ..., N) (N is an integer of n+1 or more) that constitute the basis B and in which information ρ is set as a coefficient for a basis vector $b_{n+1}$, and a ciphertext c2 obtained by encrypting plaintext information m by a common K calculated from the information ρ with a predetermined cryptography, wherein the user secret key storage part stores the key vector $k^*_{L,0}$ in which the respective elements of the first predicate vector are set as the coefficient for one or more, but not all, of basis vectors of basis vectors $b^*_i$ (i=1, ..., n) among the basis vectors $b^*_i$ (i=1, ..., n, ..., N) that constitute the predetermined basis B*, and wherein the search device further includes
a common key acquisition part which decrypts the encryption vector c1 by generating a vector obtained by adding a vector, in which a predetermined value is set as a coefficient for a basis vector $b^*_{n+1}$, to the key vector $k^*_{L,0}$, as a decryption key, and conducting the predetermined computation with the processing device using the encryption vector c1 included in the encrypted data searched by the search execution part and the decryption key generated, thus acquiring the common key K, and a data decryption part which, with the processing device, decrypts the ciphertext c2 included in the encrypted data by using the common key K acquired by the common key acquisition part, thus acquiring plaintext information m.

3. The confidential search system according to claim 1,
wherein the search device further includes
a delegation user secret key generation part which generates a lower level key vector $k^*_{L+1,0}$ having a searchable range and a decryptable range which are more limited than in the key vector $k^*_{L,0}$, by setting, in the key vector $k^*_{L,0}$, a predetermined value as a coefficient for a basis vector where the respective elements of the predicate vector are not set, among the basis vectors $b^*_i$ (i=1, ..., n), with the processing device.

4. The confidential search system according to claim 1,
further comprising a key generation device,
wherein the key generation device includes
a partial user secret key generation part which generates, with the processing device, a partial key vector $pk^*_{L,0}$ in which, regarding i, among i=1, ..., n, indicating a fixed element where only a value 0 or a fixed value is set for an element $v_i$ of a predicate vector, the fixed value is set as a coefficient for the basis vector $b^*_i$, and
a group certificate generation part which generates, with the processing device, a group certificate including: a first vector in which, regarding i, among i=1, ..., n, indicating a change element where a value that changes depending on attribute information is set for the element $v_i$ of the predicate vector, the element $v_i$ of the predicate vector generated from the attribute information indicating an attribute of a user is set as a coefficient for the basis vector $b^*_i$; and a second vector in which, regarding i, among i, indicating the fixed element, where the value 0 is set for the element $v_i$ of the predicate vector generated from the attribute information indicating the attribute of the user, the fixed value is set as a coefficient for the basis vector $b^*_i$,
wherein the search device further includes
a user secret key restructure part which generates, with the processing device, the key vector $k^*_{L,0}$ by adding the first vector included in the group certificate generated by the group certificate generation part, to the partial key vector $pk^*_{L,0}$ generated by the partial user secret key generation part and by subtracting the second vector included in the group certificate generated by the group certificate generation part, from the partial key vector $pk^*_{L,0}$ generated by the partial user secret key generation part, and
wherein the user secret key storage part stores the key vector $k^*_{L,0}$ generated by the user secret key restructure part.

5. The confidential search system according to claim 4,
wherein the group certificate generation part generates a new group certificate including the first vector and the second vector, when the attribute of the user changes, based on the predicate vector generated from attribute information indicating the attribute of the user after the change, and
wherein the user secret key restructure part generates a new key vector $k^*_{L,0}$ by adding the first vector included in the new group certificate, to the partial key vector $pk^*_{L,0}$ and by subtracting the second vector included in the new group certificate, from the partial key vector $pk^*_{L,0}$.

6. The confidential search system according to claim 2,
wherein the encrypted data accumulation part accumulates the encrypted data including the encryption vector c1 indicated in Formula 1,
wherein the user secret key storage part stores the key vector $k^*_{L,0}$ indicated in Formula 2,
wherein the trap door generation part generates the trap door X indicated in Formula 3, and
wherein the search execution part executes pairing computation e(c1, X), being the predetermined computation, indicated in Formula 4:

$$\sigma_j \xleftarrow{U} F_q \qquad \text{[Formula 1]}$$

$$c1 = \sum_{j \in AID} \sigma_j \left( \sum_{i \in BIj} x_i b_i \right) + \rho b_{n+1}$$

where $$y \xleftarrow{U} A$$

means selecting y uniformly from A, $F_q = \{0, 1, \ldots, q-1\}$,

AID is a set of attributes ID assigned to attributes that constitute the first attribute information,
BIj is a set of index numbers of an attribute vector corresponding to an attribute, included in AID, with which attribute ID=j,
$x_i$ is an element of an attribute vector having an index number i, and
$b_i$ and $b_{n+1}$ are basis vectors that constitute the basis B, $$\sigma_j \xleftarrow{U} F_q \qquad \text{[Formula 2]}$$

$$k^*_{L,0} = \sum_{j \in AID} \sigma_j \left( \sum_{i \in BIj} v_i b^*_i \right)$$

where $$y \xleftarrow{U} A$$

means selecting y uniformly from A, $F_q = \{0, 1, \ldots, q-1\}$,

AID is a set of attributes ID assigned to attributes that constitute the second attribute information,
BIj is a set of index numbers of the first predicate vector corresponding to an attribute included in AID, with which an attribute ID=i,
$v_i$ is an element of the first predicate vector having an index number i, and
$b^*_i$ is a basis vector which constitutes the basis $B^*$, $$\sigma_{L+1,j} \xleftarrow{U} F_q \qquad \text{[Formula 3]}$$

$$SV = \sum_{j \in AIDL+1} \sigma_{L+1,j} \left( \sum_{i \in BIj} v_i k^*_{L,i} \right)$$

$$X = k^*_{L,0} + SV$$

where $$y \xleftarrow{U} A$$

means selecting y uniformly from A, $F_q = \{0, 1, \ldots, q-1\}$,

AIDL+1 is a set of attributes ID assigned to an attribute that constitute the third attribute information,
BIj is a set of index numbers of the second predicate vector corresponding to an attribute included in AIDL+1, with which an attribute ID=j, $v_i$ is an element of the second predicate vector having an index number i, and
$b^*_i$ is a basis vector which constitutes the basis B*, $$e(p, q) := \prod_{i=1}^{N} e(\chi_i b_i, \eta_i b^*_i) \qquad \text{[Formula 4]}$$

where $$p := \sum_{i=1}^{N} \chi_i b_i,$$

$$q := \sum_{i=1}^{N} \eta_i b^*_i,$$

and $\chi_n, \eta_i$ : coefficient

7. The confidential search system according to claim 6,
wherein the user secret key storage part stores a user secret key $k^*_L$ including the key vector $k^*_{L,0}$ and a key generating vector shown in Formula 5, and
wherein the search device further includes
a delegation user secret key generation part which generates, with the processing device, a lower level key vector $k^*_{L+1,0}$ indicated in Formula 6 and having a searchable range and a decryptable range which are more limited than the key vector $k^*_{L,0}$:

$$\sigma_{h,j} \xleftarrow{U} F_q \qquad \text{[Formula 5]}$$

$$k^*_{L,h} = \sum_{j \in AID} \sigma_{h,j} \left( \sum_{i \in BIj} v_i b^*_i \right) + b^*_h$$

for $h = n+1$ or $\forall h \in DBI$ $$k^*_L = (k^*_{L,0}, \{k^*_{L,h}\})$$

where $$y \xleftarrow{U} A$$

means selecting y uniformly from A, $F_q = \{0, 1, \ldots, q-1\}$,

AID is a set of attributes ID assigned to attributes that constitute the second attribute information,
BIj is a set of index numbers of the first predicate vector corresponding to an attribute included in AID, with which an attribute ID=j,
$v_i$ is an element of the first predicate vector having an index number i,
$b^*_i$ is a basis vector which constitutes the basis B*, and
DBI is a predetermined attribute ID, $$\sigma_{h,j} \xleftarrow{U} F_q \qquad \text{[Formula 6]}$$

$$k^*_{L+1,h} = k^*_{L,h} + \sum_{j \in AIDL+1} \sigma_{h,j} \left( \sum_{i \in BIj} v_i k^*_{L,i} \right) + b^*_h$$

for $h = 0, n+1$ or $\forall h \in DBIL$ $$k^*_{L+1} = (k^*_{L+1,0}, \{k^*_{L+1,h}\})$$

where $$y \xleftarrow{U} A$$

means selecting y uniformly from A, $F_q = \{0, 1, \ldots, q-1\}$,

AIDL+1 is a set of attributes ID assigned to an attribute to be set additionally,
BIj is a set of index numbers of a predicate vector to be set additionally and corresponding to an attribute included in AIDL+1, with which an attribute ID=j,
$v_i$ is an element of the predicate vector to be set additionally and having an index number i,
$b^*_i$ is a basis vector which constitutes the basis B*, and
DBIL is a predetermined attribute ID.

8. The confidential search system according to claim 2, further comprising a key generation device,
wherein the key generation device includes
a partial user secret key generation part which generates a partial key vector $pk^*_{L,0}$ shown in Formula 7, with the processing device and
a group certificate generation part which generates a group certificate $cert^*_{L,0}$ shown in Formula 8, with the processing device,
wherein the search device further includes
a user secret key restructure part which generates, with the processing device, the key vector $k^*_{L,0}$ shown in Formula 9, based on the partial key vector $pk^*_{L,0}$ generated by the partial user secret key generation part and the group certificate $cert^*_{L,0}$ generated by the group certificate generation part, and
wherein the user secret key storage part stores the key vector $k^*_{L,0}$ generated by the user secret key restructure part:

$$\sigma_j \xleftarrow{U} F_q \qquad \text{[Formula 7]}$$

$$pk^*_{L,0} = \sum_{j \in AID} \sigma_j \left( \sum_{i \in BIj \cap BIfix} b^*_i \right)$$

where $$y \xleftarrow{U} A$$

means selecting y uniformly from A $F_q = \{0, 1, \ldots, q-1\}$,

AID is a set of attributes ID assigned to attributes that constitute the second attribute information,
BIj is a set of index numbers of the first predicate vector corresponding to an attribute included in AID, with which an attribute ID=j,
BIfix is an index number which indicates a fixed element, of an element of a predicate vector, where only a value 0 or a fixed value 1 is set, and
$b^*_i$ is a basis vector which constitutes the basis B*, $$\sigma'_j \xleftarrow{U} F_q \qquad \text{[Formula 8]}$$

$$cert^*_{L,0} = \sum_{j \in AIDL} \sigma_j \sigma'_j \left( \sum_{i \in BIj \cap (\overline{BIfix})} v_i b^*_i \right) +$$

$$\sum_{j \in AIDL} (\sigma_j \sigma'_j - \sigma_j) \left( \sum_{\substack{i \in BIj \cap BIfix \\ v_i=1}} b^*_i \right) -$$

$$\sum_{j \in AiDL} \sigma_j \left( \sum_{\substack{i \in BIj \cap BIfix \\ v_i=0}} b^*_i \right) -$$

$$\sum_{j \in AID/AIDL} \sigma_j \left( \sum_{i \in BIj \cap BIfix} b^*_i \right)$$

where $$y \xleftarrow{U} A$$

means selecting y uniformly from A, $F_q = \{0, 1, \ldots, q-1\}$,

AID is a set of attributes ID assigned to attributes that constitute the second attribute information, AIDL is a set of attributes ID assigned to an attribute to be set, AID\AIDL is a set of attributes ID obtained by excluding AIDL from AID, BIj is a set of index numbers of the first predicate vector corresponding to an attribute included in AIDL or AID\AIDL, with which an attribute ID=j, BIfix is an index number which indicates a fixed element, of an element of a predicate vector, where only a value 0 or a fixed value 1 is set, $v_i$ is an element of the first predicate vector having an index number i, and $b^*_i$ is a basis vector which constitutes the basis B*, $$k^*_{L,0} = pk^*_{L,0} + cert^*_{L,0}. \quad \text{[Formula 9]}$$

9. The confidential search system according to claim 2, further comprising a key generation device, wherein the key generation device includes a key storage part which stores an interim secret key $k^*_{L-1}$ shown in Formula 10, in the storage device, a partial user secret key generation part which generates, with the processing device, a partial key vector $pk^*_{L,0}$ shown in Formula 11, based on the interim secret key $k^*_{L-1}$ stored in the key storage device, and a group certificate generation part which generates a group certificate $cert^*_{L,0}$ shown in Formula 12, wherein the search device further includes a user secret key restructure part which generates the key vector $k^*_{L,0}$ shown in Formula 13, with the processing device, and wherein the user secret key storage part stores the key vector $k^*_{L,0}$ generated by the user secret key restructure part:

$$\sigma_j, \sigma_{h,j} \xleftarrow{U} F_q \quad \text{[Formula 10]}$$

$$k^*_{L-1,0} = \sum_{j \in AID} \sigma_j \left( \sum_{i \in BIj} v_i b^*_i \right)$$

$$k^*_{L-1,h} = \sum_{j \in AID} \sigma_{h,j} \left( \sum_{i \in BIj} v_i b^*_i \right) + b^*_h$$

for $h = n + 1$ or $\forall h \in DBI$ $$k^*_{L-1} = (k^*_{L-1,0}, \{k^*_{L-1,h}\})$$

where $$y \xleftarrow{U} A$$

means selecting y uniformly from A, $F_q = \{0, 1, \ldots, q-1\}$,

AID is a set of attributes ID assigned to attributes that constitute attribute information, BIj is a set of index numbers of a predicate vector corresponding to an attribute included in AID, with which an attribute ID=j, $v_i$ is an element of a predicate vector having an index number i, $b^*_i$ is a basis vector which constitutes the basis B*, and DBI is a predetermined attribute ID, $$\sigma_j \xleftarrow{U} F_q \quad \text{[Formula 11]}$$

$$pk^*_{L,0} = k^*_{L-1,0} + \sum_{j \in AID/AIDL-1} \sigma_j \left( \sum_{i \in BIj \cap BIfix} k^*_{L-1,i} \right)$$

where $$y \xleftarrow{U} A$$

means selecting y uniformly from A, $F_q = \{0, 1, \ldots, q-1\}$,

AID is a set of attributes ID assigned to attributes that constitute the attribute information, AIDL−1 is a set of attributes ID assigned to attributes that have already been determined by the interim secret key $k^*_{L-1}$, AID\AIDL−1 is a set of attributes ID obtained by excluding AIDL−1 from AID, BIj is a set of index numbers of the predicate vector corresponding to an attribute included in AID\AIDL−1, with which the attribute ID=j, and BIfix is an index number which indicates a fixed element, of an element of a predicate vector, where only a value 0 or a fixed value 1 is set, $$\sigma'_j \xleftarrow{U} F_q \quad \text{[Formula 12]}$$

$$cert^*_{L,0} = \sum_{j \in AIDL} \sigma'_j \sigma_j \left( \sum_{i \in BIj \cap (BIfix)} v_i k^*_{L-1,i} \right) +$$
$$\sum_{j \in AIDL} (\sigma'_j \sigma_j - \sigma_j) \left( \sum_{\substack{i \in BIj \cap BIfix \\ v_i = 1}} k^*_{L-1,i} \right) -$$
$$\sum_{j \in AIDL} \sigma_j \left( \sum_{\substack{i \in BIj \cap BIfix \\ v_i = 0}} k^*_{L-1,i} \right) -$$
$$\sum_{j \in AID/AIDL-1} \sigma_j \left( \sum_{i \in BIj \cap BIfix} k^*_{L-1,i} \right)$$

where $$y \xleftarrow{U} A$$

means selecting y uniformly from A, $F_q = \{0, 1, \ldots, q-1\}$,

AIDL is a set of attributes ID assigned to attributes to be set,

AID is a set of attributes ID of attributes that constitute the attribute information, AIDL−1 is a set of attributes ID assigned to the attributes that have already been determined by the interim secret key $k^*_{L-1}$, AID\AIDL−1 is a set of attributes ID obtained by excluding AIDL−1 from AID, BIj is a set of index numbers of the first predicate vector corresponding to an attribute included in AIDL or AID\AIDL−1, with which an attribute ID=j, BIfix is an index number which indicates a fixed element, of an element of a predicate vector, where only a value 0 or a fixed value 1 is set, and $v_i$ is an element of a predicate vector having an index number i, $$k^*_{L,0} = pk^*_{L,0} + cert^*_{L,0}.$$ [Formula 13]

10. A cryptographic processing system which is configured to perform a predicate cryptographic process, when an inner product of an attribute vector and a predicate vector is a predetermined value, by conducting a predetermined computation using an encryption vector c1 generated based on the attribute vector and a decryption key generated based on the predicate vector, such that the encryption vector c1 is decryptable, and which includes a key generation device and a decryption device, wherein the key generation device includes a partial user secret key generation part which generates, with the processing device, a partial key vector $pk^*_{L,0}$ in which, regarding i, among i=1, ..., n (n is an integer of 2 or more), indicating a fixed element where only a value 0 or a fixed value is set for an element $v_i$ of a predicate vector, the fixed value is set as a coefficient for a basis vector $b^*_i$ of basis vectors $b^*_i$ (i=1, ..., n) which constitute a predetermined basis B*, and a group certificate generation part which generates, with the processing device, a group certificate including: a first vector in which, regarding i, among i=1, ..., n, indicating a change element where a value that changes depending on attribute information is set for the element $v_i$ of the predicate vector, the element $v_i$ of the predicate vector generated based on attribute of a user is set as a coefficient for the basis vectors $b^*_i$ which constitute the predetermined basis B*; and a second vector in which, regarding i, among i, indicating the fixed element, where the value 0 is set for the element $v_i$ of the predicate vector generated based on the attribute of the user, the fixed value is set as a coefficient for the basis vectors $b^*_i$, and wherein the search device includes a user secret key restructure part which generates, with the processing device, the key vector $k^*_{L,0}$ by adding the first vector included in the group certificate generated by the group certificate generation part, to the partial key vector $pk^*_{L,0}$ generated by the partial user secret key generation part and subtracting the second vector included in the group certificate generated by the group certificate generation part, from the partial key vector $pk^*_{L,0}$ generated by the partial user secret key generation part, and a decryption part which decrypts the encryption vector c1 by conducting, with the processing device, the predetermined calculation using the encryption vector c1 and the decryption key which is generated based on the key vector $k^*_{L,0}$ generated by the user secret key restructure part.

11. The cryptographic processing system according to claim 10, wherein the group certificate generation part generates a new group certificate, when the attribute of the user changes, based on the predicate vector generated from attribute information indicating the attribute of the user after the change, and wherein the user secret key restructure part generates a new key vector $k^*_{L,0}$ by adding the first vector included in the new group certificate, to the partial key vector $pk^*_{L,0}$ and subtracting the second vector included in the new group certificate, from the partial key vector $pk^*_{L,0}$.

12. A cryptographic processing system configured to perform a predicate cryptographic process, when an inner product of an attribute vector and a predicate vector is a predetermined value, by conducting a predetermined computation using a ciphertext generated based on the attribute vector and a decryption key generated based on the predicate vector, such that the ciphertext is decryptable, the cryptographic processing system comprising an encryption device which generates the ciphertext and a decryption device which decrypts the ciphertext generated by the encryption device, wherein the encryption device includes a first coded information generation part which generates first coded information with a processing device, by setting, in respective entries of a coded sequence to which respective attribute items of a plurality of attribute items are assigned, attribute information that limits a user who is capable of decrypting the ciphertext and that corresponds to the attribute items assigned to the respective entries, and by setting predetermined information * in an entry of the coded sequence where the attribute information is not set, an attribute vector generation part which generates, with the processing device, respective elements of the attribute vector from the first coded information generated by the first coded information generation part and which renders to a value 0 an element of an attribute vector corresponding to the entry in the first coded information, where the predetermined information * is set, and an encrypted data generation part which generates the ciphertext with the processing device, based on the element of the attribute vector generated by the attribute vector generation part, and wherein the decryption device includes a key storage part which stores a decryption key generated based on the predicate vector to which the attribute information indicating the attribute of the user who is to use the decryption key is assigned, in a storage device, and a decryption part which decrypts the ciphertext by conducting, with the processing device, the predetermined calculation using the ciphertext generated by the encrypted data generation part of the encryption device and the decryption key stored in the key storage part.

13. The cryptographic processing system according to claim 12, further comprising a key generation device which generates a user secret key serving as a source of the decryption key, wherein the key generation device includes a second coded information generation part which generates second coded information with the processing device, by setting, in the respective entries of the coded sequence, attribute information that indicates the attribute of the user who is to use the decryption key and that corresponds to the attribute items assigned to the respective entries, and by setting the predetermined information * in an entry of the coded sequence where the attribute information is not set, an predicate vector generation part which generates, with the processing device, respective elements of the predicate vector from the second coded information generated by the second coded information generation part, and which renders to a value 0 an element of the predicate vector corresponding to the entry in the second coded information, where the predetermined information * is set, and a user secret key generation part which generates a user secret key with the processing device based on the element of the predicate vector generated by the predicate vector generation part, and wherein the key storage part of the decryption device stores the decryption key generated based on the user secret key generated by the user secret key generation part of the key generation device.

14. The cryptographic processing system according to claim 13, in a case where the inner product of the attribute vector and the predicate vector is the predetermined value only when the first coded information $a_1, \ldots, a_m$ set in predetermined entries $t_1, \ldots, t_m$ (m≥2) of the coded sequence and the second coded information $b_1, \ldots, b_m$ set in the predetermined entries $t_1, \ldots, t_m$ of the coded sequence satisfy $b_i = a_i$ for all i of i=1, ..., m, wherein the attribute vector generation part generates 1, $-a_1, \ldots, 1, -a_m$ or $1, a_1, \ldots, 1, a_m$ as elements of an attribute vector corresponding to the first coded information $a_1, \ldots, a_m$, and when the first coded information $a_1, \ldots, a_m$ include an entry where the predetermined information * is set, the attribute vector generation part generates 0,0 as elements of an attribute vector corresponding to the entry where the predetermined information * is set, and wherein when the attribute vector generation part generates $1, -a_1, \ldots, 1, -a_m$, the predicate vector generation part generates $b_1, 1, \ldots, b_m, 1$, and when the attribute vector generation part generates $1, a_1, \ldots, 1, a_m$, the predicate vector generation part generates $-b_1, 1, \ldots, -b_m, 1$, as elements of an attribute vector corresponding to the second coded information $b_1, \ldots, b_m$, and when the second coded information $b_1, \ldots, b_m$ include an entry where the predetermined information * is set, the predicate vector generation part generates 0,0 as elements of an attribute vector corresponding to the entry where the predetermined information * is set.

15. A cryptographic processing system configured to perform a predicate cryptographic process, when an inner product of an attribute vector and a predicate vector is a predetermined value, by conducting a predetermined computation using a ciphertext generated based on the attribute vector and a decryption key generated based on the predicate vector such that the ciphertext is decryptable, the cryptographic processing system comprising an encryption device which generates the ciphertext, a key generation device which generates the decryption key, and a decryption device which decrypts the ciphertext generated by the encryption device, by using the decryption key generated by the key generation device, wherein the encryption device includes a first coded information generation part which generates first coded information $a_1, \ldots, a_m$ with a processing device, by setting a relevance value indicating relevance in, among entries $t_1, \ldots, t_m$ (m≥2) of a coded sequence where respective attributes of a plurality of attributes are assigned, an entry where an attribute corresponding to an attribute of a user who can decrypt the ciphertext is set, and by setting a random number R in an entry of the coded sequence where the relevance value is not set, an attribute vector generation part which generates, with the processing device, elements $x_1, \ldots, x_n$ of the attribute vector from the first coded information $a_1, \ldots, a_m$ generated by the first coded information generation part, and an encrypted data generation part which generates the ciphertext, with the processing device, based on the elements $x_1, \ldots, x_n$ of the of the attribute vector generated by the attribute vector setting part, wherein the key generation device includes a second coded information generation part which generates second coded information $b_1, \ldots, b_m$ with a processing device, by setting the relevance value in, among the entries $t_1, \ldots, t_m$ of the coded sequence, an entry where an attribute corresponding to an attribute of a user who uses a decryption key is set, and by setting predetermined information * in an entry of the coded sequence where the relevance value is not set, a predicate vector generation part which generates, with the processing device, elements $v_1, \ldots, v_n$ of the predicate vector from the second coded information $b_1, \ldots, b_m$ generated by the second coded information generation part, and which renders to a value 0 an element of a predicate vector corresponding to an entry in the second coded information $b_1, \ldots, b_m$, where the predetermined information * is set, and a user secret key generation part which generates the user secret key with the processing device based on the elements $v_1, \ldots, v_n$ of the predicate vector generated by the predicate vector setting part, and wherein the decryption device includes a decryption part which decrypts the ciphertext by conducting the predetermined calculation with the processing device using the ciphertext generated by the encrypted data generation part of the encryption device and a decryption key which is based on the user secret key generated by the user secret key generation part of the key generation device.

16. The cryptographic processing system according to claim 15, wherein the attribute vector generation part generates 1, $-a_1, \ldots, 1, -a_m$ or $1, a_1, \ldots, 1, a_m$ as elements of an attribute vector corresponding to the first coded information $a_1, \ldots, a_m$, and wherein when the attribute vector generation part generates $1, -a_1, \ldots, 1, -a_m$, the predicate vector generation part generates $b_1, 1, \ldots, b_m, 1$, and when the attribute vector generation part generates $1, a_1, \ldots, 1, a_m$, the predicate vector generation part generates $-b_1, 1, \ldots, -b_m, 1$, as elements of an attribute vector corresponding to the second coded information $b_1, \ldots, b_m$, and when the second coded information $b_1, \ldots, b_m$ include an entry where the predetermined information * is set, the predicate vector generation part generates 0,0 as elements of an attribute vector corresponding to the entry where the predetermined information * is set.

17. A cryptographic processing system configured to perform a predicate cryptographic process, when an inner product of an attribute vector and a predicate vector is a predetermined value, by conducting a predetermined computation using a ciphertext generated based on the attribute vector and a decryption key generated based on the predicate vector such that the ciphertext is decryptable, the cryptographic processing system comprising an encryption device which generates the ciphertext, a key generation device which generates the decryption key, and a decryption device which decrypts the ciphertext generated by the encryption device, by using the decryption key generated by the key generation device, wherein the encryption device includes a first coded information generation part which generates first coded information $a_1, \ldots, a_m$ with a processing device, by setting a relevance value indicating relevance in, among entries $t_1, \ldots, t_m$ ($m \geq 2$) of a coded sequence where respective attributes of a plurality of attributes are assigned, an entry where an attribute corresponding to an attribute of a user who can decrypt the ciphertext is set, and by setting a random number R in an entry of the coded sequence where the relevance value is not set, an attribute vector generation part which generates elements $x_1, \ldots, x_n$ of the attribute vector from the first coded information $a_1, \ldots, a_m$ generated by the first coded information generation part, with the processing device, and an encrypted data generation part which generates the ciphertext, with the processing device, based on the elements $x_1, \ldots, x_n$ of the of the attribute vector generated by the attribute vector setting part, wherein the key generation device includes a second coded information generation part which generates second coded information $b_1, \ldots, b_m$ with a processing device, by setting the relevance value in, among the entries $t_1, \ldots, t_m$ of the coded sequence, an entry where attribute information corresponding to an attribute of a user who uses a decryption key is set, and by setting a random number R in an entry of the coded sequence where the relevance value is not set, a predicate vector generation part which generates, with the processing device, elements $v_1, \ldots, v_n$ of the predicate vector from the second coded information $b_1, \ldots, b_m$ generated by the second coded information generation part, and a user secret key generation part which generates a user secret key based on the elements $v_1, \ldots, v_n$ of the predicate vector generated by the predicate vector setting part, and wherein the decryption device includes a decryption part which decrypts the ciphertext by conducting the predetermined calculation with the processing device using the ciphertext generated by the encrypted data generation part of the encryption device and the decryption key which is based on the user secret key generated by the user secret key generation part of the key generation device.

18. The cryptographic processing system according to claim 17, wherein the attribute vector generation part generates a value concerning $a_i$ ($i=1, \ldots, m$) from respective terms obtained by expanding $(b_1-a_1) \times \ldots \times (b_m-a_m)$, as an element of an attribute vector corresponding to the first coded information $a_1, \ldots, a_m$, and wherein the predicate vector generation part generates a value concerning $b_i$ ($i=1, \ldots, m$) from respective terms obtained by expanding $(b_1-a_1) \times \ldots \times (b_m-a_m)$, as an element of an attribute vector corresponding to the second coded information $b_1, \ldots, b_m$.

19. A cryptographic processing system configured to perform a predicate cryptographic process, when an inner product of an attribute vector and a predicate vector is a predetermined value, by conducting a predetermined computation using a ciphertext generated based on the attribute vector and a decryption key generated based on the predicate vector such that the ciphertext is decryptable, the cryptographic processing system comprising an encryption device which generates the ciphertext, a key generation device, and a decryption device which decrypts the ciphertext generated by the encryption device, wherein the encryption device includes a first coded information generation part which generates, with a processing device, first coded information by setting a setting time of a ciphertext, in a term information coded sequence including: a start year/month coded sequence in which a start year and month are to be set, the start year/month coded sequence having a start year setting column in which start year is to be set and 12 start month setting columns in which information of respective months are to be set; an end year/month coded sequence in which an end year and month are to be set, the end year/month coded sequence having an end year setting column in which end year is to be set and 12 end month setting columns in which information of respective month are to be set; and a middle year coded sequence in which years between the start year and month and the end year and month are to be set, the middle year coded sequence having a middle year setting column, the first coded information generation part serving to set a generation year of data to be encrypted, in the start year setting column, the end year setting column, and the middle year setting column, and serving to set a generation month of the data, in the start month setting column and the end month setting column, an attribute vector generation part which generates, with the processing device, respective elements of the attribute vector from the first coded information generated by the first coded information generation part, and an encrypted data generation part which generates, with the processing device, the ciphertext by encrypting the data, based on the elements of the attribute vector generated by the attribute vector setting part, wherein the key generation device includes a second coded information generation part which generates, with the processing device, second coded information in which a decryptable time during which a user who uses the decryption key is capable of decryption is assigned, the second coded information generation part serving to set a start year of the decryptable time in the start year setting column, a start month of the decryptable time in the start month setting column, an end year of the decryptable time in the end year setting column, an end month of the decryptable time in the end month setting column, and years between the start year and the end year of the decryptable time in the middle year setting column, a predicate vector generation part which generates, with the processing device, respective elements of the predicate vector from the second coded information generated by the second coded information generation part, and a user secret key generation part which generates, with the processing device, the user secret key based on the predicate vector generated by the predicate vector generation part, and wherein the decryption device includes a decryption part which decrypts the ciphertext by conducting the predetermined computation with the processing device using the ciphertext generated by the encrypted data generation part of the encryption device and the decryption key based on the user secret key generated by the user secret key generation part of the key generation device.

* * * * *